(12) United States Patent
Sciuk

(10) Patent No.: US 7,904,328 B2
(45) Date of Patent: Mar. 8, 2011

(54) AUTOMATED SHOPPING SYSTEM AND METHOD FOR THE SELECTION OF HUMAN ENTITIES INCLUDING ITERATIVE SCORING

(75) Inventor: David Sciuk, Los Angeles, CA (US)

(73) Assignee: Intragroup, Inc., Las Vegas, NV (US)

( * ) Notice: Subject to any disclaimer, the term of this patent is extended or adjusted under 35 U.S.C. 154(b) by 0 days.

(21) Appl. No.: 11/675,552

(22) Filed: Feb. 15, 2007

(65) Prior Publication Data

US 2007/0214032 A1    Sep. 13, 2007

Related U.S. Application Data

(62) Division of application No. 09/973,251, filed on Oct. 8, 2001, now Pat. No. 7,212,985.

(60) Provisional application No. 60/238,997, filed on Oct. 10, 2000, provisional application No. 60/253,032, filed on Nov. 22, 2000, provisional application No. 60/268,987, filed on Feb. 14, 2001.

(51) Int. Cl.
*G06F 17/30* (2006.01)
*G06Q 30/00* (2006.01)

(52) U.S. Cl. ................................ 705/10; 705/26; 705/7

(58) Field of Classification Search .................... 705/10, 705/26

See application file for complete search history.

(56) References Cited

U.S. PATENT DOCUMENTS

| | | | | |
|---|---|---|---|---|
| 5,794,207 | A * | 8/1998 | Walker et al. | 705/1 |
| 5,894,556 | A * | 4/1999 | Grimm et al. | 709/227 |
| 5,930,804 | A * | 7/1999 | Yu et al. | 707/104.1 |
| 6,272,467 | B1 * | 8/2001 | Durand et al. | 705/1 |
| 6,289,340 | B1 * | 9/2001 | Puram et al. | 707/5 |
| 6,385,620 | B1 | 5/2002 | Kurzius et al. | |
| 2001/0032112 | A1 | 10/2001 | Linz | |
| 2002/0013735 | A1 * | 1/2002 | Arora et al. | 705/26 |
| 2002/0046074 | A1 | 4/2002 | Barton | |
| 2002/0072946 | A1 | 6/2002 | Richardson | |
| 2002/0111843 | A1 | 8/2002 | Wellenstein | |
| 2002/0128894 | A1 | 9/2002 | Farenden | |
| 2002/0178163 | A1 * | 11/2002 | Mayer | 707/10 |

OTHER PUBLICATIONS

Chakrabarti et al, Automatic resource compilation by hyperlink structure and associated text:, Computer Networks and ISDN Systems 30, (1998) 65-74.*

* cited by examiner

*Primary Examiner* — Romain Jeanty
*Assistant Examiner* — Thomas Mansfield
(74) *Attorney, Agent, or Firm* — Ashley J. Wells

(57) ABSTRACT

An automated shopping system and method in which a user places an order for at least one provider, a degree of matching between each order-provider pairing is computed as a score by an iterative scoring system, scoring correction takes place when the score is determined to be incomplete, and the score, and optionally a ranking of providers is reported to the user. The iterative scoring system includes a scoring correction system that determines whether a score is based on complete information or whether additional information and determination of a revised score is required. Additional information from outside the system may be requested including requesting information determined to be incomplete from the user or the provider and/or requesting verification of provider information from a third party, and the score may be updated to obtain a revised score based on the additional information received.

23 Claims, 24 Drawing Sheets

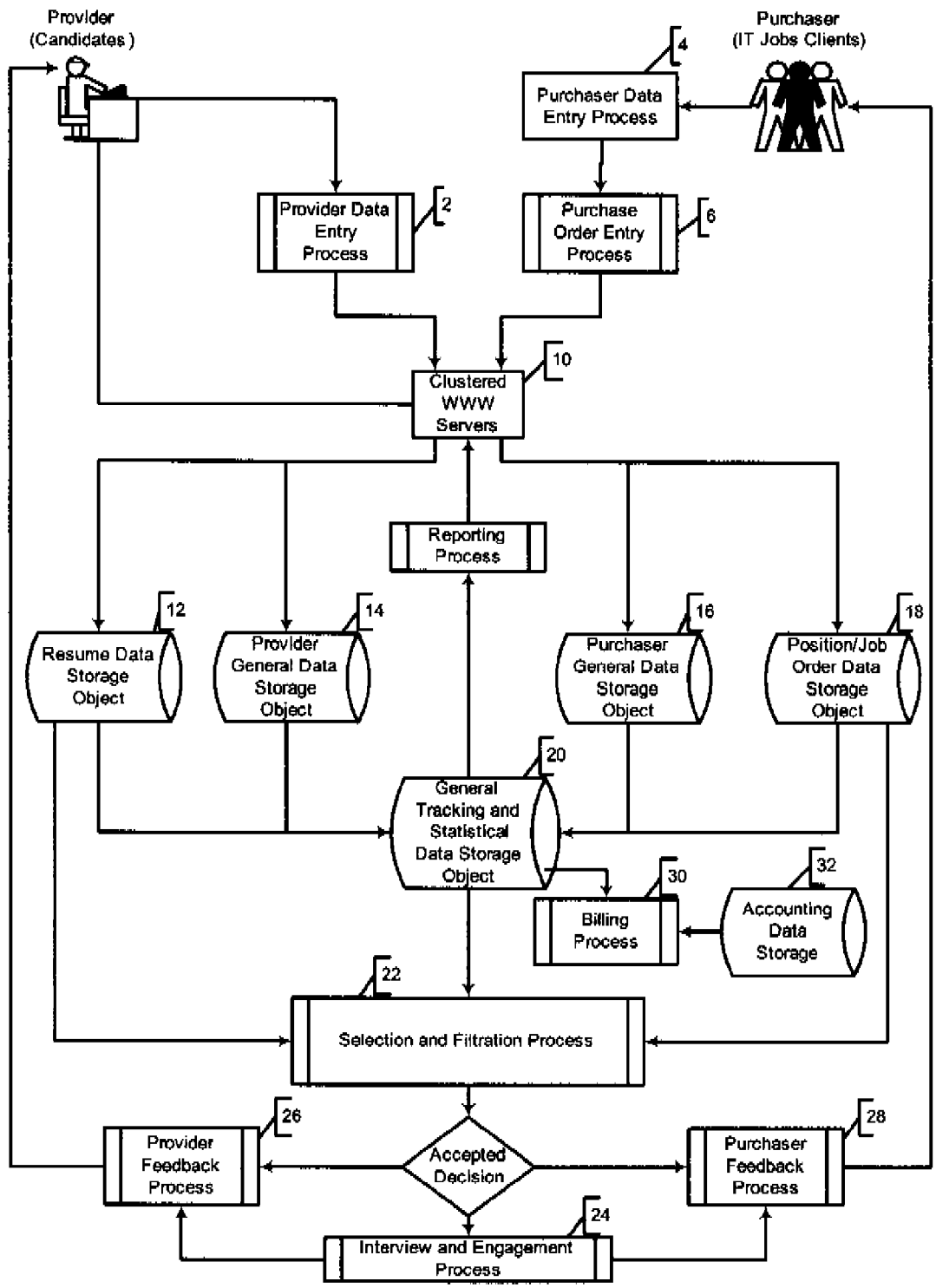

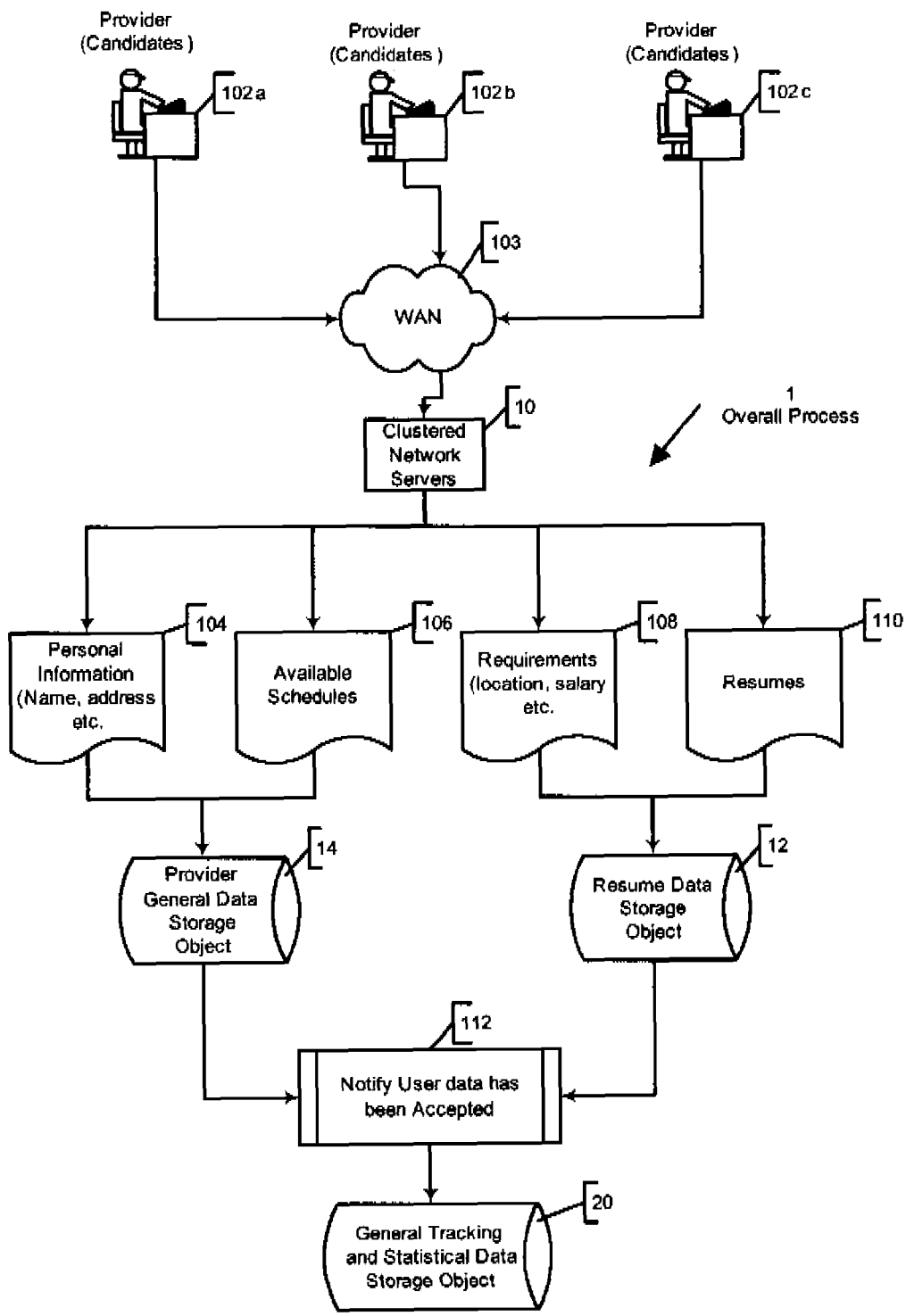

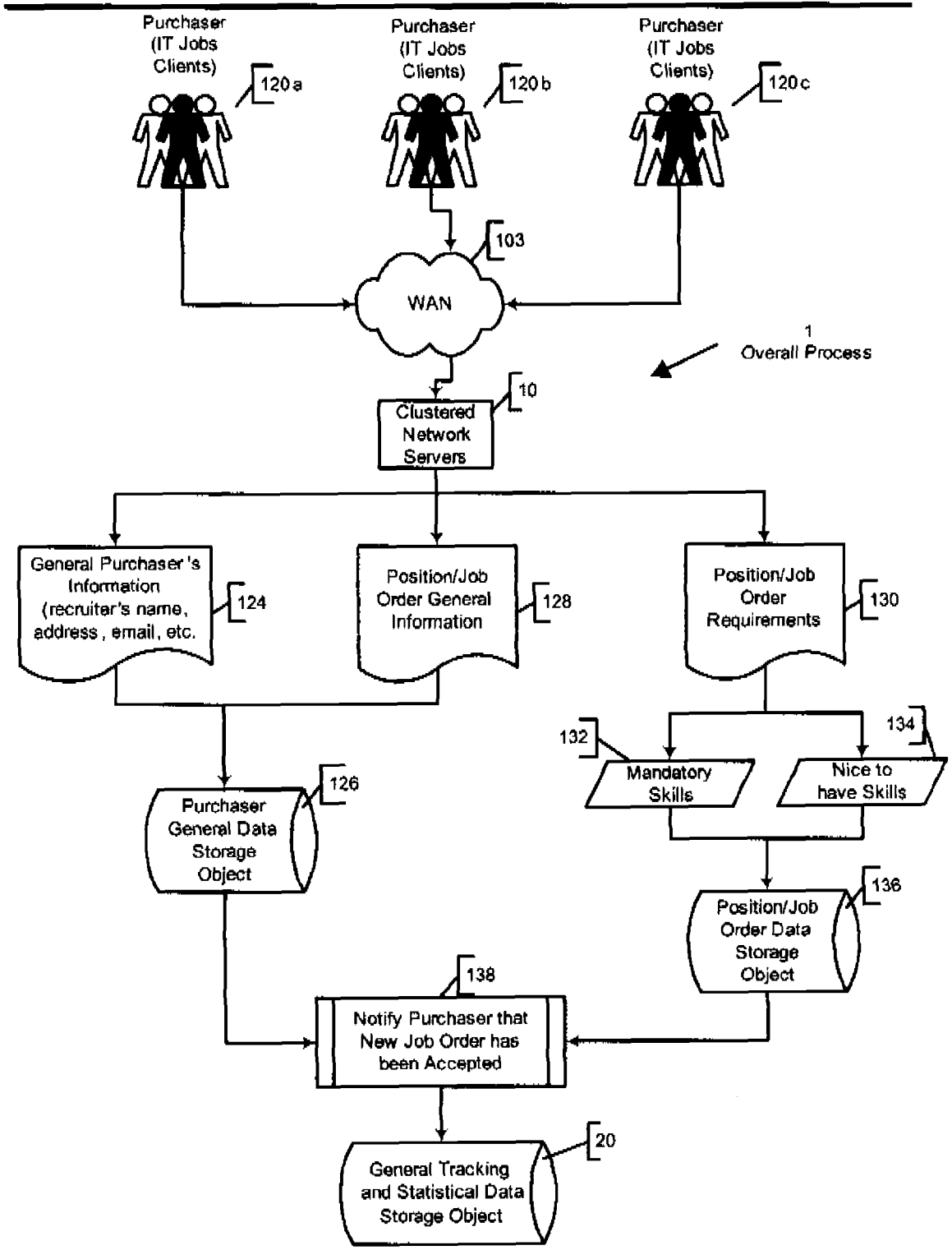

System Data Elements Fig.4

Figure 4.1 System Staff

| Staff ID |
|---|
| Password |
| Level of Access |
| User First Name |
| User Last Name |
| Title |
| Department |
| Street Address 1 |
| Street Address 2 |
| City |
| State |
| Postal Code |
| Country |
| Phone |
| Email |
| Roll #1 |
| Roll #2 |

Figure 4.2 System default steps

| System Default Step ID |
|---|
| Step name |
| Assigned Staff Type |
| Assigned Staff ID |
| Notice to Provider |
| Notice to Staff |
| Provider Data Entry Process |
| Staff Data Entry Process |
| Max Time to Start Provider Data Entry |
| Max Time to Start Staff Data Entry |
| Max Time to Finish Provider Data Entry |
| Max Time to Finish Staff Data Entry |
| Threshold Score(s) for this Step |
| Action if Below Threshold Score(s) |
| Min # of Providers at Threshold Score(s) |
| Max # of Providers at Threshold Score(s) |
| Measurement Period (# of Days to Measure Rate) |
| Min # of Providers above Threshold per Measurement Period |
| Max # of Providers above Threshold per Measurement Period |
| Action After Data Received |

Purchaser Database

Fig.5

Figure 5.1 Purchasers

| Purchaser ID |
|---|
| Purchaser Category |
| Administrator First Name |
| Title |
| Department |
| Company |
| Street Address 1 |
| Street Address 2 |
| City |
| State |
| Postal Code |
| Country |
| Phone |
| Email |
| Billing Method |
| Billing Frequency |
| Billing Amount |
| Other billing fields... |
| Account Balance |
| Account Current? |
| Staff in Charge (Related Staff ID) |
| Date Created |
| Date Suspended |

Figure 5.3 Purchaser Default Steps

| Purchaser Default Step ID |
|---|
| Related Purchaser ID |
| Assigned Staff Type |
| Assigned Staff ID |
| Step Name |
| Notice to Provider |
| Notice to Staff |
| Provider Data Entry Process |
| Staff Data Entry Process |
| Max Time to Start Provider Data Entry |
| Max Time to Start Staff Data Entry |
| Max Time to Finish Provider Data Entry |
| Max Time to Finish Staff Data Entry |
| Threshold Score(s) for this Step |
| Action if Below Threshold Score(s) |
| # of Days to Accumulate Providers |
| Min # of Providers at Threshold Score(s) |
| Max # of Candidates at Threshold Score(s) |
| Measurement Period (# of Days to Measure Rate) |
| Min # of Providers above Threshold per Measurement Period |
| Max # of Providers above Threshold per Measurement Period |
| Action After Data Received |

Order Database  Fig.6

Figure 6.1 Orders

| |
|---|
| Order ID |
| Related Purchaser ID |
| Priority Level |
| # of Positions to Fill |
| # of Positions Filled |
| Interviewer #1 (Related Purchaser ID) |
| Interviewer #2 (Related Purchaser ID) |
| Interviewer #3 (Related Purchaser ID) |
| Decision Maker #1 (Related Purchaser ID) |
| Decision Maker #2 (Related Purchaser ID) |
| Decision Maker #3 (Related Purchaser ID) |
| Warning Purchaser Staff #1 (Related Purchaser ID) |
| Warning Purchaser Staff #2 (Related Purchaser ID) |
| Urgent Purchaser Staff #1 (Related Purchaser ID) |
| Urgent Purchaser Staff #2 (Related Purchaser ID) |
| Warning System Purchaser Staff #1 (Related Purchaser ID) |
| Warning System Purchaser Staff #2 (Related Purchaser ID) |
| Urgent System Staff #1 (Related Purchaser ID) |
| Urgent System Staff #2 (Related Purchaser ID) |
| Desired Resume Keywords |
| Required Candidate Attributes |
| Knock-Out Candidate Attributes |
| Date Created |
| Date Suspended |
| Date Completed |
| Order Type |
| Starting Date |
| Order Length |
| Order Location City |
| Order Location State |
| Order Location Country |
| Order Mode |
| Pay Range – From |
| Pay Range – To |
| Years Experience Required |
| Immigration Status Requirement |
| Education Level Requirement |
| Certification Requirement |

Figure 6.2 Order Type Defaults

| |
|---|
| Order Default Step ID |
| Related Order ID |
| Step ID |
| Assigned Staff Type |
| Assigned Staff ID |
| Notice to Provider |
| Notice to Staff |
| Provider Data Entry Process |
| Staff Data Entry Process |
| Max Time to Start Provider Data Entry |
| Max Time to Start Staff Data Entry |
| Max Time to Finish Provider Data Entry |
| Max Time to Finish Staff Data Entry |
| Threshold Score(s) for this Step |
| Action if Below Threshold Score(s) |
| # of Days to Accumulate Providers |
| Min # of Providers at Threshold Score(s) |
| Max # of Providers at Threshold Score(s) |
| Measurement Period (# of Days to Measure Rate) |
| Min # of Providers above Threshold per Measurement Period |
| Max # of Providers above Threshold per Measurement Period |
| Action After Data Received |

Figure 6.4 Order Categories

| |
|---|
| Order Category Record ID |
| Related Order ID |
| Related Order Category ID |
| Level of Order Category |

Figure 6.5 Technologies

| |
|---|
| Technology record ID |
| Related Order ID |
| Related Technology ID |
| Required? |

Figure 6.6 Products

| |
|---|
| Product Record ID |
| Related Order ID |
| Related Product ID |
| Required? |

Providers Database    Fig. 7

Figure 7.1 Provider

| Provider ID |
| --- |
| Date Provider Created |
| Title |
| Department |
| Company |
| Street Address 1 |
| Street Address 2 |
| City |
| State |
| Postal Code |
| Country |
| Phone |
| Email |

Figure 7.3 Virtual Provider

| Virtual Provider ID |
| --- |
| Related Provider Id |
| Related Order ID |
| Current Step # |
| Current Step # |
| Current Score(s)... |
| Current Provider Status |
| Date Virtual Provider Created |
| Date Virtual Provider Eliminated |
| Elimination Reason Code |
| Date Successful |
| Date Offer Issued |
| Date Accepting Offer |
| Date Formalized |
| Formalized Status Code |

Figure 7.2 Virtual Provider Steps

| Virtual Provider Step ID |
| --- |
| Related Virtual Provider ID |
| Step Name |
| Assigned Staff Type |
| Assigned Id |
| Notice to Provider |
| Notice to Staff |
| Provider Data Entry Process |
| Staff Data Entry Process |
| Max Time to Start Provider Data Entry |
| Max Time to Start Staff Data Entry |
| Max Time to Finish Provider Data Entry |
| Max Time to Finish Staff Data Entry |
| Threshold Score(s) for this Step |
| Action if Below Threshold Score(s) |
| Action After Data Received |
| Current Step Status Code |
| Date Step Reached |
| Date Step Started |
| Date First Notices Sent |
| Date Second Notices Sent |
| Date All Responses Received |
| Date Timed-Out |
| Date Human Intervention Called For |
| Date Step Completed |

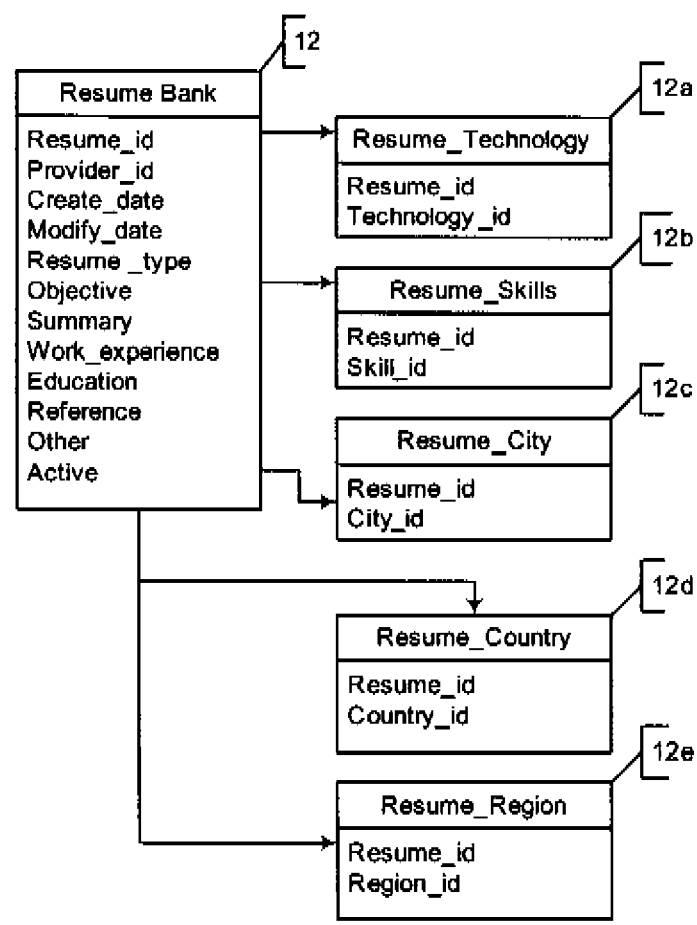
Database Schema – Resume Data Objects Fig.8

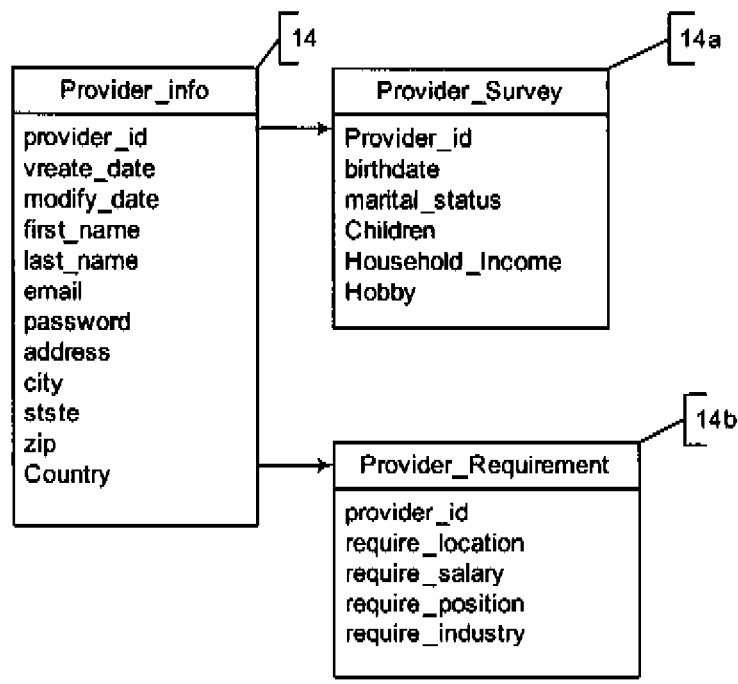
Database Schema – Provider General Data Objects    Fig.9

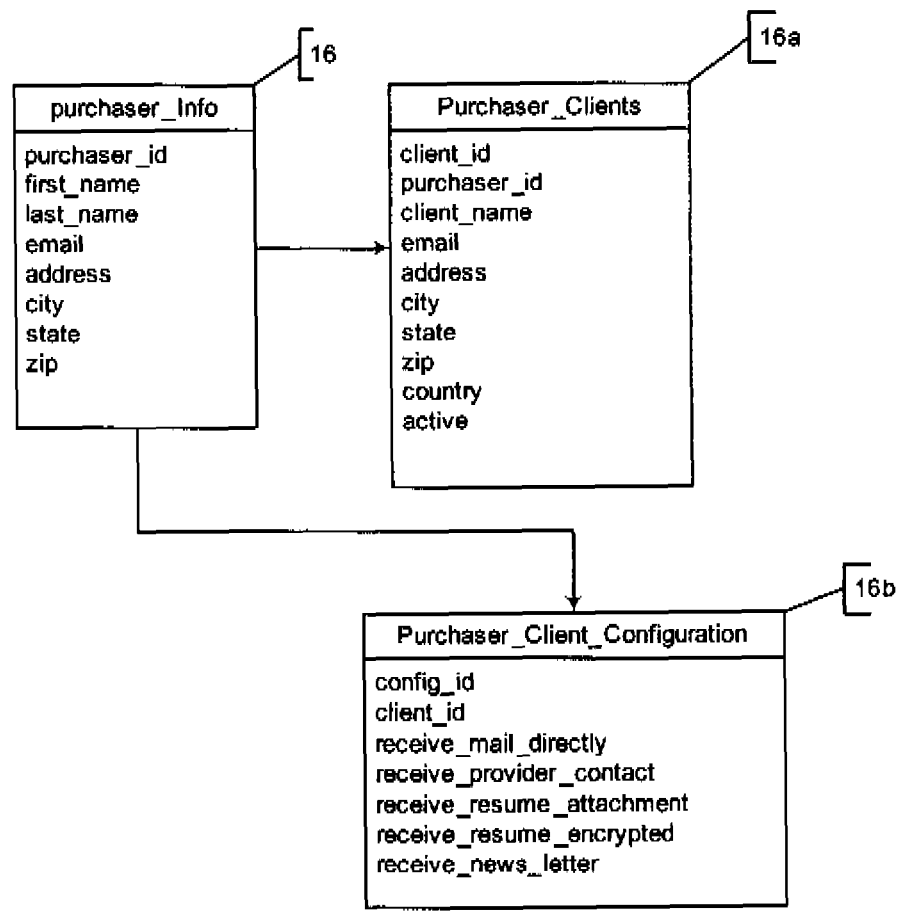
Database Schema – Purchaser General Data Objects   Fig.10

Database Schema – Purchase Order Related Data Objects    Fig.11
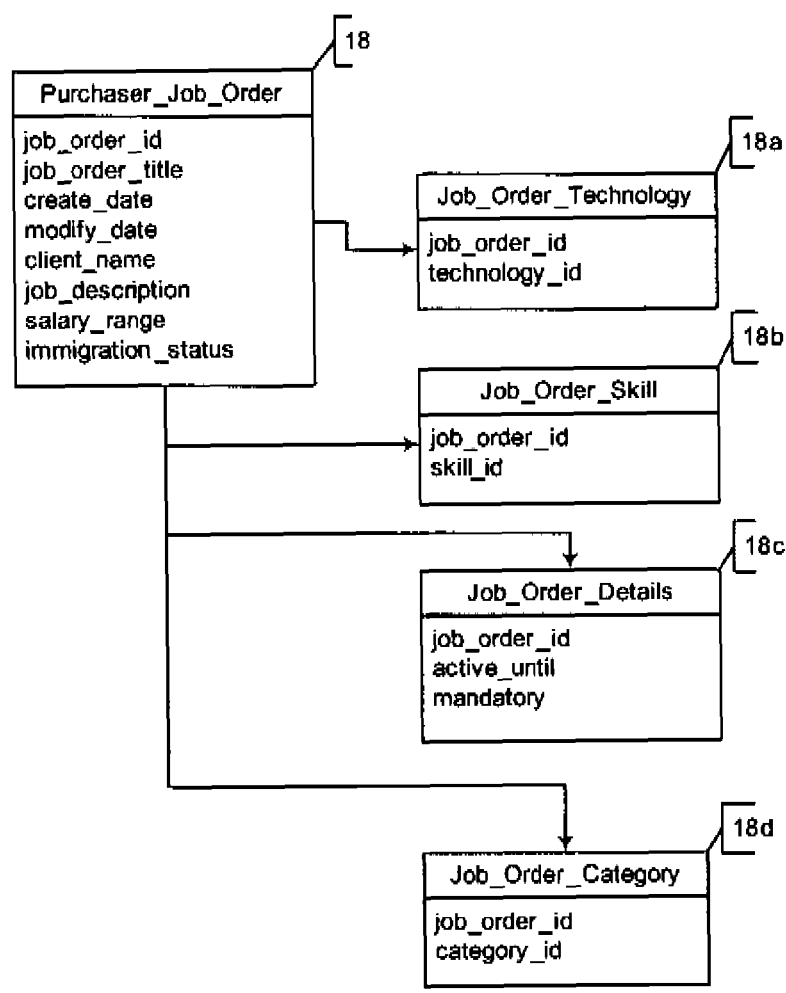

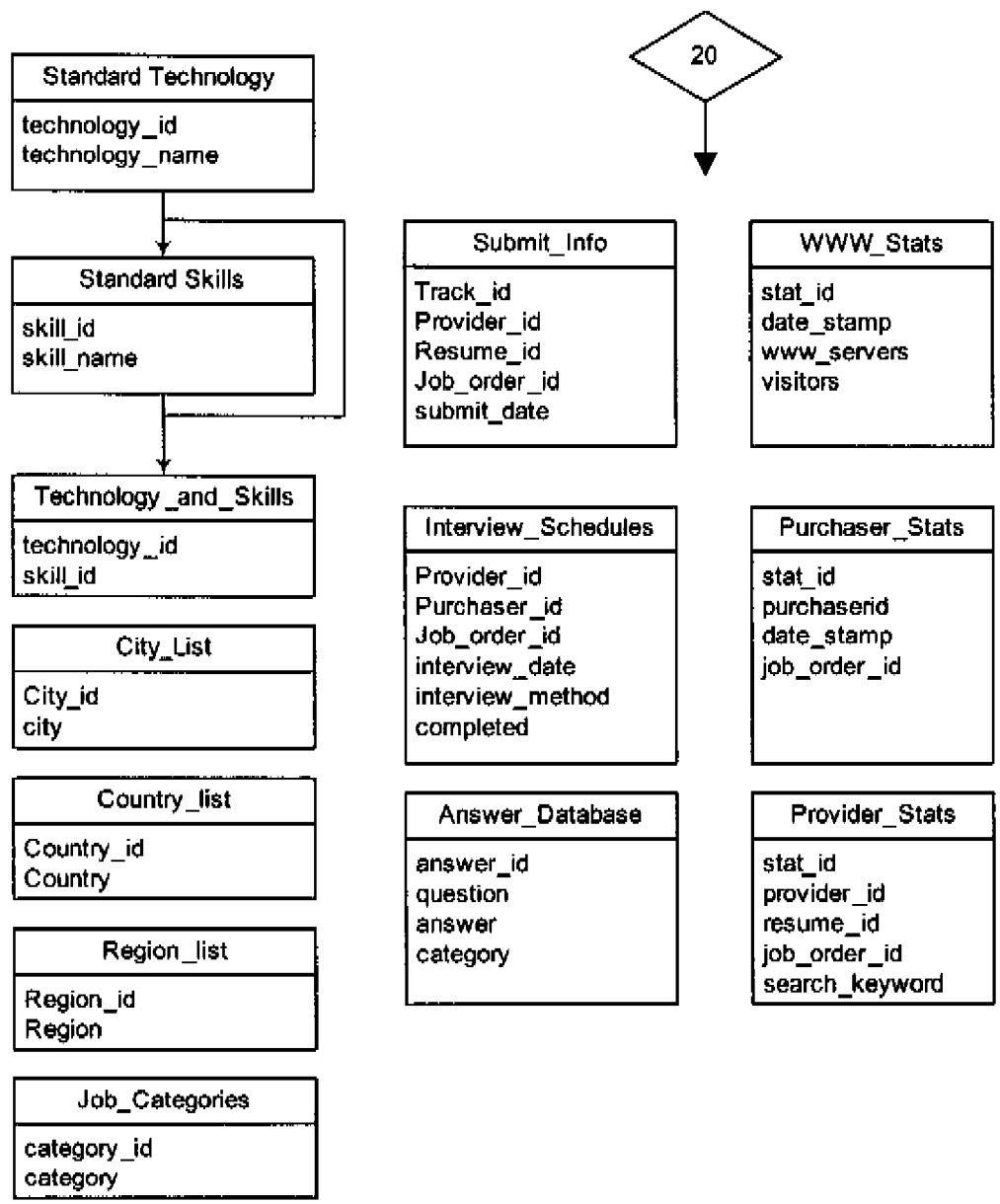
Database Schema – General Data and Tracking Objects  Fig.12

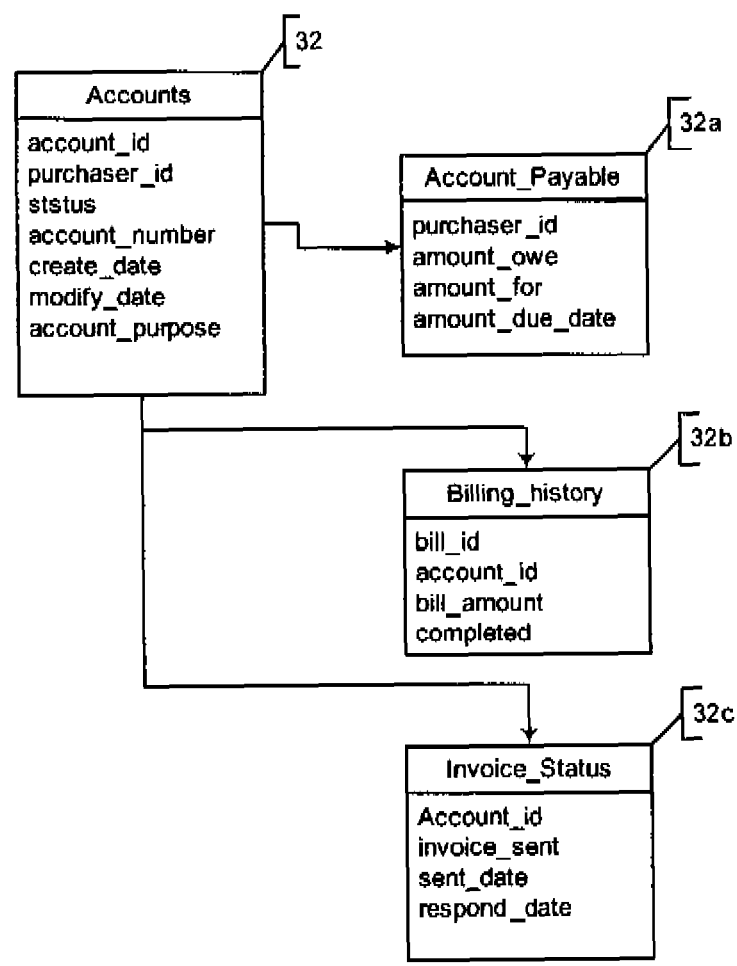
Fig.13 Database Accounting Schemas

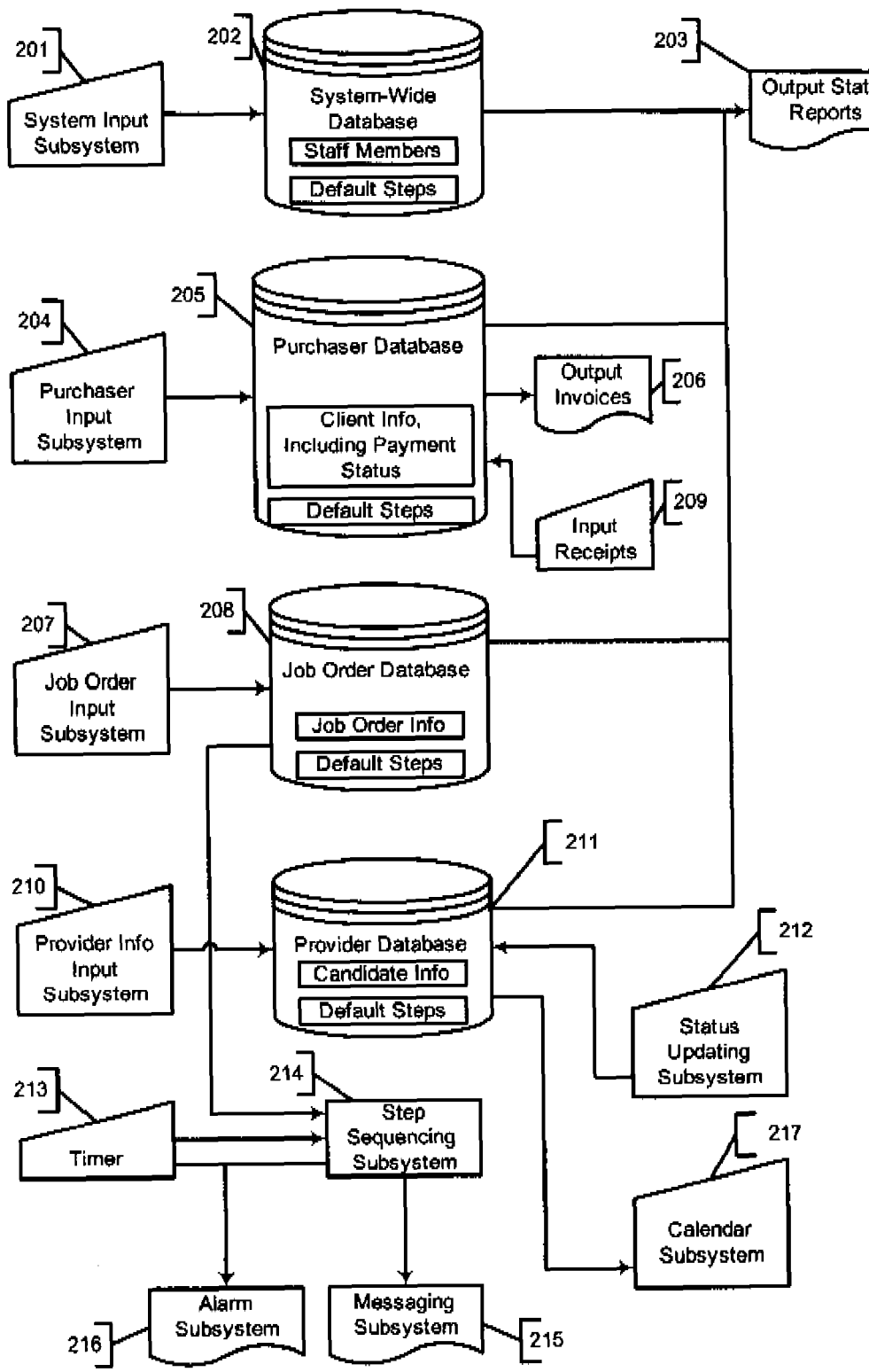
Fig. 14 Database Input and Output

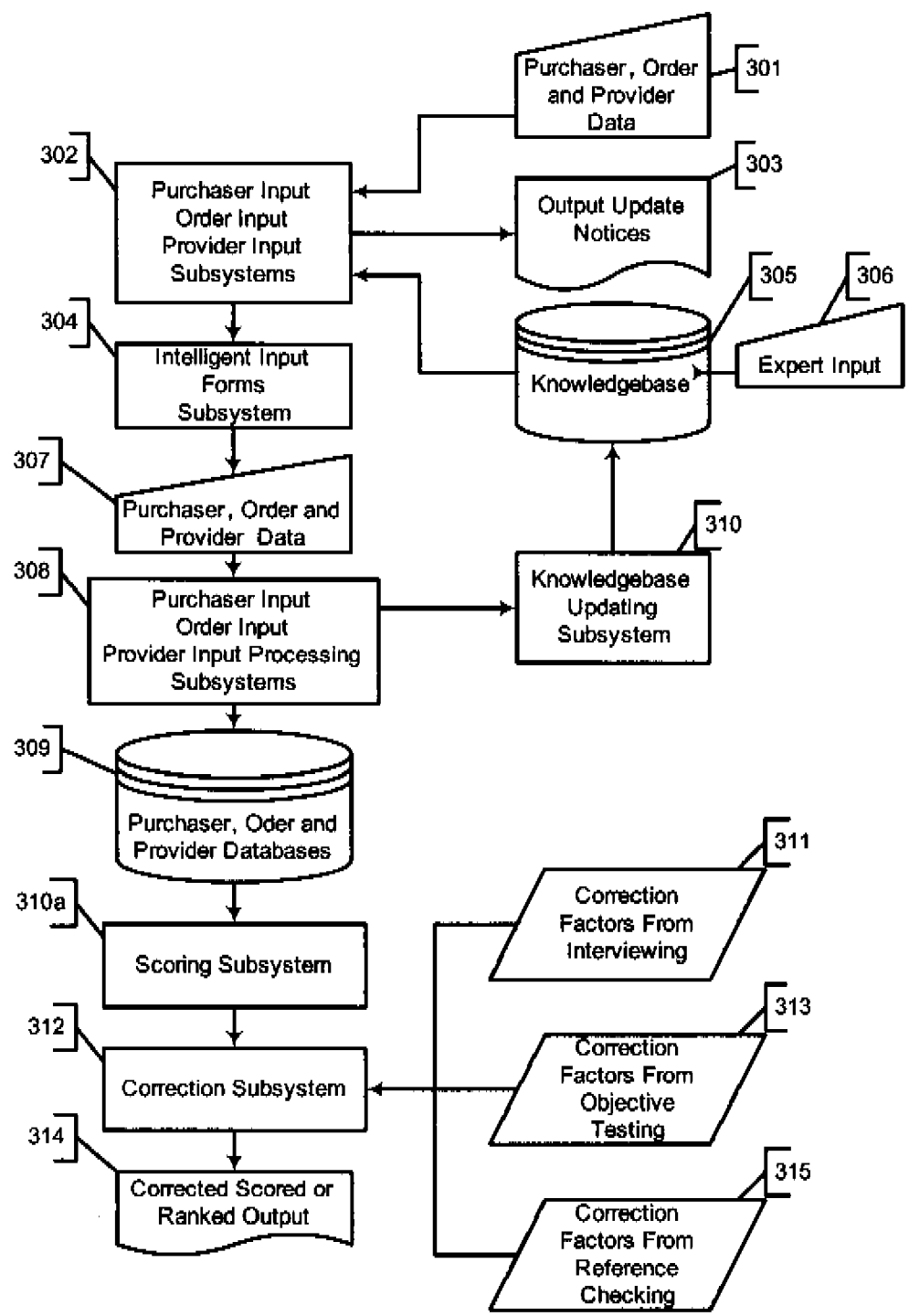
Fig. 15 Database Input and Output

Database – Reference Tables  Fig.16

Figure 16.1 Order Categories

| |
|---|
| Order Category ID |
| Related Purchaser Category ID |
| Order Category Description |
| Active? |
| Date Created |
| Date De-activated |
| Tentative? |

Figure 16.2 Technologies

| |
|---|
| Technology ID |
| Technology Description |
| Related Order Category ID |
| Active? |
| Date Created |
| Date De-activated |
| Tentative? |

Figure 16.3 Products

| |
|---|
| Product ID |
| Product Description |
| Related Technology ID |
| Active? |
| Date Created |
| Date De-activated |
| Tentative? |

Figure 16.4 Text Questions

| |
|---|
| Text Question |
| Description of Question |
| Text of Question |
| Related Order Category ID |
| Active? |
| Date Created |
| Date De-activated |

Figure 16.5 Purchaser Categories

| |
|---|
| Purchaser Category ID |
| Purchaser Category Description |

Figure 16.6 Tentative Options

| |
|---|
| Order Category ID |
| Technology ID |
| Product ID |
| Related Order ID |
| Date Suggested |
| Reviewed By |
| Accepted? |
| Date Accepted |

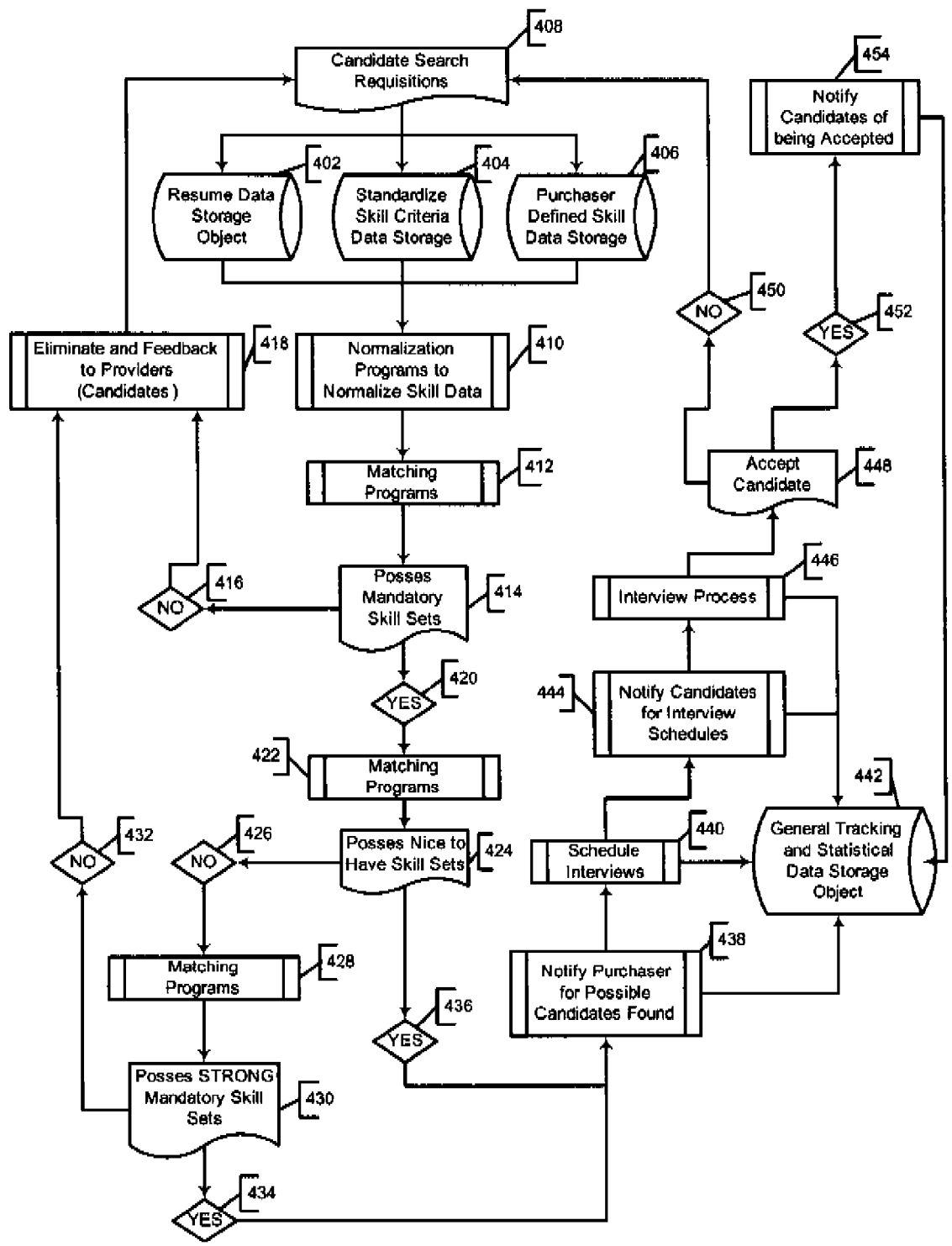
Fig. 17 Selection Process

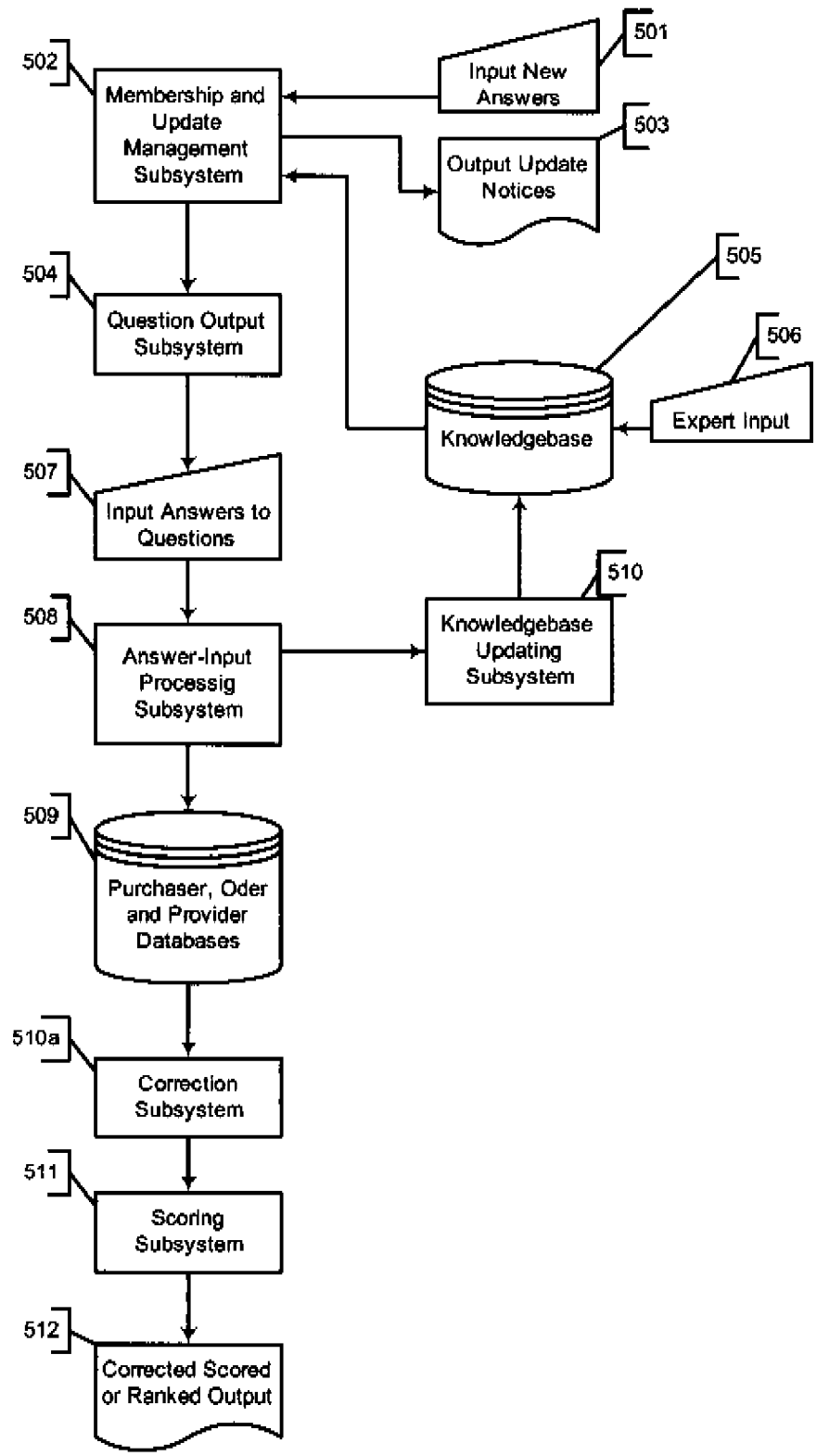
Database Input and Output Fig.18

Database – Reference Tables                Fig. 19

Figure 19.1 Interviews

| |
|---|
| Interview ID |
| Related Virtual Provider ID |
| Date of Interview |
| Place of Interview |
| Interviewer ID |

Figure 19.2 Tests

| |
|---|
| Test ID |
| Related Virtual Provider ID |
| Date of Test |
| Place of Test |
| Tester ID |

Figure 19.3 Order Category Corrections

| |
|---|
| Order Category Correction ID |
| Related Virtual Provider ID |
| Related Order Category ID |
| Testing Correction Factor |
| Interview Correction Factor |

Figure 19.4 Technology Corrections

| |
|---|
| Technology Correction ID |
| Related Virtual Provider ID |
| Related Technology ID |
| Testing Correction Factor |
| Interview Correction Factor |

Figure 19.5 Product Corrections

| |
|---|
| Product Correction ID |
| Related Matched Pair ID |
| Related Product ID |
| Testing Correction Factor |
| Interview Correction Factor |

Database – Reference Tables Fig.20

Figure 20.1 Order Category Questions

| |
|---|
| Order Category Question ID |
| Related Order Category ID |
| Question |
| Answer 1 |
| Answer1 Correction Factor |
| Answer 2 |
| Answer2 Correction Factor |
| Active? |
| Date Created |
| Date De-activated |
| Tentative? |
| Date Modified |
| Related Expert ID |

Figure 20.2 Technology Questions

| |
|---|
| Technology Question ID |
| Related Technology ID |
| Question |
| Answer 1 |
| Answer1 Correction Factor |
| Answer 2 |
| Answer2 Correction Factor |
| Active? |
| Date Created |
| Date De-activated |
| Tentative? |
| Date Modified |
| Related Expert ID |

Figure 20.3 Product Questions

| |
|---|
| Product Question ID |
| Related Product ID |
| Question |
| Answer 1 |
| Answer1 Correction Factor |
| Answer 2 |
| Answer2 Correction Factor |
| Active? |
| Date Created |
| Date De-activated |
| Tentative? |
| Date Modified |
| Related Expert ID |

Figure 20.4 Experts

| |
|---|
| Expert ID |
| Password |
| Level of Access |
| First Name |
| Last Name |
| Title |
| Department |
| Street Address 1 |
| Street Address 2 |
| City |
| State |
| Postal Code |
| Country |
| Phone |
| Email |
| Active? |
| Date De-activated |
| Reason for De-activation |

Figure 20.5 Number of Questions

| |
|---|
| Number of Questions ID |
| Related Order Category |
| Number of Questions in Interview |
| Number of Questions in Test |

Database – Reference Tables        Fig.21

Figure 21.1 Interviewers

| |
|---|
| Interviewer ID |
| Password |
| Level of Access |
| First Name |
| Last Name |
| Title |
| Department |
| Street Address 1 |
| Street Address 2 |
| City |
| State |
| Postal Code |
| Country |
| Phone |
| Email |
| Active? |
| Date De-activated |
| Reason for De-activation |

Figure 21.2 Testers

| |
|---|
| Tester ID |
| Password |
| Level of Access |
| First Name |
| Last Name |
| Title |
| Department |
| Street Address 1 |
| Street Address 2 |
| City |
| State |
| Postal Code |
| Country |
| Phone |
| Email |
| Active? |
| Date De-activated |
| Reason for De-activation |

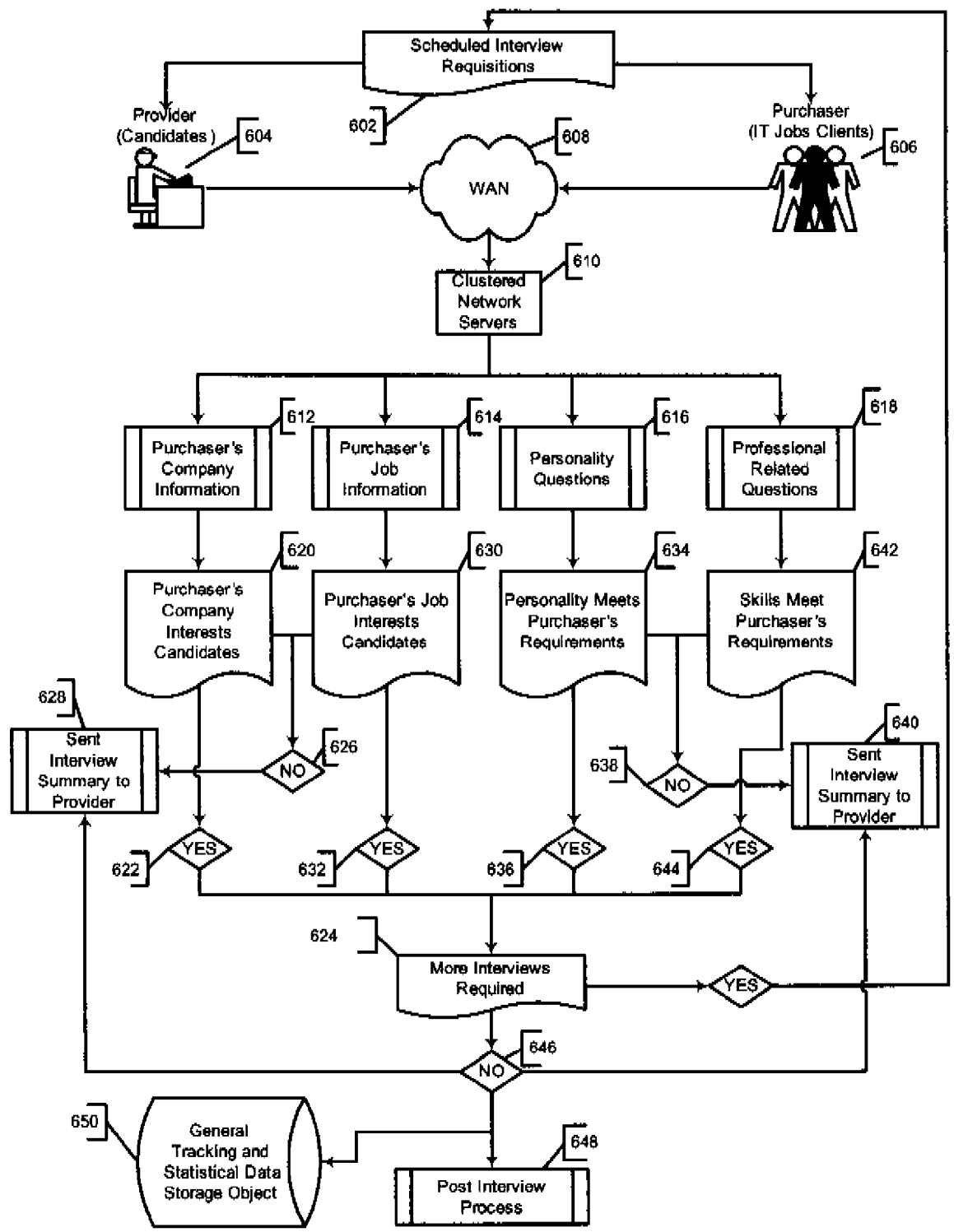

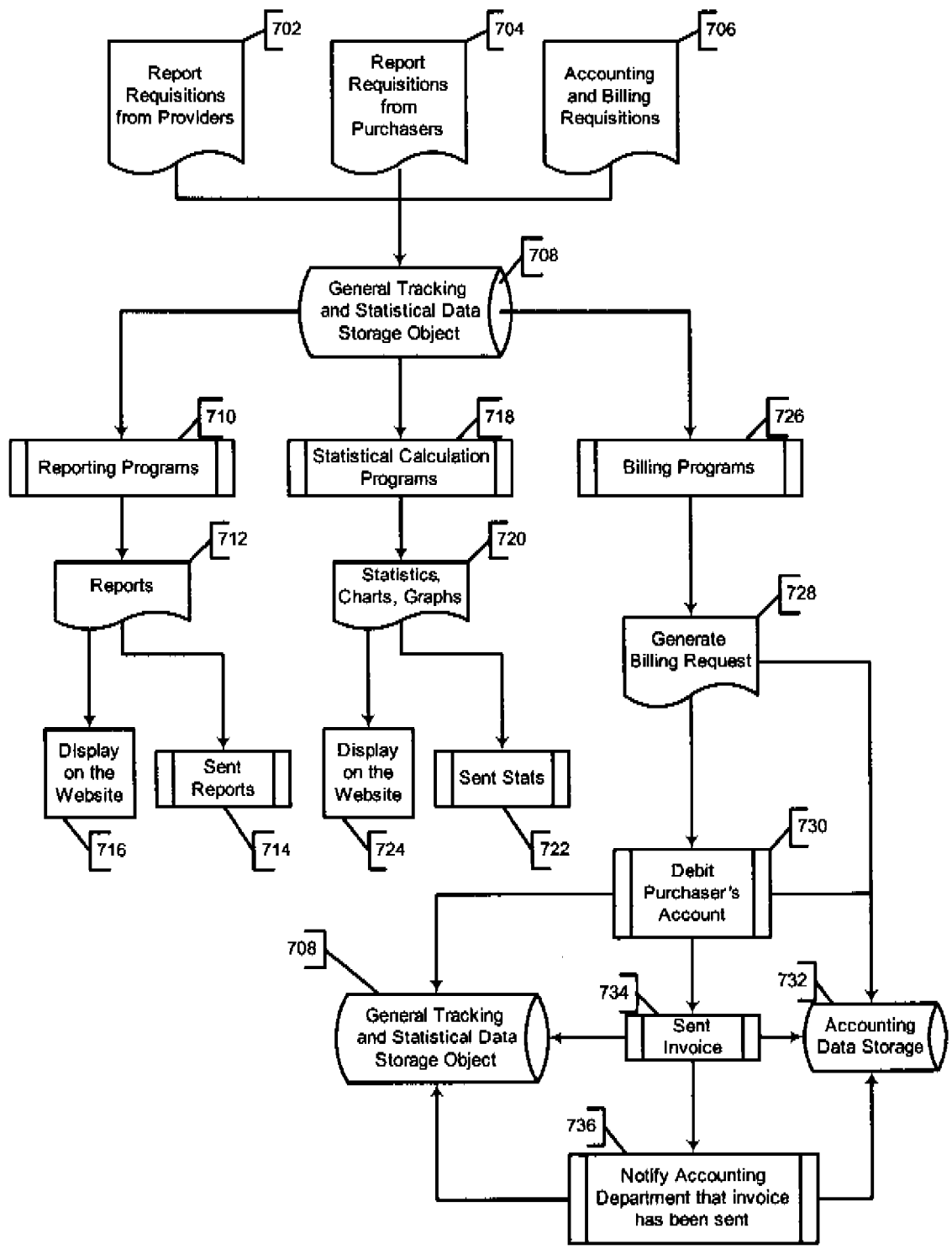

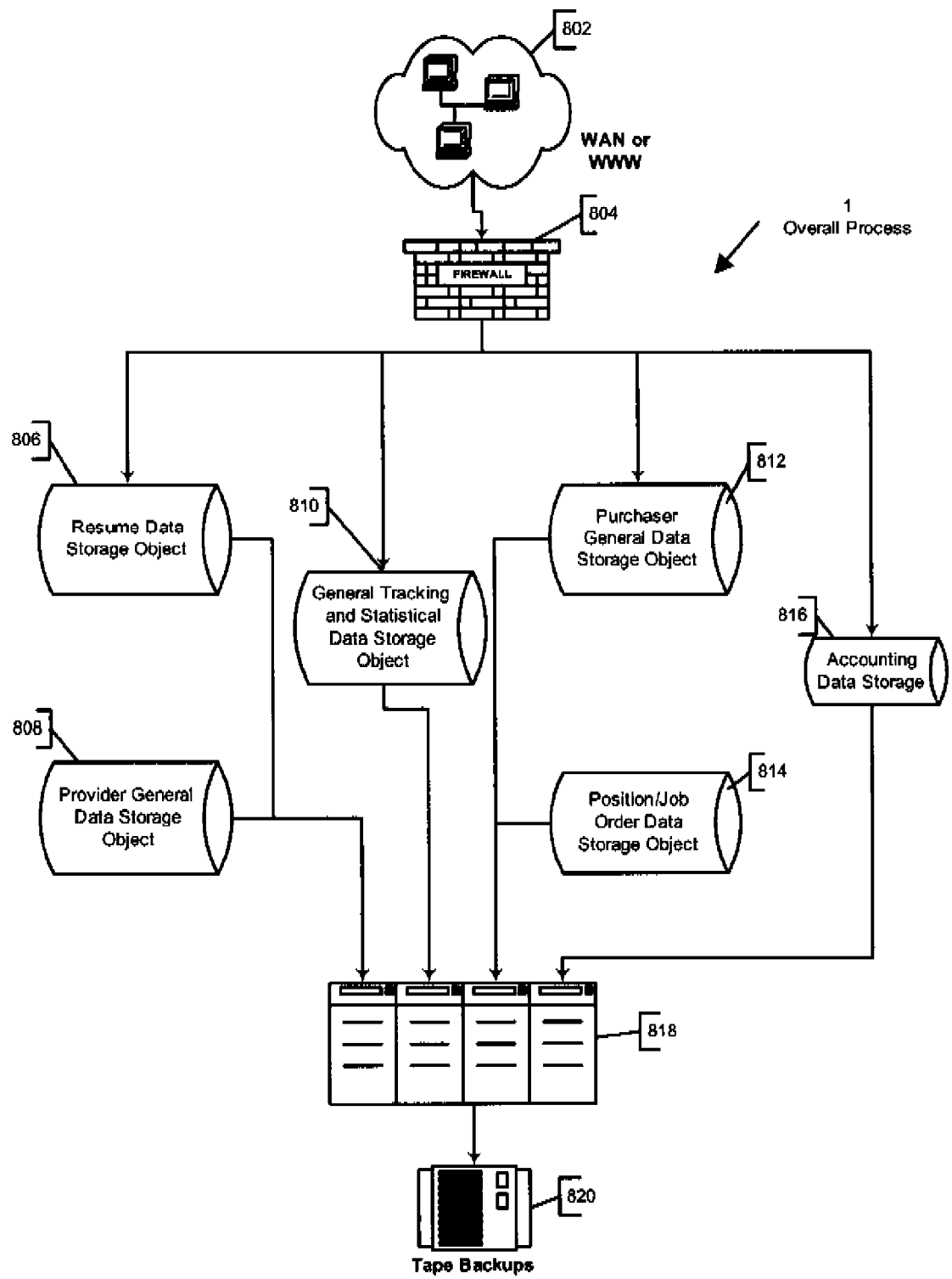

AUTOMATED SHOPPING SYSTEM AND METHOD FOR THE SELECTION OF HUMAN ENTITIES INCLUDING ITERATIVE SCORING

CROSS-REFERENCE TO RELATED APPLICATIONS

This application claims priority to the following applications. The following provisional patent applications are incorporated by reference herein: "A System and Method for Scoring or Matching Candidates with respect to Pre-Determined Selection Criteria", Ser. No. 60/238,997, filed Oct. 10, 2000; "A System and Method For Testing and Interviewing Candidates According to Pre-Defined Selection Criteria", Ser. No. 60/253,032, filed Nov. 22, 2000 and "An Automated System for Managing Multi-Step Process for the Selection of Human Candidates", Ser. No. 60/268,987, filed Feb. 14, 2001. The nonprovisional patent application (Parent), to which this application is a divisional thereof, "Automated System and Method for Managing a Process for the Shopping and Selection of Human Entities, Ser. No. 09/973,251, filed Oct. 8, 2001, that issued as U.S. Pat. No. 7,212,985 on May 1, 2007, is also incorporated by reference herein. Related applications include Ser. No. 11/675,571, filed Feb. 15, 2007, that is a further divisional of the Parent; Ser. No. 11/684,528, filed Mar. 9, 2007, that issued as U.S. Pat. No. 7,487,104, on Feb. 3, 2009, and that is a continuation of the Parent; and Ser. No. 11/684,517, filed Mar. 9, 2007, that is a continuation-in-part of the Parent.

FIELD OF THE INVENTION

The field of invention relates generally to a system and method by which human beings or human organizations seek out, match up or otherwise select other human beings or human organizations on the basis of personal or social characteristics, such as in an employment service or a dating service, with the assistance of automatic information systems.

More particularly, the current invention pertains to a system and method whereby humans or human organizations may be sought out, matched up and/or selected through a series of steps that are managed automatically with little or no human intervention. As part of the system and method, a scoring and ranking technology is described which may be used in such an automatic process or may be used on its own. Methods of communication and response which are suitable for use in such an automatic process, or for use on their own, are described. Optional human intervention during the process may occur. The field of the current embodiment also relates to the software used to carry out the foregoing as well as associated business and compensation methods.

BACKGROUND OF THE INVENTION

The foregoing related applications describe certain background aspects and problems associated with current systems and methods that may pertain to the current invention. The reader is referenced to this information in addition to the following background information.

Hereinafter, the term "human entity" generally refers to one or more human beings or organizations comprising humans. The term "human shopping" generally refers to the process of seeking out, matching up and/or selection of human entities. The term "manage" is also used herein and generally refers to the sequencing, coordinating, tracking and reporting on of various aspects of the system and method of the current invention.

Management Functions

Services currently exist that use automation to help to sequence, coordinate, track and report on the status of the activities involved in the seeking out, matching up and/or selecting of human candidates. Examples of such current services pertain to the process of hiring prospective employees and dating services involving the process of matching people seeking personal relationships. For example, Monster.Com, an Internet-based employment service and job posting board, offers a service called "Momentum." This service was purchased from another company and has been available in some form for several years. Entities which may seek out humans on the Momentum service typically include employers looking for employees, as well as companies such as employee search firms.

Among its various functions, the Momentum service keeps track of the status of the hiring process for job positions offered by its employer human shoppers. It separately tracks the status of each job-seeker being considered for each open employment position. In addition, it allows companies seeking out prospective employees to have more than one open position tracked by the system at the same time. The status information available to a company seeking out prospective employees may therefore consist of status information about several open positions offered by that company.

The Momentum service also offers a calendar scheduling system that facilitates the selection of times for interviews and other meetings between job-seekers and representatives of the prospective employers. In addition, it offers a central repository for interviewers and other staff members to post notes and comments regarding a job-seeker. The Momentum service also offers a central repository for storing e-mail and other messages regarding the hiring process, making it easier for prospective employer's staff members to review such messages.

To summarize, the Momentum service uses the Internet and automation to track the status of the hiring process, report on the status of the hiring process, and store and publish information about the hiring process at a central location. Other services and systems currently available offer a subset of these features, with variations of the same basic ideas.

Despite the level of automation used, the Momentum service, and other existing services and programs referred to in the previous paragraph, require human intervention to manage the process of completing the various steps in the hiring process. As mentioned above, the "management" requiring human intervention may involve sequencing, coordinating, tracking and reporting on the status of the various steps in the hiring process.

For example, in such existing services and programs, if an interview is possible at a given point in the hiring process, a human must typically: 1) decide that an interview is needed, 2) determine who are the individuals that must be present at the interview, 3) decide when and where the interview is to take place, 4) send notes or messages to the various individuals in order to decide when and where the interview is to take place and to notify the participants of the selected time and place, 5) determine which set of questions are to be presented to the job-seeker during the interview, and 6) make sure that the results of the interview are stored or posted in the proper location so that a decision maker can find them when needed.

Even for steps in the hiring process that do not involve any human beings to carry out the major parts of the step, a human is often needed in existing services to carry out some parts of the step. For example, in an employment service, it may be necessary to carry out background checks including credit checks, criminal checks and D&B checks. To use one of these as an example, if a credit check on a job-seeker is needed at a certain point in the hiring process, although an automated system may be used for communication, storage and display of information, a human typically must carry out management functions such as 1) requesting the credit report from one or more credit bureaus, 2) requesting the credit report again if it does not arrive after a pre-determined amount of time and 3) placing the relevant contents of the credit report in the proper location in the automated system so that a decision maker can find it when needed.

At a higher level, a human is typically required in all existing services to 1) determine the correct or desired sequence in which various steps are to be executed, 2) make sure that the various steps executed are in fact executed in the desired sequence, and 3) make sure that no essential steps are left out. Further a human is typically required in all existing services to 1) make sure that the completion (or failure to complete) a step is properly recorded for others to view, 2) actually record the results of each step for others to view, 3) communicate status information about the hiring process for each job-seeker and for each order to the proper persons at the proper times and 4) notify the proper individuals if something has gone wrong, thus requiring higher-level human intervention.

In summary, the foregoing illustrates that at least one human being is needed in order to carry out many functions of the existing systems and methods for human shopping such as seeking out, matching up and/or selecting. This represents a significant drawback of existing systems and methods because the many tasks to be tracked by humans are susceptible to human error. Such errors could lead to inefficiencies in both how the system operates as well as the cost involved in operating the system.

As noted in the previous paragraph, even though services and programs that use automation to facilitate the hiring process exist, they all rely upon human intervention to manage the steps in the process. This is also true of matchmaking and dating services, as well as services that help in shopping for expert consultants, where multiple steps are involved in the shopping and selection process. In other words, all known systems that involve sequencing, coordinating, tracking and reporting on status of human shopping and selection processes use human beings in these management functions. None of these systems effectively automate, with little or no human intervention, the management functions in human shopping and selecting processes. Reasons for this may include the following:

First, the people that created these systems typically believe that human judgement is needed in order to make many of the lower-level decisions related to the shopping and selection of human beings or human organizations, such as interpreting the results of interviews or testing. Accordingly, these same people generally conclude that humans are also needed for the management functions. Second, humans have always played the management role, therefore it is concluded that humans must still be needed in this role (i.e. social inertia). Third, there have been insufficient economic incentives to eliminate humans from the management role. Fourth, it is not clear that automation can successfully carry out the management role.

Whatever the reason or combination of reasons, automation has not been used in the management role except in the limited role to assist a manager in handling communications and record keeping. No one has attempted to substantially or completely automate the management of the process of selecting humans.

Scoring and Ranking

When considering the steps that may occur in the overall human matching, selection or shopping process, certain steps may involve the ranking or scoring of human candidates with respect to selection criteria. Current systems involving employment and dating services include these steps.

Typically, there are three parties to such services: two of these parties each provide a description of the kind of person, organization, position or job they are each looking for and/or a description of relevant aspects of themselves. These parties may generally be referenced herein as "shoppers." A third party is a service that attempts to score and/or rank the degree to which pairs of shoppers match each other.

Distinctions exist between shopping or matching services that seek human entities (and the roles or functions which human entities perform) and shopping services that seek non-human objects such as books or other products. It should also be noted that a shopping or matching service may also seek services provided by humans, but may still treat the services as if they are non-human entities, i.e. by not taking into consideration personal and social characteristics regarding the services.

Services that deal with non-human entities may generally not require the same level of complexity or subtlety in the methods used to locate, rank or score entities to be selected. This is partly because (1) non-human entities are subject to more tangible and quantifiable description, (2) measurement of human personal and social characteristics such as intelligence, skills, attitudes, values and character is fundamentally imprecise and changes over time, (3) requirements in the areas of human personal and social characteristics is more dynamic for each shopper, i.e. each shopper may frequently alter their requirements over time and (4) the consequences of an error in selecting such non-human entities may be generally less than selecting human entities.

A distinction can be made between a human shopping service that deals with "static" vs. "dynamic" characteristics. In an employment service, for example, the process of locating and selecting a secretary is considerably less complex than the process of locating and selecting a computer programmer expert in the field of wireless devices. This is partially because the requirements for a secretary are relatively static, whereas the requirements for the computer programmer may change every month as the technology evolves, and may thus be dynamic.

A human shopping service or process may be generally described as "symmetrical" or "non-symmetrical." A symmetrical service or process is one in which human entities on both sides of the match sought to be made, use the same or substantially the same characteristics and methods to locate, score, rank and/or select appropriate human entities on the other side. Examples of symmetrical services are dating, matchmaking and barter services.

A non-symmetrical service is one in which human entities on each side of the match to be made use different (or a mix of different and the same) characteristics and methods to locate, score, rank and/or select human entities on the other side. Typically, though not necessarily, in a non-symmetrical service or process, human entities on one side offer to pay for services provided by the human entities on the other side. Examples of non-symmetrical services or processes are employment services (matching employers with employees), contractor services (matching contractors such as building contractors with a sub-contractor), professional locator services (in which patients find doctors or human shoppers find lawyers), talent agencies (in which studios find actors or event planners find entertainers), and so on.

In non-symmetrical services, the party which is offering to pay to engage the other party may be more interested in the personal and social characteristics of the party offering to perform a service, than the other way around. For example, in an employment service, companies seeking employees are likely to be more interested in the intelligence and attitudes of people seeking employment, than the other way around. However, this is not necessarily the case. Even in a symmetrical service, the nature of the information acquired and stored about each side need not be exactly the same.

Hereinafter, the term "selection criteria set" generally refers to a description of whatever it is a human shopper is looking for and/or a description of the relevant characteristics of that human shopper him or herself, i.e., the characteristics of that human shopper which may be evaluated by human entities with which that human shopper may engage. Some human shopping services make an explicit distinction between these two kinds of selection criteria.

For example, a dating service may accept and store separately: (1) a description of what kind of person each human shopper is looking for and (2) a description of each human shopper's relevant personal attributes. For example, a service may accept and store separately the fact that a shopper likes moonlit walks on the beach as well as the fact that he/she is looking for others that like moonlit walks on the beach, i.e., separate information about the shopper him/herself and the person the shopper seeks. A different service may not make this distinction clearly and may store simply "interested in moonlit walks on the beach" without clearly distinguishing whether this information pertains to the shopper or the person sought by the shopper.

In many human shopping services, a human shopper may be permitted to submit more than one "selection criteria set". That is, a human shopper may provide different descriptions of him or herself or different descriptions of the entity sought, e.g. one or more types of jobs or dates, that the human shopper can offer or is looking for, permitting a single human shopper to be looking for more than one type of entity.

For example, a person looking for a job may be qualified for more than one type of job. Similarly, companies may be looking for more than one type of employee such as where the employer needs to fill more than one type of job position at any given time. Each job position may have a different selection criteria set, i.e. a different set of requirements and skills, including personal characteristics and character traits, as to what kind of employees would best fill that job and/or a different description of the job itself.

In the employment service example, two jobs offered may be identical in every way except that in one position an employer seeks a "dependent" type of person whereas in another position that employer seeks an "independent" type of person. Similarly, an individual human shopper seeking employment may provide more than one selection criteria set, i.e. more than one description of him/herself (emphasizing different skill sets), along with descriptions of more than one type of job that she or he can perform. Many services explicitly permit multiple selection criteria sets for each human shopper, but request and store general information about each human shopper only one time, so that the human shopper does not have to enter general information about itself more than one time.

Human shopping services use various different formats for describing selection criteria sets, including for example: (1) free text, (2) multiple-choice and/or (3) audio/visual. An example of free text is a resume submitted by an individual looking for employment. An example of multiple-choice is a questionnaire or checklist in which acceptable answers are limited to those provided in or with the questionnaire or checklist. An example of audio/visual is a photograph of an individual human shopper or a working environment, or a recording of an interview. Many human shopping services allow selection criteria sets to consist of information in more than one of these forms.

One problem with existing human shopping systems is as follows. When multiple-choice is used in a selection criteria set, there is typically just one or a very small number of different sets of questions provided by the human shopping service. For example, in a dating service, a different set of questions may be provided for a human shopper seeking a casual relationship as opposed to a human shopper seeking marriage or serious relationship. As an another instance, in an employment service, a different set of questions may be provided when an employer seeks to fill a technical job than when an employer seeks to fill a management or clerical job. However, in both cases, further detail is not requested or considered.

For example, in the case of an employment service within the category of technical jobs, the kinds of questions and multiple-choice options relevant to a systems programming job may be substantially different than the kinds of questions relevant to a systems administration job. However, the questionnaire actually provided by a certain service may be the same for both positions.

As a further example, in a matchmaking service, a human shopper seeking a serious relationship may be interested in marriage or just a non-romantic friendship, yet the service may not request or store such preferences. Similarly, in a matchmaking service, among individuals that state an interest in marriage, the kinds of questions relevant to a religious individual may be substantially different than those relevant to a non-religious individual. Yet both categories of human shoppers (religious and non-religious) may be presented with the same set of questions since they have the same stated purpose (marriage).

Further, there may be only a small number of multiple-choice options within each multiple-choice question. For example, in an employment service, in hiring a computer programmer, the service may ask in a multiple-choice question, "Please indicate the programming methods you are experienced with from among the following list", but may not include methods that have been developed in the last 6 months, such as Aspect programming or Extreme Programming.

Thus, one of the problems with existing services is that, even if there are several different sets of questions asked for different purposes, the number of different sets of questions is not large enough to reach highly useful conclusions. In sum, the use of a small number of different sets of questions and small number of different options within questions generates conclusions that are of limited usefulness to the human shoppers. It can be appreciated how this will lead to inefficiencies and/or errors in the matching of human shoppers and the humans they are seeking.

Before continuing, it will be helpful to comment on what it is meant by degrees of "useful", in the context of a human shopping service. In a human shopping service, in order for the conclusion reached or suggested by the service to be highly useful, the service is preferably capable of selecting human entities which turn out to be good selections most or some acceptable percentage of the time. Inappropriate recommendations may waste the time and resources of human shoppers. To put this point more precisely, the frequency at which a human shopping service is believed by human shoppers to generate inappropriate selections or recommendations may determine the amount of additional interviewing and/or testing that the human shoppers believe they have to perform outside of what is provided by the service.

As discussed above, a human shopping service that uses only one or a small number of question sets and a small number of multiple-choice options may not generate highly useful results. This is because the particular sets of questions and multiple-choice options available do not exactly or at least efficiently serve each human shopper's purpose.

There are some employment services which do maintain a large number of different question sets and multiple-choice options. For example, one service asks a job-seeker who is interested in a technical job to select (from a multiple-choice list) what job category the job-seeker is interested in, such as "network administration", "web site development", etc. Once the job-seeker makes this selection, the service asks the job-seeker to select (from a multiple-choice list) one or more particular technology skills that the job-seeker possesses. This multiple-choice list is different depending on the job category selected earlier.

This requires that the service create a database of job categories and technology skills, with each job category related to one or more technology skill and with each technology skill related to one or more job categories. A database (generally referred to herein as the "knowledge-base") of this kind may have more than two levels. For example, a four-level knowledge-base might consist of job categories (e.g. network administration), technology skills (e.g. routers), specific brand skills (e.g. Cisco-brand routers), and specific model skills (e.g. Cisco 5300 routers). It should be noted that reference to particular manufacturers and products herein is by example only. There is no theoretical limit to the degree of specificity and number of levels in this knowledge-base.

Because technology is continuously changing, technology skills and job categories and the relationships between them are continuously evolving. This requires that the service update the knowledge-base of technology skills and job categories continuously, a costly and difficult effort since it requires detailed and current knowledge of all the areas of job categories and related technology skills. Furthermore, the process of updating may require substantial human input to actually provided the updated information into the system. And this human input would typically require the involvement of human experts that have the updated information in the first place.

In an automated system, the process of updating may entail the use of "expert system" technology. An "expert system" as that term is used herein, generally refers to an automated system which attempts to emulate the functioning of a human expert in a given field to solve a problem, diagnose the cause of a condition, schedule an event or recommend action. In a typical expert system, the method by which the conclusion is reached is difficult to define rigorously. Examples in current use are automated systems that perform medical diagnoses, recommend repair procedures for complex machines such as airplanes and power plants or make credit-granting decisions.

Expert systems generally fall into two very broad categories: (1) "forward chaining" or forecasting, and (2) "backward chaining" or diagnosing. In a "forward chaining" expert system, the expert system is used to predict an outcome or event. An example is a logistics system, used to predict the best possible routes for vehicles moving large numbers of shipments between large numbers of locations. In a "backward chaining" expert system, the expert system is used to determine the cause of an event or diagnose a condition. An example is a medical diagnosis system, used to determine the cause of symptoms displayed by a patient.

There are various characteristics common to most expert systems.

1) Expert systems are often characterized by a process wherein data is input in many stages, and wherein the particular data input that the system requests or gathers at any particular stage is dependent upon data input to the system in prior stages. For example, an expert system performing medical diagnoses might first request known symptoms exhibited by the patient. Based upon the particular combination of symptoms received by the system, the system may then request that certain tests be performed upon the patient. The results of these tests are then input to the system. The system may then combine the results of these tests with the original group of symptoms and arrive at a diagnosis, or may then request additional tests or information before a diagnosis is determined.

2) Expert systems typically make use of a stored database of information about the field of knowledge in general and possibly about the history of the particular individual (person, airplane, etc.) under examination. This information can be used both in the process of determining what additional information is needed at interim stages of the decision-making process, and in the process or reaching a final conclusion.

3) Expert systems often reach conclusions that are not certain. In light of this fact, an expert system may output a probability that a conclusion is correct and/or may output multiple possible conclusions.

4) Expert systems are often designed to learn from experience. In other words, after the system outputs a conclusion, the results of applying that conclusion are later input back to the system and stored as part of the system's database. These results may then be used by the system to modify future conclusions in similar cases.

Interviewing and Testing

Current systems and methods that seek to match human entities, e.g., a dating service that matches two individuals for a date or an employment service that matches prospective employers and employees, generally rely on the information provided by each human entity in order to perform the match. As can be appreciated, the success of the match generally relies on the accuracy of the information provided by the human entities.

In such systems or methods, problems arise where the information provided is not accurate. Inaccurate information may be provided inadvertently or intentionally. For example, a form or other means used for a human shopper to input information into a system may be mistakenly filled out. Also, an individual may misrepresent his or her characteristics in hopes of being matched with a "better" date or a prospective employee may misrepresent his or her qualifications in hopes appearing more qualified to get a better job. Either way, the resulting match is not desirable or at least is not as beneficial as it otherwise should be.

Accordingly, there is a need to verify the accuracy of information provided by human shoppers. There is also a need to correct the information where necessary. Process that may be used to address such needs are generally referred to as "inspection and verification" processes. Current systems and methods for human shopping may utilize testing and interviewing in order to carry out inspection and verification. Such testing or interviewing may indeed expose inaccurate information. For example, an interview may bring to light inaccuracies contained in a job application or resume. As another example, videotapes of individuals seeking a date are used by dating services to provide better information than that which might be contained in a written questionnaire profiling the person.

The process of testing and interviewing typically used, however, is normally an inexact process for inspection and verification, since the processes typically used do not attempt to accurately inspect and verify every claim made or piece of information given by a human shopper. For example, the same general purpose test may be given to many employment job-seekers who differ significantly in the claims they have made and the jobs for which they are applying. In this case, it can be appreciated that one single test will likely not reveal inaccuracies that may exist in information provided by various people. But to customize the test for each employee and each job position would generally require too great an effort.

Similarly, in the same context, when an interview is carried out during the hiring process, the interviewer may be able to concentrate on the particular claims of the job-seeker and the job requirements. However, there is no assurance that any particular interviewer is expert enough to properly evaluate the claims of the job-seeker on every point that may be relevant and/or necessary.

Accordingly there is a need for automation in the testing and/or interviewing of human entities so that interviewing or other verification procedures may be more efficiently used. There is also a need for an interview or testing procedure that is "intelligent" or otherwise based on a knowledge-base of questions and answer options that reflect expertise in a given area. In this way, the information or claims made by a human entity may be more effectively verified and/or corrected.

And because technology and human culture are continuously changing, there is a need for any such knowledge-base of questions and answer options to continuously evolve for the system to be useful. For example, in an employment service, this may require that the service update the knowledge-base of technology questions and answer options continuously so that prospective employees are asked questions that reflect the current state of technology that may be desired by the employer. To this end, there is a need for the efficient and cost-effective updating of any such knowledge-base.

SUMMARY OF THE INVENTION

Various aspects of the invention are summarized as follows. It should be noted that the listing of inventive aspects separately does not preclude their use together. And as discussed herein, combinations of inventive aspects are also part of the current invention.

Management Functions

The current invention involves a system and method for automatically managing and carrying out the process in which human shoppers may seek out, select and/or be matched with other human entities for any purpose. This aspect of the invention, which may occur in an iterative fashion, generally includes the overall management of the various steps of the process, and greater detail on carrying out some of the specific steps of the process, including scoring and ranking, and including inspection and verification by means of automated testing and interviewing.

Some examples of the application of this aspect of the invention are employment (i.e. selecting job-seekers to be hired for a job and conversely selecting a job or company to be hired by), expert selection (i.e. selecting an appropriate expert such as a doctor, attorney, management consultant, computer expert, expert witness in legal proceedings or other specialist), and matchmaking (selecting persons for dating or marriage.) A typical selection process includes multiple steps such as background checking, testing, interviewing, and mutual acceptance by both parties etc, and this aspect of the current invention involves the management of one or more of such steps.

One aspect of the invention involves the linking of the individual steps in the selection process by means of automated sequencing, coordinating, tracking and status reporting functions. Whether or not there is human intervention at some points, or humans carry out particular steps, the current embodiment reduces the intervention by humans, thus potentially reducing cost and errors. It also potentially increases the pace at which the process may be completed end-to-end, and also potentially increases the number of shoppers that can be considered, thus facilitating selection of better matches from the pool of available shoppers. Accordingly, another aspect of the current invention involves increasing the efficiency with which the selection process may occur.

The current invention also provides opportunities for income generation and revenue streams. Accordingly, another aspect of the current invention is the business method and associated revenue opportunities associated with the system and method described herein.

Scoring and Ranking

Another aspect of the current invention includes a system and method for gathering information on a human shopper's attributes and on selection criteria. To this end, forms, applications or questionnaires may be used to gather such information and may be intelligent or "adaptive". What this means is that as a user supplies information in the form, application, or questionnaire, further questions and options may be presented to the user based upon the answers to previous questions and also based upon data contained in a relational database (the "knowledge-base"). This knowledge-base preferably contains the data for constructing possible questions and for determining the multiple-choice options within questions. Accordingly, another aspect of the current invention involves an adaptive knowledge-base to obtain information from human shoppers, e.g., prospective employers, employees, dates, etc.

It is a fact that the real world of human society and technology is continuously evolving. So in another aspect of the current invention, to control the cost and difficulty of maintaining the "knowledge-base" to track changes in the real world, the knowledge-base is preferably automatically maintained. What this means is that new information may be acquired automatically from the users of the system or from other sources such as experts and integrated into the knowledge-base.

For example, if the current embodiments are used for an employment service, employers may be asked to provide detailed information about the technologies and skills they are seeking. If the technologies and skills an employer is seeking are not already present in the knowledge base, this aspect of the invention may cause the new technologies and skills to be added to the knowledge-base. The same concept of an automatically maintained knowledge-base may be used for any other applications of the current embodiments. Accordingly, another aspect of the invention regards automatically updating the knowledge-base.

As the knowledge-base evolves to reflect the current reality of human society and/or technology, existing human shoppers already present in the system may have an interest in modifying their stored information to respond to and/or otherwise reflect new information in the knowledge-base. For example, human shoppers whose information is already in the system may wish to answer new questions or options within questions. Accordingly, another aspect of the invention involves providing the opportunity on an automated basis for existing human shoppers to add information to their previously stored records in the system.

This aspect of the current embodiments may involve a business method in which human shoppers may be charged for the privilege of updating their records in the system after the knowledge-base changes. This aspect of the current embodiments may also involve a business method in which human shoppers are charged on a transaction basis whenever they take advantage of the opportunity to update their records based upon new questions and options in the knowledge-base.

Another aspect of the current invention involves a method and system of iterative scoring and ranking the degree of match between pairs of human shoppers. The total score for a given pair of human shoppers may be the sum of the scores earned by that pair of human shoppers with respect to each individual selection criterion in each of the human shopper's selection criteria sets. The score earned with respect to each selection criterion may consist of the product of some or all of various factors including: (1) whether or not the other human shopper satisfies that criterion to any degree, (2) the quantifiable degree to which the other human shopper satisfies that criterion, (3) a weighting factor that may describe the relative importance of that criterion, (4) a correction factor based upon objective testing, (5) a correction factor based upon interviewing and (6) a correction factor based upon reference checking. Other factors may be used in scoring the degree of the match between pairs of human shoppers.

Another aspect of the current invention regards business methods associated with the system and method of the current embodiments. For example, memberships and revenue therefrom may be obtained through those seeking to participate in the system. Other types of revenue, for example advertising revenue, may also be derived through human shopper's use of the system.

In summary, with respect to scoring and ranking, the method and system of the current invention may differ from current systems or methods in at least several fundamental ways.

1. Adaptive data input forms, used for gathering information about human shopper attributes and selection criteria, based upon a knowledge-base. Such forms may be intelligent in that they adapt to obtain information based on a human shopper's prior answers and/or information contained in a knowledge-base.

2. A knowledge-base that may be maintained automatically using information gathered from human shoppers and/or information gathered by through "data mining" processes.

3. Technology to permit human shoppers to update their stored records in response to new questions and options in the knowledge-base.

4. Business processes that permit charging human shoppers for the opportunity to update their records or for the act of updating their records.

5. A comprehensive, iterative scoring system appropriate for an automated selection process including quantifiable measures and including verification and reference checking steps.

6. Business methods associated with the foregoing.

Combinations of the foregoing also exemplify the differences between the current embodiments and the prior art. However, it should be noted that the foregoing list is not exhaustive as to differences over existing systems or methods.

These aspects of the current invention generally enable automation of the process of scoring and/or ranking human entities, and therefore increases the usefulness of the overall human shopping process. These aspects of the current invention may also be used for many purposes including, but not limited to, dating and employment services. They may be utilized for an on-line service, e.g. Internet or World Wide Web-based service, and/or for off-line services.

Interviewing and Testing

In another aspect of the current invention, interview and test questions, along with information needed for scoring answers, are stored in a knowledge-base (a database of questions, answer options, and related information.)

In the case of a test, the person being tested may answer questions that may be printed, displayed or spoken by an automated mechanism (e.g. an avatar or an animated character). Answers may be written, spoken or entered directly into a system by the person being tested. Direct entries may be by means of a computer keyboard, telephone keypad, touch screen mechanism or any other mechanism for direct entry of data into a system by a human being. Spoken answers may be interpreted and entered in the system by means of a voice-entry mechanism.

In the case of an interview, the system described herein may be used in several ways: 1) no interviewer is used; the interviewee simply answers questions that are printed, displayed or spoken by an automated mechanism (e.g. an avatar or an animated character); or 2) questions are printed or displayed for use by a human interviewer; answers may be written, spoken or entered directly into a system by the interviewee. Spoken answers may be interpreted and entered in the system by means of a voice-entry mechanism. Voice recognition may include a method by which the voice recognition system tells the speaker what the system understood the speaker to say and then immediately thereafter may give the speaker an opportunity to correct the answer as initially understood by the voice recognition subsystem.

In another aspect of the current invention, the system and method may use tests or interviews of a human shopper to iteratively correct and/or verify previous scoring and ranking (e.g., of the type described in the above section) that exists for that human shopper. This may involve a correction factor based upon objective testing or a correction factor based upon interviewing. That is, if a human shopper had been previously scored, this scoring information may be used as the starting point for an interview or test administered by this system. Answers to interview and/or test questions may be used to iteratively verify or correct the previous scoring. The testing and interviewing aspects of the current invention may also include a method for generating the correction factors.

Another aspect of the current invention regards specific methods for testing and/or for interviewing. Interviewing may be used for those questions which are best handled in a face-to-face environment, such as questions related to character and personality. An interview may also be used to ask additional technical questions, to verify that there was no cheating when the testing was done or to ask newer questions that were not available at the time the testing was done.

In another aspect, the current invention may generate intelligent or "adaptive" tests and/or interviews, i.e. tests and interviews in which the questions and answer options are based upon a specific pair of shoppers and their respective selection criteria sets, rather than being fixed for all shoppers. The test or interview so generated may therefore be different for every pair of selection criteria sets.

For example, in an employment service, every job applicant may receive a somewhat different test and/or interview dependent upon what is known of the applicant's requirements and attributes (i.e. the applicant's selection criteria set) and the requirements and attributes of the job position being offered (i.e. the job's selection criteria set.) In this example, there would be no point in asking questions about skills which the job-seeker does not claim to possess or which are not required for the job. Similarly, extra testing and/or interview time may be devoted to verifying that the job-seeker does in fact possess particular skills which are highly valued for the job position.

As another example of dependency on a specific pair of selection criteria sets, a human shopper seeking a job may have a particularly high or a particularly low initial score in a given area. In this instance, a larger number of questions may be provided during the interview and/or test in that particular area (than other areas) to verify and correct the score accurately.

The knowledge-base referred to above may contain data to construct all possible questions and multiple-choice options within questions. A noteworthy aspect of this aspect of the invention is that the selection and sequence of questions asked in a test or interview can be adaptive in real-time—that is, the questions asked may be dependent upon the answers to previous questions in the same test or interview. This dependency may be determined by information contained in the "knowledge-base" referred to earlier.

For example, a person being tested or an interviewee may answer a question incorrectly. But if there is reason to believe that the person should have answered the question correctly, this aspect of the invention may result in the system and method subsequently asking one or more questions dealing with the same subject area. This avoids misunderstandings regarding the first question. As another example, if answers to previously asked questions indicate a large correction to the score in a particular area, or conversely no correction at all, additional questions may be asked to verify and correct the score accurately.

Another aspect of the current invention facilitates continuous updating of the knowledge-base to reflect changes in technology and society. As such, the knowledge-base may be dynamic, not static. This is generally related to the concepts of updating described earlier in the context of scoring and ranking (summary section 4.2 above). More specific to the current context, new information may be acquired automatically from experts and integrated into the knowledge-base.

For example, experts may be contacted automatically as new technologies, products, skills, categories, etc. are added to the knowledge-base. The experts may then contribute new test and interview questions and answer options. Experts may also be contacted automatically to review and update existing questions and answer options. These features make the testing and interviewing aspects of the embodiments described herein able to produce highly useful results as technology and society evolve, at reasonable cost.

As the testing and interviewing knowledge-base evolves in this way to reflect the current reality of human society and/or technology, existing human shoppers already present in the system may have an interest in modifying their stored information to reflect the questions. An aspect of the invention described herein provides the opportunity for existing human shoppers to answer new questions. This permits human shoppers to improve their knowledge and then update their ranking in the system.

In another aspect of the current invention, business processes and associated technology are involved in which human shoppers may be automatically charged for the privilege of updating their correction factors as generated by testing and interviewing. Alternatively, human shoppers may be charged on a transaction basis whenever they take advantage of the opportunity to update their correction factors based upon new questions and options in the knowledge-base.

In summary, the aspects of the invention described in this section differ from prior art in the area of testing and interviewing in at least the following ways:

1. Answers to questions may produce correction factors that may then be used to correct previously recorded scores for a human shopper. The application of correction factors to previously recorded scores for a human shopper can be handled automatically.

2. Questions presented to a human shopper in a test or interview may be intelligent or adaptive, in that they may depend on specific selection criteria sets. This is in contrast to systems where the same test or interview is used for all shoppers regardless of their selection criteria. Questions may also depend on previously stored scores, created during the application stage.

3. Questions in a test or interview may be adaptive in real-time. That is, they may depend on the answers to previously asked questions in the same test or interview.

4. Methods are provided to permit human shoppers to periodically update their correction factors in response to new questions in the knowledge-base. This is particularly important as it permits human shoppers to reflect new learning since the last test or interview. This encourages human shoppers to study and learn based upon their performance in prior tests or interviews.

5. Business processes are provided that permit charging human shoppers for the opportunity to update their records as described above.

6. An interview and/or test may be presented by an automated system, optionally using voice and/or video output, including optionally an avatar or simulated interviewer. Answers may be input using a multiple-choice check-off form on paper or automated system, through a computer keyboard or phone keypad, on a touch screen monitor, through voice recognition, or through any other means by which answers can be communicated to an automated system.

7. Methods are provided to contact experts in order to add or modify questions and answers. This may be handled automatically.

As a result, these aspects of the current invention both enable automation of the process of testing and/or interviewing human shoppers, and increase the effectiveness and accuracy of this process. These aspects of the current invention may be used for many purposes including, but not limited to, dating and employment services. It may be used for an on-line service (e.g. Internet or World Wide Web-based service) and/or for off-line services.

Non-Symmetric and Symmetric Embodiments

Another aspect of the current invention pertains to how the above-described aspects pertain to non-symmetric and/or symmetric embodiment, since there may be differences between these two types of embodiments. For example, in an employment service (as an example of a non-symmetric embodiment), the selection criteria sets may be significantly different for job-seekers than for employers. For example, an employer may be interested in knowing attitude and character traits about potential employees, whereas potential employees may not be interested in learning about the attitude and character traits of the employer. However, the job-seeker may be interested in learning about some aspects of the corporate culture of the employer's organization. This results in differences in the information requested of and gathered by each category of shopper.

In addition, the inspection and verification steps may be different for the two categories of shopper. For example, using an employment service again, employers may test and interview employees to verify information given earlier about skills and personal characteristics, whereas potential employees may not test and interview the employer when using these embodiments. For the above reasons, in a non-symmetric embodiment, there may be substantial differences between the steps that are executed, the information stored, and the knowledge-base used for the two different categories of shoppers, i.e., the prospective employer and employee.

In a symmetric embodiment, on the other hand, the steps that are executed, the information stored, and the knowledge-base used may be substantially the same for all shoppers. An example of a symmetric selection process is a dating service or an interpersonal relationship matchmaking service. In a symmetric selection process every human shopper is a potential match for every other human shopper and every human shopper is treated by the current embodiment in the same way.

The differences between symmetrical and non-symmetrical embodiments are discussed further below. In connection therewith, how the steps in the overall process and system are executed, e.g., how they may differ based on the embodiment involved, are also discussed.

BRIEF DESCRIPTION OF THE DRAWINGS

FIG. 1 is a flow chart depicting the overall process of the current invention.

FIG. 2 is a flow chart depicting a provider data entry process.

FIG. 3 is a flow chart depicting a purchaser data entry process and a purchaser order entry process.

FIG. 4 shows a system-wide database.

FIG. 5 shows a purchaser database.

FIG. 6 shows an order database.

FIG. 7 shows a provider database.

FIG. 8 shows a database schema for resume data.

FIG. 9 shows a database schema for provider general data.

FIG. 10 shows a database schema for purchaser general data.

FIG. 11 shows a database schema for purchaser order data.

FIG. 12 shows a database schema for general data and tracking data.

FIG. 13 shows a database schema for accounting information.

FIG. 14 shows a block diagram showing management functionality.

FIG. 15 shows a block diagram showing methodology for receiving information and for performing matching and/or scoring operations.

FIGS. 16 and 20 together show a knowledge base database.

FIG. 17 shows an overview of the selection process.

FIG. 18 shows a block diagram regarding interviewing and testing.

FIG. 19 shows an interview and testing information database.

FIG. 21 shows an interviewer and tester information database.

FIG. 22 shows an interview process.

FIG. 23 shows a reporting and tracking process.

FIG. 24 shows internal data management and security.

DETAILED DESCRIPTION OF THE PREFERRED EMBODIMENTS

Preferred embodiments of the current invention are now described with reference to the figures. Certain embodiments discussed herein relate to employment and dating services. However, the current invention may be used in any application involving the seeking out, selection and/or matching of humans. Accordingly, the current invention is not limited to only the employment or dating applications.

Implementation Methods

The embodiments described herein may be implemented through a computer program (or group of computer programs) stored on magnetic storage devices and running on computer hardware and/or software. However, other suitable means to effect the embodiments may be used.

These embodiments may be implemented in different computer environments. For example, the embodiments may be implemented on private shared computer(s) (also known as servers) with users accessing those servers using serial terminals, a local area network, a virtual private network (VPN), or any other method of accessing a private shared computer. A preferred implementation of the current embodiments is through the Internet, since this allows easy access from anywhere using just about any kind of PC as a user station.

As another example, these current embodiments may be implemented on a combination of the above two environments. In this implementation, one or few users or human shoppers may access the current embodiments using terminals, a local area network or a virtual private network, while other users or human shoppers would access the current embodiments over the Internet.

Regardless of the environment used, those skilled in the art will recognize that automated processing of the human shopping process may be effected in many different ways. For example, there may be one or more servers (e.g. an application server and a database server). Furthermore, processing may be shared between the server(s) and intelligent user stations (e.g. PCs, thin clients, etc.). In heavily-used applications such as those accessible to the public, it is preferred to split the processing load between an application server and a database server. In implementation, the processing done by user stations may be limited to the functionality available from commonly-used World Wide Web browsers running on PC's.

Non-Symmetric Embodiment

The first embodiment described herein is a non-symmetric embodiment such as an employment service. Although we use particular applications (such as an employment application and a dating service application) as examples of these embodiments, the embodiments described are not limited to these specific applications.

Terminology

Some of the terms used in describing the current embodiment include the following to facilitate conveying the current invention. It should be noted that these terms are not intended to limit the current invention.

"Embodiment operator" or "system operator"—A person, company or organization that operates the system of the current invention.

"Shopper" or "human shopper"—An organization or individual human entity that uses the current invention to find a match for one or more sets of requirements. A user can be a "purchaser" or "provider" as defined below.

"Purchaser"—This term is generally used in non-symmetric embodiments of the current invention. A purchaser may be a human shopper that is not typically subject to verification steps such as testing or interviewing. For example, a company that is using the current invention to hire employees is an example of a purchaser. By using the term "purchaser", it is not intended that the purchaser necessarily pays for use of the invention. Nor do we intend or imply that the purchaser will necessarily pay money to the provider. In an employment context, the purchaser may either be interested in hiring personnel for its own use, or the purchaser may be acting as a representative of another organization or individual that is interested in hiring. Typical purchasers of the latter type include employment agencies, temporary employment agencies, personnel agencies, and executive search firms.

"Position"—A function or role that can be held by a human entity and that may be described by a single description. Examples include Vice President of Marketing, Human Resources Manager, Senior Web-site Developer, Administrative Assistant, etc.

"Formalize a relationship"—The act of beginning a formal or well-defined relationship with a human entity, e.g. hiring or engaging a person.

"Hire or engage"—In the employment context, the act of formalizing an employment or contractor relationship with an individual or organization.

"Order"—A request by any purchaser to seek, locate, score and/or rank, possibly interview and/or test, and possibly hire or engage appropriate human entities for a particular position. An order preferably includes a specification of the type of provider desired and/or a description of the position to be filled. A purchaser can generate multiple orders and can have multiple orders active at any given time.

"Provider"—When used in a non-symmetric, this term refers to a shopper that is subject to verification steps such as interviewing and testing. For example, in the employment context, a provider generally refers to the person seeking a job or organization such as a contractor interested in one or more particular orders.

"Resume"—A free-text description of a provider that may include 1) the type of position(s) desired and 2) a description of some of the provider's characteristics. In the employment context, a resume may include a description of a candidate's experience, education and skills. For each provider, the body of information comprising a resume may be stored (such as a record in a database) without reference to a particular order.

"Virtual provider"—A virtual provider is a body of information (such as a record in a database in computer storage) describing a provider in relation to a particular order, so as to create an informational pair. There may be multiple virtual providers associated with a single provider. For example, in an employment application, a provider can express an interest in more than one order and virtual providers may be created for each of those orders. One way that a virtual provider may be created is that a provider expresses an interest in a particular order and that interest is then entered into the system of the invention. Another way is that the system may automatically determine that a particular provider and a particular order are a good match and may therefore create a virtual provider for this match.

In either case, a body of information describing that virtual provider may be created and/or storage space may be allocated (e.g. a database record or records may be created) for such a body of information at the time the virtual provider is created. Each virtual provider is preferably associated with (e.g. in a computer database) one order. For example, the virtual provider record may contain scoring data that corresponds to each data item in the associated order (and thus may not be relevant to testing in other orders). The virtual provider record may also contain management information (sequencing, coordinating, tracking and status information) with respect to that virtual provider and with respect to the order associated with that virtual provider.

"Formalizing decision"—In relation to a particular order, the sequence of events in which a purchaser offers a position to a provider and the provider accepts that position. For example, in the employment context, the combination of 1) an employer offering a job position to a job-seeker and 2) the job-seeker accepting that particular job position. Outside the employment context, this term could be rephrased as "matching decision" or other similar term to indicate that one human shopper's offering a role or function to another human shopper and the second human shopper accepting that role or function.

"Successful virtual provider"—After all steps prior to a formalizing decision are completed successfully for a particular virtual provider with respect to a particular order, that provider becomes a "successful virtual provider" with respect to that particular order. For example, in an employment context, where it is determined that a particular job-seeker is qualified for a particular order, that job-seeker's virtual provider becomes a "successful virtual provider". In this example, the job-seeker may not be actually hired yet; that coming later by way of a formalizing decision.

"Selected virtual provider"—A successful virtual provider with respect to which an offer regarding a particular order is made. In other words, a selected virtual provider represents the body of information associated with a candidate that will be made an offer.

"Accepting virtual provider"—After a provider accepts an offer for the position of an order, the virtual provider (i.e. information associated with both the provider and the order) becomes an "accepting virtual provider". For example, in the employment context, after a job-seeker accepts an employment offer, the virtual provider associated with that job-seeker becomes an accepting virtual provider.

"Formalized virtual provider—After all additional steps are completed to formalize a relationship between a purchaser and provider, the accepting virtual provider may become a formalized virtual provider. For example, in the employment context, if all post-decision steps are completed for a particular job-seeker with respect to a particular order, the job-seeker's virtual provider becomes a "formalized virtual provider" for that order.

"Human shopper staff member"—An individual working for a human shopper, or working for an organization represented by a human shopper, who is involved in some way with using the invention. If a human shopper is an individual person, "human shopper staff member" and the human shopper him or herself may be the same person.

"Purchaser staff member"—A human shopper staff member working for a purchaser.

"Embodiment operator staff member" (also known as "Current embodiment staff member")—An individual working for the embodiment operator.

"Interviewer"—A purchaser staff member who interviews providers.

"Decision maker"—A purchaser staff member who is generally charged with making the decision about changing the status of a provider, of a virtual provider, of the purchaser or of an order. For example, in the employment context, a decision maker may work for an employer and may be charged with the making the decision to hire individual job-seekers for particular positions.

Management Functionality

Summary of Management Functionality

As mentioned earlier, four main areas of management functionality in the current embodiments include: 1) sequencing, 2) coordinating, 3) tracking and 4) status reporting. Other embodiments may include various subsets of these aspects of management functionality. The preferred embodiment described herein generally includes all four areas. These four terms are generally defined as follows:

Sequencing—Preferably includes the following: Determining the sequence of steps to perform for a given virtual provider or for a given order as a whole; and ensuring that all required steps in that sequence are correctly performed.

Coordinating—Preferably includes the following: Making sure that human shoppers are notified of when to perform functions that they are supposed to perform; finding mutually agreeable times and dates for appointments between people; making sure that resources such as questionnaires, tests, etc. are delivered to people as needed by each step; requesting resources such as credit reports, drug tests, etc. from people as needed by each step; determining which resources are to be delivered or requested; and notifying human shoppers when a condition has arisen that cannot be handled by through an automated process. (The latter function is referred to herein as "sending an alarm".)

Tracking—Preferably includes the following: Keeping track of what steps have been performed, what are the results of each step, what resources have been delivered and requested, and what messages have been sent and received.

Status Reporting—Preferably includes the following: Displaying, sending, and/or printing reports and/or messages that describe what steps have been performed, what are the results of each step, what resources have been delivered and requested, and what messages have been sent and received.

The embodiments described herein preferably automate one or more, but preferably most or all, of the above functions, so that a human is not required to perform these functions except when certain unusual pre-defined conditions arise (herein called "exception conditions.") This is not meant to imply that humans cannot carry out particular steps in the process. However, if the invention is implemented in an automated fashion completely, it is preferred that no human is needed to handle the sequencing, coordinating, tracking or status reporting functions other than when exception conditions arise.

Those skilled in the art will recognize that other embodiments may be implemented in which some of the functions of this current embodiment are carried out by human beings while other functions are carried out in an automated fashion (e.g., by computer equipment). There are still other embodiments in which some of the functions of this current embodiment are carried out by computer equipment but in a different way than in the embodiment described herein.

In the embodiments described herein, the sequencing function preferably determines the particular steps to be performed at any given time, as well as the particular elements within each step to be performed at any given time. However, this sequencing function may not necessarily determine the actual steps to be performed, nor the elements within each step. Such actual steps and elements thereof are preferably determined by the system operator or users.

For example, in the non-symmetric embodiment, the system operator may enter into computer storage a list of possible steps to be performed (called the "system-level default list of steps") and all elements within each step (i.e. the system-level default step elements). At a later time, each purchaser may select its own default list of steps, and its own default elements within each step, either by using the default steps and elements as is, or by changing them. Later still, when an order is created in computer storage for a particular purchaser, a list of steps and the elements within each step may be selected for that particular order, either by using the default steps and elements as is, or by changing them.

In other embodiments, specific steps or sub-steps may be hard coded in the system, so that the current embodiment always carries out these steps or sub-steps. In yet other embodiments, specific steps or sub-steps may be included in the system, but the user is given the option to suppress or un-suppress them as needed.

The preferred embodiment does not require carrying out any particular steps or sub-steps, but two kinds of steps are described herein: 1) "application" steps in which information is entered about a purchaser, an order, a provider or a virtual provider using a questionnaire or other type of data input form and 2) "verification" steps in which information previously entered may then be verified and other information may be acquired through interviewing and/or testing. Details on these types of steps are set forth in this embodiment. The system operator or a particular purchaser can (at their option) choose to include these kinds of steps in the default list of steps. But alternatively, the above mentioned types of steps may be hard coded into the current embodiment.

The preferred embodiment also includes details of carrying out the matching process, including 1) "matching"—creating and finding virtual providers for particular orders and 2) "scoring and ranking"—assigning a numerical value for the acceptability of a match between an order and a virtual provider.

Contents of a Step

In this (non-symmetric) embodiment, each step may comprise some or all of the following elements, or other elements as needed in particular implementations:

1) A notice to send to the provider;
2) A notice to send to one or more purchaser staff member(s);
3) A data entry process (e.g. a form, program or object) for use by the provider;
4) A data entry process (e.g. a form, program, or object) for use by the purchaser staff member(s);
5) The preferred maximum amount of time allowed for a provider to begin the data entry process;
6) The preferred maximum amount of time for purchaser staff member(s) to begin the data entry process;
7) The preferred maximum amount of time allowed for a provider to complete the data entry process;
8) The preferred maximum amount of time allowed for a purchaser staff member to complete the data entry process; and/or
9) An action such as a computer program to invoke after all data has been received.

In addition, a step may be "conditional". When a step is conditional, the step may perhaps only be performed if a certain condition exists at the time the step is reached. For example, a provider may be asked to take a second skills test if the scores received on the first skills test are higher or lower than a certain threshold value.

Operation of a Non-Symmetric Embodiment

Referring now to FIG. 1, a preferred non-symmetric embodiment may generally function as follows. The steps described below need not necessarily occur in their enumerated order. The system and method of the current invention is generally referenced as numeral 1.

1) Resumes or other bodies of data describing potential providers may be entered into computer storage. This may occur asynchronously (i.e., at any time). This is generally shown as step 2 in FIG. 1. As shown, this step may involve a provider, such as a job seeker, who inputs information about him or herself from a remotely located PC that is networked to the system of the current invention. Alternate modes of inputting data may be used. To this end, faxes and telephones may be used, though this may involve some human interaction on the system side to input provider data in a format that may be used by the system. In any event, provider data may be stored in server 10. Other appropriate data storage systems may be used.

Server 10 may include or be connected to various databases or means to store different types of provider information. For example, the information input by provider in step 2 may be stored in a resume data storage database 12, a provider general database 14 and/or other database(s) (not shown). Such information may be stored and/or accessed in general tracking and statistical database 20.

The provider data entry process of step 2 is shown in further detail in FIG. 2, wherein reference numerals to elements also shown in FIG. 1 are similarly numbered. Various providers 102a, 102b, 102c, etc., may be connected to system 1 by a suitable network connection such as a wide area network 103. Provider information may thus be input into system 1 and stored in server 10. This information may include personal information, e.g., name, address, etc., 104 and available schedules 106 that may be stored in provider general database 14. Other information such as the provider's requirements 108, e.g., location, salary, etc., and a resume 110 may be input and stored in resume database 12. It should be noted that the invention is not limited to this exact storage configuration.

After provider 102 has inputted whatever information is desired and/or required, as shown in step 112, system 1 may send provider 102 a notification that the provider's information has been received. As mentioned above, information associated with provider 102 may be stored and/or accessed in general tracking and statistical database 20.

2) Information about a purchaser may be entered into computer storage, preferably including a default sequence of steps and elements of each step. This is generally shown as step 4 in FIG. 1. This information may be inputted via a remote PC or other suitable means, and may be stored in server 10. As shown in FIG. 1, server 10 may have various databases or means to store different types of purchaser information. For example, the information input by purchaser in step 4 may be stored in purchaser general database 16. The purchaser data entry process 4 is described in more detail after the following description of the purchaser order entry process.

3) Information about an order may be entered into computer storage by the purchaser as shown in step 6. An order is preferably associated with a particular purchaser. The information entered about an order may include a) the purchaser with whom the order is associated, b) the steps to be performed, c) the sequence of steps, d) the elements of each step, and e) the number of providers needed for this particular order (e.g. 20 entry-level web-site designers are needed.) Other information may be input during the order entry process 6. It should be noted that a given order may specify that more than one providers are needed for the position(s) described by that order.

This order entry process 6 may be repeated for each order that the purchaser wishes to enter. It is preferred that additional orders for a given purchase may be entered at any time. Order information may be stored in server 10. And more particularly as shown in FIG. 1, order information may be stored in an order database 18.

The purchaser data entry process 4 and purchaser order entry process 6 is now further described with reference to FIG. 3. As shown, multiple purchasers 120a, 120b and 120c may be connected to system 1 through an appropriate connection such as wide area network 103. It should be noted that this need not be the same WAN which serves to connect providers 102 to system 1. However, a global network such as the world wide web may serve to connect both providers 102 and purchasers 120 with system 1.

The information input by purchasers 120 may be stored on server 10, which may include or be connected to various databases. For example, a purchaser's general information, e.g., recruiter's name, address, e-mail, etc., 124 may be stored in a purchaser general information database 126. General information about the order 128 may also be stored in the purchaser general database 126. However, it should be noted that the invention is not limited to this exact storage configuration.

In connection with the purchaser order entry process 6, purchaser 120 may input order requirement information 130. This may include information on mandatory skills 132 that the prospective provider must have, or information 134 on skills that would be desirable for the provider to have. Other information regarding the order may also be input. Information describing the order may be stored in an order database 136.

After purchaser 120 has inputted whatever information about the purchaser and/or the order is desired and/or required, system 1 may send purchaser 120 a notification that this information has been received as shown in step 138. As mentioned above, information associated with purchaser 120 may be stored and/or accessed in general tracking and statistical database 20.

4) After an order is entered into the computer storage 10, system and method 1 preferably considers and determines which providers may address criteria set forth in the order as specified by the purchaser. In FIG. 1, this generally occurs in connection with selection and filtration process 22 and/or interview and engagement process 24 discussed in more detail later.

5) As information about new providers 102 is entered into system 1, it is preferred that system 1 consider the resulting providers to determine if these providers should be considered for any of the orders that had been previously entered into system 1. This may occur automatically upon the entry of a new provider or at pre-determined intervals. In any event, as new providers 102 enter system 1, the associated providers preferably under go the selection and filtration process 22 and/or interview and engagement process 24 for particular orders.

6) For each virtual provider that is considered and comes to be associated with an order, the system preferably creates a virtual provider, then executes in the steps associated with that order in the sequence that had been entered by the purchaser (as determined in stage #3 above). So for a given virtual provider, it is preferred that the system independently executes the steps associated with the order. As noted above, the actual steps executed for each virtual provider associated with an order may be different than the default steps.

7) During or after completion of any step that is performed for a virtual provider, system 1 may determine that the virtual provider should be eliminated from consideration because the provider information associated with the virtual provider does not sufficiently address the information set forth in the order. In other words, the provider that generated this virtual provider is no longer under consideration for a particular order.

However, where a provider inputted information into system 1 that resulted in creating more than one virtual provider, this provider may be eliminated from consideration of one order but may still remain in consideration for other orders. For example, the same job-seeker may have applied for several jobs.

8) If all pre-formalizing decision steps are completed successfully for a virtual provider with respect to a particular order, system 1 preferably changes the status of that virtual provider to successful virtual provider (as defined earlier) with respect to that order.

9) The purchaser 120 preferably has the option to decide whether to formalize the relationship (e.g. make an offer to) for one or more successful virtual providers for each order associated with that purchaser.

10) For those successful virtual providers to which purchaser 120 wishes to make an offer, system 1 preferably extends such offers. These successful virtual providers are then preferably considered by system 1 as selected virtual providers as defined earlier. In connection with this step, a suitable message indicating that an offer is being made may be sent to the providers associated with the successful virtual providers through provider feedback process 26.

11) A provider associated with a particular selected virtual provider may or may not accept the offer. If the provider accepts the offer, the associated selected virtual provider is then preferably considered by system 1 as an accepting virtual provider as defined earlier. An acceptance may be communicated to the purchaser 120 by an appropriate message through purchaser feedback process 28.

12) System 1 may preferably perform additional steps related to the post-decision process, such as preparing government and company forms, selecting benefit plans, etc. Information associated with such forms may be input by purchaser 120 during the purchaser data entry process 4. System 1 may provide such forms to provider 102 through provider feedback process 26.

In connection with such additional steps, system 1 may eliminate an accepting virtual provider if the associated provider does not complete one or more post-decision steps successfully or if the provider withdraws himself/herself/itself from consideration for the order. If the accepting virtual provider is not eliminated during any post-decision steps, the accepting virtual provider may be considered by system 1 as a formalized virtual provider as defined earlier.

13) The above processes preferably continue until the predetermined number of virtual providers who have reached stage #12 for a given order equals the number of positions to be filled for that order, as discussed in stage #3 above.

Automated Communications

A particular communication-related issue may arise with the preferred embodiment described herein. In this embodiment, the current embodiment from time to time preferably notifies providers and purchaser staff members of the need to perform certain actions. A typical action may consist of inputting needed data into the embodiment (e.g. answers to interview questions.) This may occur through provider feedback process 26 and/or purchaser feedback process 28.

So that the process implemented by this current embodiment may proceed on a timely basis, these notifications are preferably sent out whether or not the person receiving the notice is currently in communication with the system at the time the notice is sent (e.g. by e-mail). Then, at a later time, when the person who received a notification wants to respond and enter the requested data, it is preferred that the appropriate program of system 1 that accepts the data be able to automatically associate the data entered at that later time with the person who received the notification. Some solutions to this situation are presented later in this document (in a section entitled "Details of Automated Communications").

Alarms

Automated "alarm" processes may be included in this embodiment. Generally, alarms are processes for determining when humans are notified of exception conditions, i.e., when human intervention may be necessary or desired within the process of system 1. Alarms may be communicated, for example, to a purchaser 120 through purchaser feedback process 28. Alarms may be differentiated between warning alarms and urgent alarms, with possibly different or overlapping groups of humans receiving warning alarms and urgent alarms respectively.

Orders may have priority codes such as low, medium, high. The level of priority affects how the automated alarm system may be used (e.g. low priority orders may preferably cause only warning alarms; medium priority orders may preferably cause a mix of warning and urgent alarms, while high priority orders may preferably cause only urgent alarms.) The priority of an alarm may also depend on the severity of the situation causing the alarm to be sent in the first place.

Compensation Methods

As a result of the automation provided by system/method 1, a new method of compensation to the system operator is made possible. Here, compensation may be made due for the amount of work accomplished. This can include an accounting for: 1) each step completed for each purchaser and each provider, 2) the number of orders handled during a period of time or 3) the number of providers hired. Alternate methods to calculate compensation may also be provided.

Referring to FIG. 1, the information stored in general tracking and statistical database 20 may form the basis for determining the amount of compensation due to the system operator. To this end, billing processes 30 may occur to calculate the amounts due which in turn may depend on the manner of calculation used. Billing, payment and/or other accounting information related to the compensation may be stored in accounting database 32.

Advances Provided by the Current embodiment

In summary, in relation to management functions, the current embodiment provides benefits over existing systems and methods in at least the following ways.

1. Automated Sequencing—The use of a computer program to automatically proceed through all steps in the selection process. To accomplish this, each step in the sequence includes a number of data items, such as the persons to contact and names or pointers to the data input processes. These data items within each step are discussed in detail below.

2. Inheriting of the default step sequence from system level, to purchaser level, to order level and finally to virtual provider level, with the option to change the step sequence at any level.

3. E-mail notifications with automatic handling of responses—Sending an e-mail message to a person (e.g. a provider) requesting that this person enter certain information into computer storage. This may include automation of the response such that the person does not have to identify him/herself when responding in order to enter this information.

4. Compensation for work performed by system—A business process in which a user of this embodiment such as a purchaser compensates some other entity (e.g. the embodiment operator) on the basis of how much work is performed in the selection process over a period of time. Different method of calculating how much work has been done may also be implemented.

5. Automated "alarm" processes—Processes for determining when humans are notified of exception conditions. With such automated alarm processes, problems or issues that might hinder the efficient running of an automated system are preferably be avoided or at least reduced.

6. Prioritization of orders—Orders may have priority codes such as low, medium or high. The level of priority may affect how the automated alarm system is used as explained above. Higher priority orders may also appear higher in status reports and receive more frequent status reports. Orders with different priority levels may be color-coded on screen and in status reports to help identify their priority.

In addition to the foregoing individual enumerated items, combinations of these items also represent an advance over existing systems and methods. Other advances are also provided by the current embodiment as described herein.

Data Structures

Typical data structures (i.e. a database schema) associated with the current embodiment are now discussed with reference to FIGS. 4 through 13. For simplicity of illustration, the data structures are divided into relational databases. Each sub-figure (e.g. FIG. 4.1) illustrates one relational database table. Each item in each sub-figure (e.g. "Staff ID" in FIG. 4.1) is a single column (also known as "field") in the database table described by that sub-figure, though the columns are shown vertically.

It should be noted that different information may be contained in the various databases of the current invention, including other information not specifically discussed herein. Accordingly, the current invention is not limited to the exact database configurations discussed below.

Each data table preferably contains a unique record ID. Most data tables also preferably include a field that relates that data table to another data table. The following discusses the meaning and use of the various tables and fields in this embodiment. In this document, the word "record" is used to indicate each row within a data table.

Practitioners of the art will recognize that different embodiments may have more or less levels of data specificity within the database scheme and related programming. Practitioners of the art will also recognize that essentially the same information may be embodied in different database schemes or by different types of databases or by different data storage methods.

Data need not be stored on one computer system or in one database. Data may be scattered among multiple systems either connected by a local area network, a wide area network or the Internet. In addition, practitioners of the art will recognize that the principles of this particular database scheme may be applied to different embodiments of the current invention. Furthermore, different information in the databases than that shown in the figures may be used with the current embodiment.

FIG. 4 illustrates a "System-wide Database"—i.e. a database for system-wide data for a typical implementation of this embodiment. Data in the System-wide Database may typically be edited by the system operator or someone working therefor. This data may or may not be readable by purchasers or by providers. There are two tables in this database as shown in FIGS. 4.1 and 4.2.

FIG. 5 illustrates a "Purchaser Database"—i.e., a database for information pertaining to purchasers that are seeking providers, e.g., a prospective employer seeking employees. This may reflect information input in connection with the purchaser data entry process 4 and that is stored in purchaser general database 16 (FIG. 1).

FIG. 6 illustrates an "Order Database"—i.e., a database for information pertaining to specific orders input by the purchasers, e.g., a particular job opening that the prospective employer is looking to fill. This may reflect information that is input in connection with the purchaser order entry process 6 and that is stored in the position/job order database 18 (FIG. 1).

FIG. 7 illustrates a "Provider Database"—i.e., a database for information pertaining to providers that are seeking to be matched with orders entered by purchasers, e.g., a job-seeker looking to fill one or more orders entered by one or more purchasers. This may reflect information that is input in connection with provider data entry process 2 and that is stored in connection with FIG. 1. This database may also contain information that comprises the virtual provider associated with the human provider at issue. In other words, the fields in FIGS. 7.2 and 7.3 may comprise the virtual provider that is processed by system 1 as described above.

FIG. 4.1

The table of FIG. 4.1 may generally contain information about the staff of the system operator. As shown, each staff person may be assigned a Staff ID, password and certain level of access available to that staff person. This table preferably contains various types of information about the staff person such as address, etc. The fields identified in FIG. 4.1 as "Roll #1" and "Roll #2" may comprise as many fields as needed to cover all the possible roles of the System Operator Staff. In this embodiment, the content of these fields may be selected from a table of possible roles, such as "Manager of Interviewing", "Human shopper Sales Manager", etc.

FIGS. 4.2, 5.3, 6.2 and 7.2

These tables generally refer to the information specifying the steps to be taken in process/system 1. FIG. 4.2 illustrates a table containing the system-wide default step sequence for this embodiment. As discussed earlier, system 1 may set forth a default sequence of steps that the overall process of matching providers and purchasers may follow. Each purchaser may have the option of adopting this step sequence as is, or of using a modified version as illustrated in FIG. 5.3 which is entitled "purchaser default steps". The step sequence may be further modified for each order as illustrated in FIG. 6.2 which is entitled "order default steps". The sequence of steps to be followed by system 1 may be further modified for each virtual provider as illustrated in FIG. 7.2. Generally, it is preferred that the actual steps executed by system 1 be those selected for each virtual provider as shown in FIG. 7.2.

Each record in the foregoing tables preferably contains data about one particular step in the step sequence. The steps may be executed in record order for each virtual provider individually. Each step may involve either inputting information from, or outputting information to, the provider and/or the purchaser or current embodiment operator staff member. Each step preferably has a particular staff member assigned to that step, either a purchaser staff member or embodiment operator staff member.

The field "Assigned Staff Type" in FIGS. 4.2, 5.3, 6.2 and 7.2 may indicate whether the staff member assigned to this particular step is a purchaser staff member or an embodiment operator staff member. The field "Assigned Staff ID" may provide the ID of the actual staff member assigned to this step.

The fields "Notice to Staff" and "Notice to Provider" may contain the content of the notices themselves, or optionally, the names of files that contain the content of the notices. In this embodiment, this content is appropriate for e-mail messages, but in other embodiments, additional content appropriate to other means of communication may be included.

The fields "Provider Data Entry Process" and "Staff Data Entry Process", in this embodiment, may comprise computer programs (e.g. subroutines, processes, functions, objects, etc.) or the names of files containing these programs. These programs may provide a means for providers and staff members, respectively, to enter and/or access information (such as described in connection with FIG. 1) appropriate to the step being executed.

The "Max Time to Start Provider Data Entry" and "Max Time to Start Staff Data Entry" fields in this embodiment may provide the amount of time (e.g. 3 days) after the notice was sent before some kind of alarm is triggered. For example, an alarm can be sent if a provider does not respond by beginning the process of entering data as called for by the particular step being executed.

The "Max Time to Finish Provider Data Entry" and "Max Time to Finish Staff Data Entry" fields in this embodiment may provide the amount of time (e.g. 1 day) in which the provider or staff member is permitted to finish entering data before some kind of alarm is triggered.

The field "Threshold Score(s) for this Step" in this embodiment may in fact be one or more fields. The number of fields referred to in the previous sentence preferably corresponds to the number of categories for which scores are being determined and maintained for each virtual provider. The content of this/these fields may be the minimum score(s) that is preferably associated with a virtual provider at the time that this step is reached, in order for this step to be executed for that virtual provider.

If the score associated with a virtual provider is less than the minimum score(s) in any category, the step may not be executed and an alternative action may be taken for that virtual provider. The alternative action may be produced by a computer program, provided by the field "Action if Below Threshold Score(s)". The latter field may contain the computer program itself or may identify that program.

The fields "# of Days to Accumulate Providers" and "Min # of Providers at Threshold Score(s)" preferably refer to a feature of this embodiment that is enabled for a given step if these fields are filled in for a specific order (i.e. in the table illustrated in FIG. 6.2.) This feature is called the "Step Delay" feature. If these fields are filled in for a specific order, then the Step Delay feature may be enabled for all virtual providers associated with that order. With the Step Delay feature enabled, a given step for any virtual provider associated with that order is preferably not executed until a minimum number of virtual providers have reached the threshold score(s) for this step.

The field "Min # of Providers at Threshold Score(s)" may provide some minimum number of virtual providers that must reflect the threshold score(s) before the step can be executed for any virtual provider associated with this order. This process of waiting may continue for a period of time (e.g. 10 days) as given in the field "# of Days to Accumulate Providers".

After this period of time has passed, if at least the minimum number of virtual providers, as given by the field "Min # of Providers at Threshold Score(s)" have not reached the threshold score(s) for this step, then an alarm or notification may be sent. At this point, the step may not be executed, and instead, more time provided to attain the minimum number of providers. This may occur, for example, in the context of an employment service, where an employer may not want to begin interviewing any job-seekers until there are a minimum number of job-seekers who are ready to be interviewed.) As such, system/process 1 may increase efficiency in the overall process for a prospective employer to find an employee. Alternatively, the step may be executed for all virtual providers that have reached the threshold score(s).

The field "Max # of Providers at Threshold Score(s)", if filled in for a given step for a given order, preferably enables a "Step Burden Control" feature for that step for all virtual providers associated with that order. When this feature is enabled for a given step, that step preferably is not executed for any additional virtual providers until the number of virtual providers at that step is equal or below the value of the "Max # of Providers at Threshold Score(s)" field. An example of the purpose of this feature, in the context of an employment service, is that an employer may not want to interview more than a certain number of job-seekers for a given order.

The fields "Measurement Period", "Min # of Providers above Threshold per Measurement Period", and "Max # of Providers above Threshold per Measurement Period" if filled in for a given step for a given order, preferably enable a "Step Measurement" feature for that step for that order. When this feature is enabled for a given step, the embodiment preferably sends out an alarm or notification if the number of virtual providers that have reached this step during the last "Measurement Period" period of time is less than the value in the field "Min # of Providers above Threshold per Measurement Period".

Similarly, when this feature is enabled for a given step, the embodiment preferably sends out an alarm or notification if the number of virtual providers that have reached this step during the last "Measurement Period" period of time is greater than the value in the field "Max # of Providers above Threshold per Measurement Period".

The "Action After Data Received" field may hold the identity of, or contents of, a program that is invoked after all data is received as called for by this step. Typically, this program is responsible for processing the data and updating scores and/or status fields for this virtual provider.

As shown in FIG. 7.2, the virtual provider steps table contains other fields that are not present in the other "step" tables. These other fields are discussed below under "FIG. 7.2—Status Fields".

FIG. 6.1—Order Database

In the order database of FIG. 6.1, there are several fields that may be unique to this table in this embodiment. Their meaning and use with respect to this embodiment are now described. The contents of these fields preferably apply to a particular order.

Three Interviewer fields are shown but their actual number may vary. These fields may identify the purchaser staff members who are permitted by the purchaser in question to act as interviewers for the particular order in question. All Interviewer fields need not be filled in.

Three Decision Maker fields are shown but their actual number may vary. All Decision Maker fields need not be filled in. The Decision Maker fields may indicate the purchaser staff members who are permitted by the purchaser to make decisions on behalf of the purchaser in regard to hiring (or not hiring) individual providers for the particular order in question.

Interviewer fields and Decision Maker fields, and optionally other categories of purchaser staff members, identify the purchaser staff members who may receive notices and alarms and who may schedule appointments, meetings and telephone calls with providers and other purchaser staff members with respect to a particular order. Generally, these individuals are the people that may provide human intervention when necessary. In other embodiments, there may be more or fewer such fields and the categories may be compressed into fewer categories or there may be more categories than listed here.

The two "Warning Purchaser Staff" fields refer to purchaser staff members (identified by their User IDs) who may receive "Warning Alarms". The two "Urgent Purchaser Staff" fields may refer to purchaser staff members (identified by their User IDs) who may receive "Urgent Alarms" with respect to the particular purchaser with which they are staff members. The two "Warning Embodiment Staff" fields may refer to Embodiment staff members (identified by their staff IDs) who may receive "Warning Alarms". The two "Urgent Embodiment Staff" fields may refer to embodiment staff members (identified by their staff IDs) who may receive "Urgent Alarms". All such fields need not be filled in. In other embodiments, the number of such fields may vary and/or be compressed into fewer categories. It will be appreciated that various individuals of the purchaser's staff (as well as any other participants in system/process 1) may receive IDs upon the purchaser's (or provider as the case may be) inputting information.

The next three fields apply to the selection of providers appropriate to an order, "Desired resume keywords" may be one or more fields listing specific keywords to be searched for in provider resumes. To this end, suitable searching software may be used to locate such keywords. "Required Provider Attributes" may be one or more fields listing attributes required of a provider if that provider is to be considered for the order. "Knock-out Provider Attributes" may be one or more fields listing attributes which a provider must not have in order for that provider to be considered for the order.

FIG. 7.3—Virtual Provider Database—Status Fields

Most of the fields in the virtual provider table (FIG. 7.3) are generally self-explanatory by virtue of the title assigned to those fields. However, additional explanation is provided below for the following fields. Note that each virtual provider record is preferably related to a single order.

| Status field | Explanation |
| --- | --- |
| Current Step # | The step # that this virtual provider has reached. |
| Current Score(s) | One or more fields indicating the current score for this virtual provider with respect to the order. Scores may be in one or more categories such as: one or more skills categories, work ethic, fit to company culture, etc. |
| Virtual Provider Status Code | The current status of the virtual provider with respect to the order. Some possible values are listed in a table below. |
| Date Virtual Provider Created | The date this virtual provider record was created. |
| Date Virtual Provider Eliminated | The date that the virtual provider was eliminated from consideration for the order. |
| Elimination Reason Code | A code indicating the reason for elimination. Possible values are listed in a table below. |
| Date Successful | The date the virtual provider became a "successful virtual provider", having completed all steps necessary for the human shopper to make a hiring decision. |
| Date Offer Issued | Date purchaser issues an offer to the provider associated with this virtual provider to accept the order associated with this virtual provider. |
| Date Accepted | The date on which the provider associated with this virtual provider accepts the offer. |
| Date Formalized | The date that the provider associated with this virtual provider completes all steps necessary for a formal relationship with the purchaser associated with this virtual provider. |
| Formalized Status Code | The type of hiring contract or agreement for this provider at this time. |

Virtual Provider Status Codes may take on several values, including but not limited to, the ones listed below:

| Status value | Explanation |
| --- | --- |
| In Process | In some step prior to a formal relationship with respect to a particular order. |
| Eliminated | Eliminated from consideration for a particular order. |
| Successful | Provider has completed all steps necessary for the purchaser to make a decision, but the purchaser has not yet made a decision to issue an offer. |
| Selected | An offer (for the order associated with this virtual provider) has been issued to the provider associated with this virtual provider |
| Offer accepted | Provider has accepted the offer. |
| Formalized | All steps needed for a formal relationship have been completed. |

The Elimination Reason Code may take on several values, including but not limited to, the ones listed below:

| Status value | Explanation |
| --- | --- |
| Low score(s) | One or more scores were under threshold value. |
| Beat by another virtual provider | Provider has acceptable scores, but other virtual provider(s) had better scores. |
| No response | The provider (associated with this virtual provider) did not respond to a request for information, then a step timed-out, and then a human decided to eliminate the virtual provider on this basis. |
| Withdrawal | Provider (associated with this virtual provider) withdrew this virtual provider from consideration for the order associated with this virtual provider. |

The Formalized Status Code may take on several values, including but not limited to, the ones listed below:

| Status value | Explanation |
| --- | --- |
| Temporary | Temporary relationship |
| Temp to Perm | Temporary relationship with an option to becoming a permanent relationship |
| Permanent | Permanent relationship |
| Contract | Contractual relationship. |

FIG. 7.2—Virtual Provider Step Status Fields

FIG. 7.2 describes a table that records information about individual steps. There is preferably a record in this table for each step performed for each virtual provider.

The Current Step Status Code may take on a number of values, including but not limited to, the following:

| Status value | Explanation |
| --- | --- |
| Step Reached | Previous step was completed and virtual provider was not eliminated. |
| Step Started | First sub-step of this step has been initiated. |
| First Notices Sent | Notices have been sent to provider and/or staff member. |
| Second Notices Sent | A second set of notices has been sent to provider and/or staff member because there was no response or an invalid response from the first set of notices. |
| All Responses Received | All necessary information or data or answers have been received from the provider and/or staff member as called for in the notices sent. |
| Timed-Out | No valid response has been received from the provider and/or staff member. |
| Human Intervention Called For | An alarm has been sent, typically because the step has timed-out. |
| Step Completed | All sub-steps have been completed. |

There is preferably a corresponding date field for each possible status value, indicating the date and time that the change in status first took place.

As mentioned above, different types of databases containing different types of information may be used in connection with the current invention. Referring now to FIGS. 8 through 13, alternate databases are discussed. It should be noted that these databases and the information contained therein may be used in connection with the above-described databases of FIGS. 4 through 7.

FIG. 8 shows the type of information that may be contained in the resume database 12 of FIG. 1. As shown, the resume may be assigned an ID along with the provider, and other information typically appearing on a resume may also be stored in this database. Based on information contained in resume database 12, sub-databases or related databases may contain additional information. For example, resume technology database 12a may contain an ID for the technology type that matches with the resume ID in database 12. In similar fashion, resume skills database 12b may contain an ID for skills associated with the resume, resume city database 12c may contain an ID for the provider's city, resume country database 12d may contain a country ID and resume region database 12e may contain a region ID. The database structure preferably provides for a more efficient use of information about the provider and his or her resume.

FIG. 9 shows the type of information that may be contained in the provider general database 14 of FIG. 1. As shown, the provider is assigned an ID and database 14 may contain general information about the provider him or herself. Provider survey database 14a may be related to database 14 by the provider ID and may contain personal information. Provider requirement database 14b may also be related to provider database 14 through the provider ID and may contain various requirements set forth by the provider.

FIG. 10 shows the type of information that may be contained in the purchaser general database 16 of FIG. 1. As shown, the purchase is assigned an ID and database 16 may contain various general information. Purchaser clients database 16a may be related to general database 16 through the purchaser ID and may contain various information about the clients for which the purchaser may be seeking providers. Purchaser client configuration database 16b may be related through the purchaser ID and may contain various information about how a client may want to receive information about providers or other information.

FIG. 11 shows the type of information that may be contained in the position/job order database 18 of FIG. 1. As shown, an order may be assigned an ID in purchaser job order database 18, and may contain general information about that order such as the date it was created, the client's name and information about the position. Databases 18a, 18b, 18c and 18d may be related to database 18 through the job order ID. Job order technology database 18a may also contain the technology ID so as to match up with the technology ID of pertinent provider resumes (as shown in database 12a). Job order skill database 18b may contain a skill ID to correspond with pertinent provider skills (as shown in database 12b). Job order details database 18c may contain a timeframe for which the order will remain open and other information. Job order category database 18d may contain order category information.

FIG. 12 shows the type of information that may be contained in the general tracking and statistical database 20 of FIG. 1. As shown, various information relating to the provider and purchaser may be contained for use through the matching process of system 1. Also included may be information about interviews and other steps that may occur.

FIG. 13 shows the type of information that may be contained in the accounting database 32 that may be used in the billing process 30 as shown in FIG. 1. As shown, databases 32a, 32b and 32c may be related to database 32 through appropriate IDs. Maintenance of this type of information may allow the orderly tracking of payments, invoices and other accounting information relevant to use of system 1.

Structure and General Functioning

The structure and general functioning of the preferred non-symmetric embodiment is now further discussed with reference to the block diagram flowchart of FIG. 14. Different embodiments may include subsets or supersets of the functionality illustrated in FIG. 14. Practitioners of the art will recognize that FIG. 14 is one of many ways to divide up the major functions and subsystems of this current embodiment. It should also be noted that some of the functionality shown in FIG. 14 is reflected in FIG. 1. Also, the names of functions and subsystems are arbitrary and may be changed.

The System Input Subsystem (201) may generally consist of methods of inputting and modifying stored information (such as computer input screens), to permit the system operator to set up and maintain the database of system-wide data (202). This may include 1) the names and other information about the system staff (as shown in FIG. 4.1 and 4) a default series of steps for the system as a whole along with data related to each step (as shown in FIG. 4.2).

The Purchaser Input Subsystem (204) may generally consist of methods of inputting and modifying information (such as computer input screens), to permit purchasers (or system operators acting on behalf of purchasers) to set up and maintain the Database of Purchaser Data (205). This is analogous to purchaser data entry process 4 in FIG. 1. This may include 1) the names and other information about purchasers, 2) the names and other information about purchaser staff members, and 3) a default series of steps for each purchaser along with data related to each step. The Purchaser Input Subsystem may permit a user to select the default series of steps for each purchaser by selecting from among the default series of steps previously established for the system as a whole. If no changes are made by a user for a particular purchaser, then the default series of steps may be used for that purchaser.

Similar to order entry process 6 in FIG. 1, the Order Input Subsystem (207) may generally consist of methods of inputting and modifying information (such as computer input screens), to permit purchasers (or the system operator acting on behalf of purchasers) to set up and maintain the Database of Order Data (208). Similar to order database 18 in FIG. 1, this may include 1) the information about particular orders (as shown in FIG. 6.1) and 2) a default series of steps for each order along with data related to each step (as shown in FIG. 6.2). The Order Input Subsystem generally permits a user to select the default series of steps for each order by selecting from among the default series of steps previously established for the purchaser (FIG. 5.3.) If no changes are made by a user for a particular order, then the default series of steps may be used for that order.

The Provider Input Subsystem (210) may generally consist of methods of inputting and modifying information (such as computer input screens), to permit providers (or system operators acting on behalf of providers) to set up and maintain the Database of Provider Data (211). This is similar to provider data entry process 2 in FIG. 1 wherein provider information is stored in databases 12, 14. This may include 1) the information about providers (as shown in FIG. 7.1), 2) information about particular virtual providers (FIG. 7.3), and 3) a series of steps for each virtual provider along with data related to each step (as shown in FIG. 7.2).

The Provider Input Subsystem (210) permits an authorized user (purchaser or embodiment operator staff member) to select the series of steps to be performed by and for each virtual provider by selecting from among the default series of steps previously established for the related order (FIG. 6.2.). If no changes are made by an authorized user, then the default series of steps may be used.

Provider and virtual provider records may be created as follows: A provider can join the embodiment in one of two ways: 1) interface directly with the embodiment using the Provider Input System (210), inputting personal information such as full name, address, phone number, etc. and then optionally pasting resume text into an appropriate input device (such as a text window) or 2) send a resume to the embodiment, for example by e-mail. (All resumes received by the embodiment are converted by the embodiment to a standard form, such as an ASCII text document which may be stored as an object in a database.) The embodiment may then create a provider record (FIG. 7.1) when a provider initially joins the embodiment in one of the above ways.

If only a resume was received by the system, the embodiment fills in as much data as it can by parsing the resume, and then requests the provider to provide any missing information in the provider record. The embodiment then asks the provider to select one or more orders of interest. If the provider responds by selecting at least one order of interest, the embodiment may create a virtual provider for each order selected by the provider. Default step data may then be entered by the embodiment automatically for each virtual provider (as shown in FIG. 6.2.)

Having filled in the above data records (provider and virtual provider), the system may then notify an authorized user (purchaser staff member or system staff member) that a new virtual provider record has been created. This permits the purchaser to complete or modify the virtual provider step data for each virtual provider, if desired. This notice may be in the form of a report of all new virtual providers during a period of time (the preferable solution) which is sent by e-mail for each new virtual provider.

On the output side, Output Status Reports (203) is a subsystem that may generally create reports documenting the current status of the system. This is similar to purchaser and/or provider feedback processes 26, 28 in FIG. 1. Depending on the implementation, a variety of reports may be available summarizing some or all stored data, including the status of the system as a whole, the status of each purchaser, the status of each order, the status of each provider and the status of each virtual provider.

The generation of a status report may be triggered either by a time signal (e.g. reports may be printed on a daily basis) or by an authorized user request. In this embodiment, a purchaser staff member may request status reports on its own status, the status of each order entered by the purchaser, and the status of each virtual provider interested in each of that purchaser's orders. In this embodiment, a system operator staff member may request any status report.

The Output Invoices (206) is a subsystem that may generally create invoices and optionally send them to each purchaser. Depending on the implementation, invoices may be printed and sent by standard mail or they may be sent electronically by such means as e-mail, EDI, or an on-line exchange. The Output Invoices subsystem (206) may also print and/or send statements when purchasers have not paid in full one or more invoices previously sent.

The Input Receipts (209) is a subsystem that may be used by the system operator to enter the amounts of money received against invoices previously sent by the Output Invoices subsystem. Such accounting features are generally similar to billing process 30 and accounting database 32 in FIG. 1.

The Status Updating Subsystem (212) may generally update the virtual provider data (FIGS. 7.1 and 7.2) to reflect the status of each step. This status information may include, but is not limited to, the date the step was started, the date the step was reached and the date the step was completed.

The Timer (213) is a subsystem that may generally provide time and date information to the rest of the system. This subsystem enables the rest of the system to determine the elapsed time since an event occurred, and also to initiate a function based upon that elapsed time. For example, a purchaser may set up a certain action for a given provider so that this action is initiated only after a certain amount of time has elapsed (E.g. send an alarm if a provider does not respond to an earlier message to make an interview appointment within one hour.)

The Step Sequencing Subsystem (214) preferably causes the system to step through the sequence of steps for each virtual provider. It finds a record for the next step in sequence for each virtual provider, determines what action should take place in that step and then initiates that action. Within each step, there may be two or more sub-steps. The Step Sequencing Subsystem (214) also initiates each sub-step within each step.

The Messaging Subsystem (215) preferably sends routine messages (e.g. by e-mail) to humans such as providers, purchaser staff members or embodiment operator staff members. A routine message may be a message that informs the human that an event has taken place or that a human action is needed (e.g. please make an interview appointment) according to the normal sequence of steps stored in the Virtual Provider Steps table (FIG. 7.2) data within the Provider Database (211).

The Alarm Subsystem (216) preferably sends alarms to humans such as human shopper staff members or current embodiment operator staff members. An alarm is generally a non-routine message informing humans that an unusual event has occurred or a required event has not occurred, or that some other unusual condition exists that requires human intervention.

The Alarm Subsystem (216) may determine that an alarm should be sent in regard to a particular order, dependent on the level of priority of that order. (E.g. if the order is high priority, send an alarm; if it is low priority, do not send an alarm.) The Alarm Subsystem (216) may also determine to whom an alarm is sent, choosing from the available persons listed in a purchaser's record. The Alarm Subsystem (216) may also distinguish between "urgent" and "warning" alarms and choose to send the alarm to appropriate persons. (E.g. if the alarm is "urgent", the Alarm Subsystem sends the alarm to the person(s) designated to receive "urgent" alarm messages, whereas if the alarm is "warning", the Alarm Subsystem sends the alarm to the person(s) designated to receive "warning" alarm messages).

Further, the Alarm Subsystem (216) may determine that, if an order is high priority, an alarm that is otherwise sent as a "warning" alarm be elevated in status to an "urgent alarm" and is thereafter treated as an "urgent alarm". There are other ways that the Alarm Subsystem can use the priority level of an order to determine whether an alarm is sent, to whom it is sent, and whether the alarm is a warning alarm or an urgent alarm or some other category of alarm.

The Calendar Subsystem (217) may generally consist of methods for inputting, maintaining and outputting information, such as computer input screens and interactive screens, specifically designed for inputting, maintaining and outputting personal schedule information such as the time and dates of appointments, meetings and phone calls. This Calendar Subsystem (217) may accept input from staff members (purchaser staff members and embodiment operator staff members) about their personal schedules. It may also accept input from providers about their personal schedules and may provide output and/or an interactive environment in which these staff members and providers may coordinate meetings, appointments and phone calls with each other.

Operation of the Embodiment

This section further describes the operation of the current embodiment, as well as certain components and functions thereof.

Timer

The Timer (213 in FIG. 14) is generally responsible for invoking other computer programs, such as programs within the Step Sequencing Subsystem, either at particular times or after waiting particular amounts of time. A preferred implementation is that any other program (called herein a "Timer Invoking Program") may invoke the Timer and ask the Timer to call back the same "Timer Invoking Program" or to call some third program. The program then provides the Timer with either the particular time and date to do this or give the Timer the amount of time to wait before doing this, beginning with the moment when the Timer Invoking Program calls the Timer. All modern computer systems generally have the necessary functionality to enable such a Timer program and practitioners of the art are familiar with the methods available.

Alarms

The Alarm Subsystem (216 in FIG. 14) in this embodiment has been discussed above. However, this section further describes the mechanism involved in this embodiment. Alarms may be sent out by the Alarm Subsystem either when 1) a particular "action" program (e.g. Action if Below Threshold Score(s) in FIG. 4.2) is triggered or 2) when a particular condition exists (e.g. a provider has not responded to a request to set up an interview). One way this can be accomplished is as follows.

The Alarm Subsystem (216 in FIG. 14) may be invoked periodically (e.g. every hour) by the Timer (213 in FIG. 14) or invoked by another program within the embodiment, such as an "action" program or the Step Sequencing Subsystem. When the Alarm Subsystem is invoked by an "action" program, the "action" program passes to the Alarm Subsystem what alarm to send and to whom to send it.

In contrast, whenever the Alarm Subsystem is invoked by the Timer, the Alarm Subsystem may search all the databases (illustrated in FIGS. 4-7) for pre-defined conditions that should cause an alarm to be sent. Each condition that should cause an alarm to be sent out, the content of those alarm messages and the type of alarm to be sent out for each condition, are preferably defined within the Alarm Subsystem. However, the parameters that determine whether such a condition has in fact been met are typically stored in one of the databases.

In order to test for a particular condition (e.g. does the amount of time that has elapsed since a provider reached a particular step exceed the maximum amount of time allowed for that provider to begin the data entry process for that step?), there may be a routine within the Alarm Subsystem that may function in the following way. Using the above example, this routine may examine each virtual provider for the presence of the above mentioned condition, beginning with the first virtual provider in the database:

1) finds the current step that a virtual provider is in;

2) determines how much time has elapsed since that virtual provider first entered that step (as indicated by the "Date/Time Step Reached" field in the same record);

3) compares this elapsed time with the "Max Time to Start Virtual Provider Data Entry" field in the same record (see FIG. 7.2) to determine if the elapsed time is greater;

4) if the elapsed time is not greater, the routine stops here, returns to step #1 above, and continues with the next virtual provider;

5) otherwise, the routine determines what level that alarm should be at (e.g. urgent or warning);

6) adjusts the level of alarm upward (e.g. from warning to urgent) if the priority level of the order for which the virtual provider is applying is high (e.g. priority 8 or above on a scale of 1 to 10); or adjusts the level of the alarm downward (e.g. from urgent to warning) if the priority level of the order for which the virtual provider is applying is low (e.g. priority 3 or lower on a scale of 1 to 10);

7) determines the appropriate text for the alarm given the level of the alarm (e.g. one message is used for urgent alarms, a different message is used for warning alarms);

8) determines the purchaser staff to whom the alarm should be sent, based upon the level of the alarm, and based upon the purchaser staff members identified in the order record for the particular order in which the virtual provider is interested (as shown in FIG. 6.1);

9) determines the current embodiment staff to whom the alarm should be sent, based upon the level of the alarm, and based upon the embodiment staff members identified in the order record in which the provider is interested (as shown in FIG. 6.1);

10) sends the alarm messages;

11) repeats the above for the next virtual provider until all virtual providers have been examined.

A similar routine may then be executed by the Alarm Subsystem for each and every condition that can generate an alarm.

Creating "Virtual Providers" by Matching Resumes with Orders

A "virtual provider" was earlier defined as the stored information about a provider including the identity of a particular order that the provider is interested in. In this embodiment, a "virtual provider" is a pair of related records in the Provider Database (as illustrated in FIG. 7) that may be referred to as an informational pair. The system may create virtual providers for a given order from provider resumes sent to system 1, and stored in computer storage. Such resumes may have been stored in computer storage either before or after the order was created. The methods by which resumes may be entered into storage was described earlier.

In an order record (as illustrated in FIG. 6.1) there may be several types of data fields relevant to the creation of "virtual providers" such as: 1) Desired Resume Keywords, 2) Required Provider Attributes and 3) Knock-out Provider Attributes.

The Provider Info Input Subsystem (210 in FIG. 14) creates (or attempts to create) additional virtual providers each time an order is created, based upon the above data fields. For providers already present in computer storage at the time a new order is created, a routine within the Provider Info Input Subsystem may create virtual providers related to the new order in the following way, beginning with the first provider in storage:

1) creates a "keyword score" for the provider's resume; the keyword score may simply be counting the number of times each keyword appears within the resume and totaling this count for all keywords identified in the order record (FIG. 6.1); or it may be more sophisticated, such as giving extra weight to keywords that are clustered in a single paragraph or clustered more closely together;

2) determines if the keyword score for this particular resume is above a minimum keyword score defined by the Provider Info Input Subsystem;

3) determines if the provider's resume contains all Required Provider Attributes;

4) determines if the provider's resume contains none of the Knock-out Provider Attributes;

5) if the resume passes the tests in #2, #3 and #4 above, then the resume may be used to create a new virtual provider record (as illustrated in FIG. 7.3) related to the new order; and the virtual provider step sequence (FIG. 7.2) may be initialized as the same as the order default step sequence as stored in the order record (FIG. 6.2);

6) notifies (e.g. by e-mail) the purchaser (who created the new order) that a new virtual provider has been created, and asks the purchaser to optionally modify the step sequence for this particular provider (FIG. 7.2);

7) notifies (e.g. by e-mail) the provider that his/her resume has been matched with a particular order;

8) continues with the next resume in storage;

A similar procedure may be carried out by the Provider Info Input Subsystem when a new resume is placed into computer storage after an order has already been created. In this case, the procedure may generally be the same, except that the new resume is compared in the above manner with every order in storage. This may result in one or more virtual providers being created based upon the same resume.

Creating Virtual Providers by Matching Provider Data Records with Orders

The system 1 may include a database of provider data available for matching. The Provider Info Input Subsystem in this embodiment may create virtual providers from the providers in this database whenever a new order is entered, without using resumes. The process is similar to the process described above (for creating virtual providers from resumes of providers) with two changes:

1) Substitute the word "provider data record" for the word "resume";

2) The keyword scoring method may be different than that described above, in order to compute a score that measures the degree of match between the provider data record and the order. One such scoring method is described in the section below on Scoring and Ranking.

Operation of the Step Sequencing Subsystem and the Status Updating Subsystem

Once the embodiment has created a "virtual provider", the Step Sequencing Subsystem may begin to operate with respect to that virtual provider. It may generally execute each step as indicated in the record of that virtual provider within the Virtual Provider Steps table (illustrated in FIG. 7.2). After one step is completed, if there is another step and if the virtual provider has not been eliminated, the next step may be immediately begun, unless the Step Sequencing Subsystem determines that there is a reason for a delay. One such possible reason for delay was presented earlier—that an insufficient number of virtual providers for the same order have reached this step (the "step delay" feature) and the "step delay" feature is enabled for this order.

After each step is completed, the Step Sequencing Subsystem may determine whether or not to eliminate the virtual provider at this point, or to begin the next step. This may be determined by comparing the current score(s) for the virtual provider (in FIG. 7.3) with the threshold score(s) for the next step (in FIG. 7.2). If any one of these threshold score(s) is higher than its corresponding current score, then the virtual provider may be eliminated at this point. If a virtual provider is eliminated, the Step Sequencing Subsystem may immediately invoke the program identified by, or contained in, the "Action if Below Threshold Score(s)" field (in FIG. 7.2). There are other possible methods of comparing scores and determining if the virtual provider is eliminated at any given point.

The Status Updating Subsystem is generally responsible for filling in the various status fields in the virtual provider records (see FIGS. 7.2 and 7.3). It may do this every time the Step Sequencing Subsystem invokes the Status Updating Subsystem. The Step Sequencing Subsystem invokes the Status Updating Subsystem every time there is a change in status, for example when a step is reached, started or completed, or some sub-step within a step has been initiated by the Step Sequencing Subsystem.

The Status Updating Subsystem may update the "Current Score(s)" field(s) when the Status Updating Subsystem determines that new score data is available for a virtual provider. The Status Updating Subsystem may check to see if new score data is available for a virtual provider when the Status Updating Subsystem is invoked at the completion of a step.

How an Individual Step is Executed

This section discusses the operation of the Step Sequencing Subsystem 214 in FIG. 14 after a step is reached and/or after any delays caused by the Step Delay feature (discussed earlier) are experienced. The Step Sequencing Subsystem may first send all notices to individuals (the provider and staff member, as called for in the Virtual Provider Step table (FIG. 7.2)). These notices may request that the individuals enter certain data into computer storage. The method by which this is done is discussed below under "Automated Communications." Examples of the data to be entered into computer storage in this manner include: additional essential information not found in the resume, desired date and time for an interview, answers to interview questions, answers to test questions, etc.

If the provider or staff member (or both) have not yet begun to enter data after the maximum amount of time has elapsed, as indicated by the "Max Time to Start Provider Data Entry" and "Max Time to Start Staff Data Entry" fields respectively, then a second notice may be sent to the delinquent person(s). If the provider or staff member (or both) have not yet begun to enter data after the maximum amount of time has elapsed after the second notice was sent, the step may time out so that no further action is taken by the Step Sequencing Subsystem in this step sequence until some human intervention corrects the problem. In order to stimulate this human intervention under this condition, the Step Sequencing Subsystem may invoke the Alarm Subsystem. If the problem was due to lack of response from the provider, a human may then choose to eliminate the provider for this reason.

If the provider and purchaser staff member begin to enter data as called for in their notices, but do not complete it within the amount of time called for by the "Max Time to Finish Provider Data Entry" and "Max Time to Finish Staff Data Entry" fields, the step may time out and no further action is taken by the Step Sequencing Subsystem in this step sequence until some human intervention corrects the problem. In order to initiate this human intervention under this condition, the Step Sequencing Subsystem may invoke the Alarm Subsystem. If the problem was due to lack of response from the provider, a human may then choose to eliminate the provider for this reason.

If both the provider and staff member enter the data called for in the notices, the Step Sequencing Subsystem 214 may advise the Status Updating Subsystem 212 that the "All Responses Received" status has been achieved for this step.

The Step Sequencing Subsystem 214 may then, depending on the particular step, invoke a program to process the data received.

For example, a program may be invoked to update virtual provider scores based upon a provider's interview or test answers. As such, the use of updated information provides for iterative scoring. The identity or content of this program may be found in the "Action After Data Received" field in FIG. 7.2. Depending on the particular action program, an alarm may still be sent out calling for human intervention, if certain conditions exist. Unless an alarm is sent out calling for human intervention, when the program in the "Action After Data Received" field is completed, the Step Sequencing Subsystem 214 may advice the Status Updating Subsystem 212 to report that the step has been completed.

The Step Sequencing Subsystem 214 may at this point determine whether or not to eliminate the virtual provider based upon scores. This was discussed earlier under "Operation of the Step Sequencing Subsystem and the Status Updating Subsystem".

The Formalizing Decision

Once a provider has successfully completed all steps defined in a given virtual provider (FIG. 7.2) prior to an offer being made, such as for example one or more interviews, one or more tests and other due diligence steps, additional steps may then be carried out to formalize the relationship between provider and purchaser. These steps may include requesting the purchaser to make a hiring decision and then submitting an offer to the provider and asking the provider to accept the offer. These steps may be handled in the same manner as all previous steps, as described in the previous section. This includes, for example, sending out notice(s), waiting for response(s), timing out if necessary, sending alarms if necessary, taking action after data is received, changing status codes and date fields, etc.

Once a provider has accepted an offer, there may be additional steps in the step sequence. The system of the current embodiment may, for example, manage such steps as preparing government and company forms, selecting benefit plans, etc. The purchaser or the embodiment operator may eliminate a formalized virtual provider if one or more post-decision steps are not completed successfully or if the provider withdraws. Once again, all post-decision steps may be handled in the same way as earlier steps, as described in the previous section, or the handling may differ.

Status Reporting

The Output Status Report subsystem (203 in FIG. 14) (similar to feedback process 28 in FIG. 1) may draw from some or all of the data in some or all of the databases (as illustrated in FIGS. 4-7) to prepare status reports. There may be many different types of status reports. Different status reports may be prepared regarding the entire system, individual purchasers, individual orders and individual providers. Different status reports may include the contents of particular fields as well as summary data about many fields and records. The particular content of different status reports is not in the scope of this embodiment.

Status reports may be printed, sent by e-mail, displayed on a computer screen, or delivered by other electronic means. Status reports may be generated on demand by purchaser staff members or embodiment staff members or providers. The Output Status Reports (203) may determine whether any given individual has access to each particular status report. The Output Status Reports subsystem 203 may also invoke the Timer to cause a particular status report to be generated at a particular time or times, or after a particular amount of time has elapsed.

Billing

The Output Invoices subsystem (206 in FIG. 14) and Input Receipts subsystem (209 in FIG. 14) may generally handle billing. Generating Invoices and Inputting Receipts may be handled using the standard methods known to practitioners of the art. The data needed for billing purposes may be stored in the purchaser table. (FIG. 5.1). This may include, for example, the "Billing Method" to be used, the "Billing Frequency" and the "Billing Amount". This is similar to the functionality provided by billing process 30 and accounting database 32 in FIG. 1.

Determination of the billed amount may be handled in various manners, which is made possible by attributes of the current embodiment. This in turn allows the current embodiment to provide revenue streams in alternate fashions. This is advantageous because different fashions of billing may be suitable for different types of human shoppers, thereby serving to attract more human shoppers overall.

One manner to handle billing is to simply bill purchasers a flat amount of money on a periodic basis (such as once a month). In this case, the "Billing Amount" field may contain the amount to be billed to each period (e.g. $2000.00). This manner of billing may be preferable for a purchaser that uses the system of the current embodiment regularly.

Another manner to handle billing is to bill purchaser in proportion to the number of staff members having a certain role (e.g. "recruiter) during the billing period. In this case, the "Billing Amount" field may contain the amount to be billed for each such purchaser staff member (e.g. $500.00).

Another method to handling billing is to bill a purchaser in proportion to the number of unique (i.e. different) orders that were active for that purchaser during each period. In this case, the "Billing Amount" field may be the amount to be billed per unique order during each period, (e.g. $100.00 per unique order). This billing method may be preferable for purchasers that do not use the system of the current embodiment regularly.

Another method to handle billing is to bill a purchaser in proportion to the number of formalized relationships (e.g. hires) taking place for that purchaser during each period. In this case, the "Billing Amount" field may contain the amount to be billed per formalized relationship during each period (e.g. $1000.00 per formalized relationship.)

Another method to handle billing is to bill a purchaser in proportion to the number of steps completed during each period by that purchaser. In this case, the "Billing Amount" field may contain the amount to be billed per step completed during each period, e.g. $1.00 per step.)

Details of Automated Communications

A particular communication-related issue may arise with the embodiment described herein. In this embodiment, the system of the current embodiment from time to time may notify providers, and may also have to notify purchaser staff members, of the need to perform certain actions. So that the process implemented by the system may proceed on a timely basis, these notifications are preferably sent out whether or not the person receiving the notice is currently in communication with the system at the time the notice is sent.

The preferred method of sending such notices is by standard e-mail. In many cases, the purpose of such e-mail notices is to request that the person receiving the e-mail message provide certain data, or answer certain questions. The data or answers so provided are typically associated (by the system) with the provider or purchaser staff member that provided the data or answers. There are several methods of implementing a user interface that may be easily accessed in response to a standard e-mail message, wherein the data or answers input into that user interface can be associated with the particular person who received the e-mail message originally. Two such methods are discussed below.

A preferred method involves placing a worldwide web link within the e-mail message, with the username (and optionally a password and/or other identifying information) of the e-mail recipient embedded invisibly within the link. When the user reading the e-mail message clicks on this link, the web server holding the linked web page activates the linked web page. This web page may contain the user interface where the desired data or answers can be entered by the user who clicked on the link in the e-mail message.

Clicking on this link may also send to that same web server the name (and optional password and/or other identifying information) of the user who had received the e-mail message. Practitioners of the art will recognize that the answers or data provided by the user may then be associated (e.g., in a relational database) with the particular user who had been sent the e-mail message containing the link.

Another method involves passing the user interface program (such as a data entry questionnaire or a simulated interview) to the user within the e-mail message itself, or as an attachment to the e-mail message. The program so passed may typically contain both the method (e.g. software) for implementing the user interface itself and the contents of the user interface (e.g. the particular questions, field sizes, default answers, etc.)

Using current technology, the user interface described above may be passed as HTML or XML code embedded directly within the e-mail message or as an attachment. As an attachment, the user interface may be implemented in any language (e.g. HTML, Visual Basic, Java, etc.) as appropriate to the particular information being exchanged between the embodiment and the user and the method of exchange. Answers may be stored in the user's system and returned to the server in which the embodiment is operating by means of return e-mail.

Scoring and Ranking

Structure and General Functioning

This section generally references the flow chart of FIG. 15. Different embodiments may include subsets or supersets of the functionality illustrated in FIG. 15.

FIG. 15 represents but one of many ways to divide up the major functions and subsystems of an embodiment of the current embodiment. Also, the names of functions and subsystems are generally arbitrary. FIG. 15 corresponds to FIGS. 1 and 14 in certain aspects.

In different embodiments, automated data processing equipment may be used to carry out some or all functions and store some or all of the data. However, the use of automated data processing equipment is not necessary to carry out the current embodiment. In some embodiments, some or all functionality may be carried out by an online system, which may optionally be delivered over the World Wide Web. In other embodiments, certain functions may be manually performed.

Human shoppers are generally given the opportunity (301) to supply identifying information and other information. The Purchaser Input, Order Input, and Provider Input Subsystem (302) may generally keep track of identifying information, membership status, payment status and other information for each human shopper. This is generally referenced to herein as "Human shopper Membership Data".

If a human shopper requests it, update notices may be sent to the human shopper (303). An update notice may inform the human shopper that there has been a change to the Knowledge-base (305) that may require that a selection criteria set belonging to this human shopper should be modified. (The knowledge base is discussed in more detail later.) Update notices (303) may also be used to provide or request other information to human shoppers. An update notice may be sent by e-mail, or by other means appropriate to the user of the current embodiment and the human shopper.

In the current non-symmetric embodiment, one category of human shoppers may be providers (e.g. people looking for jobs) and a second category of human shoppers may be purchasers (e.g. employers looking for employees.) In other embodiments, there may be only one such category of human shoppers. For example, in an embodiment intended for a dating service, the same kind of information in selection criteria sets may be stored for all human shoppers.

The Intelligent Input Forms Subsystem (304) may create the input forms (e.g. online forms, printed questionnaires, etc.) with which human shoppers provide selection criteria sets. Input forms may be generally referred to as "intelligent" because the information requested, questions asked and multiple-choice options within questions may vary depending on the contents of the Knowledge-base (305) and depending on information provided earlier by the human shopper on the input forms.

For example, in an embodiment used by an employment service, an input form may ask if a provider has expertise in "routers." If the provider answers yes, then the input form may provide a list of manufacturers of routers, asking the provider to identify with which manufacturers the provider has expertise. The process of generating or providing input forms may continue in this way for an appropriate number of levels so that sufficient information is received. For example, and again with reference to routers, once the provider identifies a router manufacturer, the system may then provide an input form that permits the provider to identify exact router models sold by that manufacturer with which the provider has expertise. As such, the input forms subsystem 304 preferably obtains more detailed information to aid the efficient matching by system 1.

The Knowledge-base (305) preferably contains all of the information necessary to generate these variable input forms. This information may include the types of questions to be included in the input form, and, for multiple-choice questions, the particular options within each multiple-choice question. This information may also include the dependencies between the answers provided by human shoppers or providers and subsequent questions and multiple-choice options provided by the system. For example, and again with reference to routers, the Knowledge-base (305) may contain a list of all router manufacturers and the particular models of routers supplied by each router manufacturer.

The contents of the Knowledge-base (305) may be maintained by experts so that the information sought increases the usefulness of the Knowledge-base (305). In addition, the Knowledge-base (305) may be modified automatically (continuously or periodically) by the system. In this embodiment, the ability to automatically update the Knowledge-base (305) may be provided by the Knowledge-base updating subsystem (310). The Knowledge-base updating subsystem (310) may obtain the information used to update the Knowledge-base (305) from data (307) input by purchasers and processed by the Purchaser Input Processing Subsystem (308). This may occur in the following way.

The purchaser may be given the option in multiple-choice questions to provide one or more answers not provided in the list of options provided by the system. This may be referred to as "write-in" multiple-choice answers. The Purchaser Input Processing Subsystem (308) may detect write-in answers, and may send these write-in answers to the Knowledge-base Updating Subsystem (310). Optionally, the Knowledge-base Updating Subsystem (310) may output proposed Knowledge-base updates for the purpose of review, correction and/or approval by human experts (306) before the Knowledge-base is actually updated.

The Purchaser Input Processing Subsystem (308) may cause the answers provided by purchasers to be stored in an appropriate database such as the Purchaser Database (309) or other database. The Scoring Subsystem (310*a*) may use the data stored in the Purchaser Database, Provider Database, and Order Database (309) to generate a score for each pair of order and provider.

The Scoring Subsystem (310*a*) may first determine that a pair of order and provider is appropriate for scoring. This is generally referred to as "pre-selecting." In this non-symmetric embodiment, the Scoring Subsystem (310*a*) may pre-select pairs of Selection Criteria Sets, one from an order and one from a provider. This process was described earlier.

(In a symmetric embodiment in which there is typically one category of human shoppers, the scoring system might use some type of rule system to pre-select appropriate pairs of Selection Criteria Sets based upon information in the databases (309). For example, in a dating system, the embodiment might first determine a human shopper's gender, and whether the human shopper is interested in a serious or casual relationship, or both. Such a rule-based pre-selection process may have many stages. For example, using the same example, a second pre-selection stage may pre-select only those pairs of human shoppers that meet each human shopper's criteria, e.g., race, physical characteristics, interests, etc.)

There are preferably at least two methods possible to carry out the pre-selecting process. In one method, a list of pre-selected pairs may be first generated and stored. Then the system may compute a score for each pair in this list of pre-selected pairs. In another method, the system may find a pre-selected pair and immediately generate a score for this pair. Then the Scoring Subsystem 310*a* may find another pre-selected pair and generate a score for this pair. Both methods are within the scope of the current embodiment, but which method is used may depend upon details of the equipment used, what part of this process is automated and what part is not-automated, the number of human shoppers and other factors.

The Scoring Subsystem (310*a*) may generate a score for each pre-selected pair of Selection Criteria Sets (that is, a pairing of an order and a provider.) This score may be stored in the Virtual Provider record, which may involve storing this information in provider database of FIG. 7. This score for each pair of human shoppers may indicate how strong or useful the matching of this pair of Selection Criteria Sets is. Preferably, a higher score generally indicates a stronger or more useful matching, and a lower score generally indicates a weaker or less useful matching. The maximum score may be an arbitrary number, such as 100 and the minimum score may be an arbitrary number, such as zero (0). The score for each pair may be determined by a pre-determined formula.

The formula used for scoring may vary in each embodiment. The formula used for scoring may be stored in the Knowledge-base (305) or it may be stored separately. It may be table-driven or it may be hard-coded. In the preferred embodiment, the score may be the sum of Sub-scores:

$$\text{Score} = \text{sum of Sub-scores} \qquad \text{Formula 1}$$

In this embodiment, each Sub-score is generated from the answer to a single question. In the current non-symmetric embodiment, since there are two categories of human shoppers (purchasers and providers), each Sub-score may be generated from the answers to a pair of corresponding questions, wherein one question is asked to purchasers for a particular order and the other question is asked to providers.

For example, if a pair of corresponding questions pertains to "routers", the question asked to purchasers might be "For which of the following router models do you require expertise?" The corresponding question asked to providers might be "For which of the following router models do you possess expertise." In this example, the actual list of routers provided as multiple-choice options may be the same but the question may be different to reflect the kind of human shopper to which it is addressed. The Sub-score for each question (or pair of corresponding questions) may be determined by the following formula:

$$\text{Sub-score} = \text{number of matching options} \times \text{Sub-score Weighting Factor} \qquad \text{Formula 2}$$

The number of matching options may be the number of multiple-choice options that are the same in both Selection Criteria Sets, for the particular question corresponding to this particular Sub-score. For example, continuing with the same example of an employment system, an order's Selection Criteria Set may specify a need for router expertise and may specify seven different models of routers for which expertise is needed. A provider's Selection Criteria Set may specify that the provider has expertise in four of these seven models of router. Accordingly, the number of matching options would, in this example, be four (4).

In this embodiment, there is a Sub-score Weighting Factor for each question. The Sub-score Weighting Factor may indicate the importance of the Sub-score corresponding to this particular question. In the example above, the Sub-score Weighting Factor may indicate the importance that the employer places on the prospective employee having a knowledge of routers.

The Sub-score Weighting Factor may be provided by the system, in an automated or other fashion, by the operator of the system or by purchasers. If the latter, the Sub-Score Weighting Factor may be stored in the order Database (309) as part of each order. If provided by the system or by the operator of the system, the Sub-Score Weighting Factor may be stored in the Knowledge-base (305).

A weighting factor may be applied to each multiple-choice option (within each question.) These weighting factors are called Option Weighting Factors. The "number of matching options" in Formula 2 would be replaced by a sum of products, where each product is called an Option Score:

$$\text{Sub-score} = (\text{sum of Option Scores}) \times \text{Sub-score Weighting Factor} \qquad \text{Formula 3}$$

Each Option Score may correspond to one multiple-choice option under the same question (such as, one model of router, using the previous example). Each Option Score may be determined by the following formula:

$$\text{Option Score} = (1 \text{ or } 0) \times \text{Option Weighting Factor} \qquad \text{Formula 4}$$

A one (1) may be used where there is a match between a particular multiple-choice option within a single question. A zero (0) may be used where there is no such match for that particular option. For example, and continuing with the previous example, a one (1) may be used where the employer seeks expertise in a particular router model, and the provider claims to possess that expertise. Otherwise, a zero (0) may be used where there is no match for that router model.

The Option Weighting Factor may be provided by the system in and automated or other fashion, by the operator of the system or purchasers. If the latter, the Option Weighting Factor may be stored in the Order Database (309) as part of each order. If provided by the system or by the operator of the system, the Option Weighting Factor may be stored in the Knowledge-base (305).

In this embodiment, the Score computed in Formula 1 may be a preliminary Score, and the final Score may be determined by applying correction factors. The Correction Subsystem (312) may determine a Final Score (for a particular pair of Selection Criteria Sets—i.e. a pairing of an order and a provider) by multiplying the Preliminary Score by one or more correction factors based on such things as interviewing 311, objective testing 313 and/or reference checking 315, according to the following formula:

Final Score=Score×Interview Correction Factor×Testing Correction Factor×Reference Correction Factor    Formula 5

The Interview Correction Factor 311 may be determined by any interviews conducted with the provider. The Testing Correction Factor 313 may be determined by an objective test given to the provider and the Reference Correction Factor 315 may be determined by checking the references of the provider. There may be additional correction factors.

The Correction Subsystem (312) may use another more accurate method to determine the Final Score. In this method, there is a separate correction factor for each option (within each multiple-choice question). Thus, with this method, each Option Score may be revised by the Correction Subsystem 312 as follows:

Final Option Score=(1 or 0)×Option Weighting Factor×Interview Correction Factor×Testing Correction Factor×Reference Correction Factor    Formula 6

Continuing to use the previous example, the accuracy of the provider's claim of knowledge of a particular router may be corrected by additional evidence gathered during an interview (311), gathered by objective testing (313), and gathered by checking with references (315) or gathered by other means. Each correction factor is a value between zero (0) and one (1). One or more of these correction factors may not be available for a particular option. If a particular correction factor is not available for a particular option, then the value of one (1) may be used.

Once all Final Option Scores have been calculated, each Final Sub-Score may be determined by Formula 7 and the Final Score may be determined by formula 8:

Final Sub-score=(sum of Final Option Scores)×Sub-score Weighting Factor    Formula 7

Final Score=sum of Final Sub-scores    Formula 8

As shown in FIG. 15, the corrected scored or ranked output (314) may then be provided.

The above-described scoring method need not necessarily become more complicated when there are multiple levels of multiple-choice criteria. The following example will demonstrate this point again with reference to an employment service embodiment of the current embodiment. In this example, a particular job offer is described by a Selection Criteria Set within an order. In this sample Selection Criteria Set, the employer specifies the following employment requirements:

| | |
|---|---|
| Job category: | Network administrator |
| Technology skills needed: | Routers, switches |
| Router manufacturer expertise needed: | Cisco, Lucent |
| Cisco models expertise needed: | Cisco 3350, Cisco 4450 |
| Lucent models expertise needed: | Lucent 5800, Lucent 6800 |
| Switch manufacturer expertise needed: | 3COM, Intel |
| 3COM models expertise needed: | 3COM 7700, 3COM 7800 |
| Intel models expertise needed: | Intel 8300, Intel 8400 |

Each of the above models of equipment may be assigned a weighting factor by the employer (i.e. purchaser). A weighting factor may also be assigned to each technology skill needed (routers and switches.) There may generally be no need to assign a weighting factor to each of the manufacturers but this could be done if desired. For a given job-seeker (i.e. virtual provider), an Option Score may be computed for each router and switch model. A Sub-score may then be computed for each of the two technology skill areas at issue (routers and switches) using Formula 3 by including the Option scores for all the models under that technology skill area.

Scoring Free Text Data

Some data in Selection Criteria Sets may be provided by human shoppers as free text, rather than by selecting from a list of multiple-choice options. The Knowledge-base (305) may specify what questions are to be asked to human shoppers and may also specify which questions require or seek free text answers and which questions require multiple-choice answers.

One category of human shoppers (e.g. providers) may be asked a free-text question even though the corresponding question asked of the other category of human shoppers (e.g. purchasers) is a multiple-choice question. For example, using an employment service embodiment, an employer may be asked to specify, for a particular job offer, the specific technologies and product models for which expertise is required. This information may be entered by selection from multiple-choice lists generated by the Intelligent Input Forms Generation Subsystem (304). However, providers may be asked to provide a free-text description of his/her technical skills.

To score a pairing of Selection Criteria Sets where one set includes multiple-choice data and the other set includes free-text, it is preferred that the scoring occur through keyword occurrences. This may be accomplished by computing the occurrence of each keyword found in the first Selection Criteria Set, i.e. the Set which has multiple-choice values. The system may then count the number of occurrences of this keyword within the free text supplied by the other Selection Criteria Set. It may also determine how closely these keywords are clustered together within the free text. The number of occurrences of the keyword, and optionally the degree of clustering of the keyword may be used by the Scoring Subsystem (310a) to compute the "Keyword Occurrence Value".

The method of computation of the keyword Occurrence Value may depend on the application of the current embodiment. In one method of computation, the Keyword Occurrence Value may be zero (0) if the keyword does not appear at all in the free text, and it may be one (1) if it is appears one or more times. The Option Score may be computed in Formula 9:

Option Score=Keyword Occurrence Value×Option Weighting Factor    Formula 9

Data Structures

Additional relational database schemes that may be used in connection with the current embodiment and that are relevant to the following discussion appear in FIGS. 5, 6, 16, 19, 20 and 21. It will be recognized that similar or essentially the same information may be embodied in different database schemes or by different types of databases or data storage methods. While these figures illustrate separate databases and tables with fields within the databases, the exact configurations may vary.

FIG. 5 illustrates the scheme for the Purchaser Database (309 in FIG. 15, 205 in FIG. 14, 509 in FIGS. 18 and 16 in FIG. 1). This database may be updated every time a purchaser enters or modifies information related to that purchaser. FIG.

6 illustrates the order database as discussed above (208 in FIG. 14, 309 in FIG. 15, 509 in FIGS. 18 and 18 in FIG. 1). FIG. 16 together with FIG. 20 illustrates the scheme for the Knowledge-base (305 in FIG. 1, 305 in FIGS. 15 and 505 in FIG. 18). This database may maintain the data which may be used to construct questions and options within multiple-choice questions.

The schemes illustrated in FIGS. 5, 6, 16, 19, 20 and 21 are appropriate for use as a relational database. Each sub-figure generally refers to a single relational database table. Each item in each table generally comprises a "column" of that table, though the columns are shown vertically. Each data table may contain a unique record ID. Most data tables may also include a column for information that relates that data table to another data table in the overall scheme.

The following discusses the meaning and use of the various tables and columns of FIGS. 5, 6 and 16. As used herein, the word "record" generally indicates each row within a data table.

The Purchaser Data Table (FIG. 5.1) generally stores information about each purchaser making use of the current embodiment. A purchaser may be an individual or an organization. Each human shopper may be billed for using the current embodiment. Depending on the billing system, additional data may be input for billing purposes. Additional information may be included to describe a purchaser as shown in FIG. 5.1, but not all fields need to be used.

The Purchaser Staff data table (FIG. 5.2) generally contains information about an individual, such as a human shopper staff member if a human shopper is an organization. Each individual is preferably a member of or associated with a purchaser or with the embodiment operator. Therefore, the Users data table preferably contains a column (Related Purchaser ID) relating each record in the Users data table to a unique record in the Purchasers data table. If the Related Purchaser ID is left blank, this may mean that the user belongs to the embodiment operator rather than a purchaser organization. Additional information may be included to describe an individual.

The Order data table (FIG. 6.1) generally describes each individual order. Each record in this table may be related to an individual purchaser, by means of the Related Purchaser ID column. A purchaser may have multiple orders. For example, an employer may be offering multiple job positions. Additional information may be included to describe a particular order.

The Order Category data table (FIG. 6.4) describes each order category. An example of an Order Category is "network administrator." Each record in this table may be related to an individual record in the Order data table. A purchaser may create multiple orders, each with a different order category. In this embodiment, each order preferably has a single Order Category, but other embodiments may have more than one.

It should be noted that each record in the Order Category data table may also be related by means of the Order Category ID column to a record in the Order Categories data table in the Knowledge-base database (FIG. 16). This related record in the Knowledge-base database 305 may provide descriptive information about each Order Category.

The Technologies data table (FIG. 6.5) may identify each Technology relevant to each Order Category. An example of a Technology is "Router administration". There may be one or more Technologies for each Order Category. It should be noted that each record in the Technologies data table is related by means of the Technology ID column to a record in the Technologies data table in the Knowledge-base database (FIGS. 16 and 20). This related record in the Knowledge-base database provides descriptive information about each Technology.

The Products data table (FIG. 6.6) generally identifies each Product relevant to each Technology. An example of a product is "Cisco 5300 Router." There may be one or more Products for each Technology. Note that each record in the Products data table may be related by means of the Product ID column to a record in the Products data table in the Knowledge-base database (FIG. 16). This related record in the Knowledge-base database 305 provides descriptive information about each Product.

It will be recognized that different embodiments may have more or less levels of data specificity within the database scheme and related programming. For example, in some embodiments, an additional data table called Product Version may be added. Conversely, in some embodiments, the Products data table may be eliminated without effecting the principles of the current embodiment. Also, one or more of the data tables discussed above may be configured in another database.

Operation of Scoring and Ranking

The operation of the current embodiment with respect to scoring and ranking is now more fully described.

Entry of Data

Different embodiments may specify that some data items are required and others are optional. For required data items that a user neglects to enter, the system may prompt the user for entry of those required data items and not permit continuing until they are entered.

A user may be asked for information by means of standard data entry forms or written questionnaires. Where written questionnaires are used, it is preferred that the information be input into the system. Existing human shoppers may update this information and the system may require that the human shopper supply the correct password, and possibly other identification information for security purposes before the system allows the human shopper to update stored data. Whether a human shopper is accepted or not, as well as billing method, frequency, amount and other billing information, may require approval of the system and/or the operator of the current embodiment.

Once a human shopper has been accepted into the system, if the human shopper is a purchaser, the user may create one or more records in the Purchaser Staff data table. This may be done at the same time or at a later time. In order to create a Purchaser Staff record, a user may be required to supply the correct password for the associated Purchaser. In order to update a Purchaser Staff record, a user may be required to supply the correct password for the Purchaser Staff record.

A purchaser user may then create (or update) one or more orders. The user would supply the information in the Selection Criteria Set part of the order record (FIG. 6.1), (i.e. the fields beginning with Desired Resume Keywords and below).

The system may then ask the purchaser to select one or more Order Categories, from a multiple-choice list. The Order Categories which the system makes available for selection (from the multiple-choice list) may be selected from the Knowledge-base. The Order Category selected by the user may be recorded in the Order Categories data table (FIG. 6.4).

After selecting an Order Category, the system may then provide the purchaser the option to select Technologies for each Order. The Technologies presented as options to the user may be those technologies in the Knowledge-base Technologies data table (FIG. 16.2) whose Related Order Category ID matches the Order Category for which technologies are being currently selected. The selections may be recorded in the Technologies data table in the Order Database (FIG. 6.5).

After selecting one or more technologies for an order, the system may then provide the user the option to select Products for each Technology. The Products presented as options to the user may be those products in the Knowledge-base Products data table (FIG. 16.3) whose Related Technology ID matches the Technology for which products are being currently selected. The selections may be recorded in the Products data table in the Order Database (FIG. 6.6).

For each order, the system may ask additional questions, where the answers are in open text rather than multiple-choice. The text of each such question may be found in the Text Questions data table in the Knowledge-base (FIG. 16.4).

Updating of the Knowledge-Base

Whenever a multiple-choice option is presented to the purchaser, the system may also provide the purchaser the option of "other". If the purchaser selects "other", the Purchaser may be provided the opportunity to enter one or more "write-in" options. A selection of "other" is stored in the relevant data table in the Order Database (FIG. 6) (e.g. Order Categories data table, Technologies data table or Products data table) as any other entry.

In addition, the selection of "other" may cause a new record to be created in one of the data tables in the Knowledge-base (Order Categories—FIG. 16.1, Technologies—FIG. 16.2, or Products—FIG. 16.3). In this case, a value of "Yes" may be placed in the "Tentative?" column for this record. In addition, a new record may be created in the Tentative Options data table (FIG. 16.6). The value of the Accepted? column is initialized as "No."

Periodically, the system may make those records of the Tentative Options table that have not previously been accepted (that is, the value of the Accepted? column is "No") available to system management to optionally review and accept or reject. When accepted, the value of the Accepted column in the accepted record is changed to "Yes." At the same time, the value of the Tentative? Column in the related Knowledge-base records in the appropriate data table (Order Categories—FIG. 16.1, Technologies—FIG. 16.2, or Products—FIG. 16.3) is changed to "No". This may convert the tentative option to a permanent option.

The system may also supply a means for the system operator to create tentative options without input from a user.

Notifications of Knowledge-base Updates

Whenever the Knowledge-base is updated by conversion of a tentative option to a permanent option, an e-mail notice is preferably sent to all purchasers and providers whose orders and virtual providers respectively have related Order Categories (FIG. 6.4) or Technologies (FIG. 6.5) or Products (FIG. 6.6) where the new option(s) would be relevant. The user is preferably invited to update their Selection Criteria Set (within the order or virtual user record) by possibly adding one or more of the new options.

Update Data Entry Mode

The system may restrict access to update mode to those users whose payment status is up-to-date, as indicated by the Account Current? column in the Purchaser data table (FIG. 5.1), and who are permitted access to Update mode, as indicated by the Update Mode Allowed? column in the Purchasers data table (FIG. 5.1)

The update mode may appear to the user to be the same as originally entering information, except that options previously selected are indicated as default entries. New permanent options are presented along with all previous options. The user may add new options or remove previously selected options.

The user may have previously selected options which are now de-activated (the De-activated column in the related Knowledge-base record is now "Yes"). A de-activated option is one that the system operator may consider obsolete. When a Selection Criteria Set is first created, such de-activated options may not be displayed. However, in update mode, such de-activated options may be displayed if they had been selected previously within this Selection Criteria Set. The system preferably marks them appropriately (such as with a "X" mark) to indicate that these options are no longer active. The user may leave the de-activated selection as selected, or de-select it.

Selection Process

Referring to FIG. 17, an alternative embodiment for the selection process and the scoring and ranking methods used is now discussed. As shown, information may be contained in various databases such as resume data 402, standardized skill criteria 404 and purchaser defined skills 406. Candidate (provider) search requisitions 408 may be made into the information contained in these databases. In connection therewith, normalization programs 410 to normalize skill data may be used. Matching programs 412 such as those discussed above may also be used to compare provider information with purchasers' orders.

To this end, there may be a criteria in an order setting forth a mandatory skill set 414. If a particular provider does not have the mandatory skills as in step 416, that provider may be eliminated as in step 418 and appropriate notifications may be sent (as in feedback processes 26, 28 in FIG. 1). Thereafter, another search requisition 408 might be made.

If the provider does have the mandatory skills as shown in step 420, additional matching programs 422 may then be run to determine whether providers meet more detailed requirements of purchasers' orders. For example, the additional matching programs may determine whether providers have skills that a purchaser would consider nice to have 424. If not, as shown in step 426, additional matching programs 428 may then be performed to determine if a particular provider should still be considered, for example, where the provider has strong mandatory skills as shown in step 430. If not, as shown in step 432, the provider may be eliminated.

If the additional matching programs 428 show that the provider possesses strong mandatory skills as shown in step 434, or if the matching programs 424 showed that the provider did possess nice to have skills as shown in step 436, system 1 may notify the purchaser regarding possible providers found as shown in step 438.

At this point, interviews may be scheduled to advance the process as shown in step 440, and information about the results of the matching programs performed so far may be stored in the general tracking and statistical database 442. Providers being considered may then be notified of interview schedules 444 and the interview process may occur as shown in step 446. The results of these steps, e.g., that the provider was notified of the interview schedule and the purchaser's assessment of the provider after the interview, may be stored in database 442.

At this point, the purchaser may determine whether to accept a prospective provider as shown in step 448. If not, as shown in step 450, additional provider search requisitions may be made. If so, as shown in step 452, the provider may be notified as shown in step 454. Information on these steps may also be stored in database 442.

Associated Business Methods

Business methods and other aspects associated with the current embodiment are now further described. In connection with the employment service application described above, memberships may be issued to participate in the system. Memberships may be issued to both prospective employers (i.e. purchasers) and prospective employees (i.e. providers). In one embodiment, memberships may be obtained by signing up online, e.g., by accessing the web site through which prospective employers and employees would provide the types of information described above. Alternatively, memberships may be obtained offline through written agreements or the like.

An employer (i.e. purchaser) may obtain a membership in order to post jobs on a web site. To this end, each employer member may be assigned an identification number so that the system may track which employers members are posting jobs, and how many. In this manner, an appropriate fee may be charged to the employer member. It is preferred that such identification numbers would reside in an appropriate field of the tables in the databases of the system.

As an alternative, the system operator may post jobs (i.e. orders) for employer (i.e. purchaser) members. To this end, the system operator may have expertise in determining what types of orders an employer member actually needs, e.g., in the information technology area. Accordingly, the system operator may assess the employer member's needs and itself post appropriate orders on the system. This provides the benefit that the employer member need not expend time and effort in preparing appropriate orders.

It is preferred that each order be accompanied by a work order number so that the status of the order may be tracked through the system. With this tracking aspect, the system would allow it to be determined at what stage the order is in, e.g., whether there have been any responses to the job posting by prospective employees, whether interviews have occurred, etc. Accordingly, the employer member could check on the status of its efforts to obtain employees. It is preferred that such work order numbers would reside in an appropriate field of the tables in the databases of the system.

Employee members (i.e. providers) may also obtain memberships to post information about their capabilities and work desires. Provider members may also be assigned identification numbers so that the system may determine who is using the system and how often. An appropriate fee may then be charged to the provider member.

Another business method aspect of the current embodiment involves the generation of revenue through advertisements. For example, prospective employers or any other type of entity may place banner advertisements on the web site through which the system may operate. Appropriate fees may be charged to such entities based on the size of the banner ad, the duration for which it appears on the web site, how many hits there are on the web site and/or other factors.

The memberships, tracking features, banner advertising discussed above may also be used in connection with dating services or other applications.

It will be apparent to those skilled in the art to which the current embodiment pertains that variations and modifications of the described embodiments may be made without departing from the spirit and scope of the current embodiment. For example, though the current embodiment is discussed in connection with dating service and job search applications, the current embodiment may be used in other applications.

Interviewing and Testing

Structure and General Functioning

The structure and general functioning of the interviewing and testing aspects of the system and method of the current embodiment are now further described. It should be noted that the figures illustrate preferred manners in which functions and subsystems of the current embodiment may be divided or configured. Alternate configurations may be used. Also, the names of functions and subsystems may vary.

In different embodiments, automatic data processing equipment may be used to carry out some or all functions and store some or all of the data, but the use of automatic data processing equipment is not necessary to practice the current embodiment. In some embodiments, some or all functionality may be carried out by an online system, which may optionally be delivered over the World Wide Web. In other embodiments, certain functions may be manually performed.

Referring now to FIG. 18, human shoppers such as providers looking for a job, may generally be given the opportunity as shown in step (501) to interface with the system in order to update previous answers to given questions with respect to particular topics that arose in, for example, an earlier interview or test. Optionally, in connection with inputting new answers (501), the system may ask different questions (on each topic) each time the same human shopper revisits. This preferably reveals any attempt or inadvertence by the human shopper to provide inaccurate or false information.

As shown in FIG. 18, various subsystems are linked to the knowledge-base (505), which is in turn linked to the Question Output Subsystem (504). The Question Output Subsystem (504) preferably creates the input forms (e.g. online forms, printed questionnaires, etc.) which may be used by human shoppers to provide answers to questions. The questions asked, and multiple-choice options within questions may vary depending on the contents of the knowledge-base (505) and depending on information provided earlier by the human shopper.

The knowledge-base (505) preferably contains all of the information to generate these variable input forms, as illustrated in FIG. 20. To this end, the knowledge-base (505) preferably includes the types of questions to be included in the input form, and, for multiple-choice questions, the particular options within each multiple-choice question. The knowledge-base (505) may also include the dependencies between the answers provided by human shoppers and subsequent questions and multiple-choice options provided by the system.

The contents of the knowledge-base (505) may be maintained by experts (506). To this end, FIG. 18 shows the link between knowledge-base (505) and experts (506) through which experts may provide input. Experts may be notified by the system that there are changes in the knowledge-base that require modifying questions and answers. Expert input may also be provided to the knowledge-base (505) for other reasons.

As shown in FIG. 18, after answers to the questions are received by the human shopper, these answers are input as shown in step (507). Thereafter, the system preferably includes an Answer-input Processing Subsystem (508). To this end, subsystem (508) may generally provide the answers to the Order Database and Provider Database, Including Previous Scoring Data (509). Database (509) preferably stores current answers provided by providers as well as prior answers. Human shopper information stored in database (509) may be provided to the Correction Subsystem (510) as shown in FIG. 18.

The Correction Subsystem (510) preferably uses the answers to questions stored in the Provider Database (509) to generate correction factors which are then stored in the Provider Database. The Scoring Subsystem (511) may then apply these correction factors to determine an updated score for a given virtual provider.

The formulas used for scoring and for correction of scores may vary in each embodiment. Formulas used for scoring and correction of scores were described earlier.

Data Structures

The data structures of the current embodiment are now described with reference to FIGS. 5, 19, 20 and 21. Generally, these figures show databases, tables and fields that may comprise part of, or otherwise reside in a relational database scheme. Practitioners of the art will recognize that the principles of this database scheme may be used for any applications of the current embodiment. Practitioners of the art will also recognize that essentially the same information may be embodied in different database schemes or by different types of databases or data storage methods.

FIGS. 5, 19, 20 and 21 generally illustrate separate databases. These databases may be related since there are fields that are common to more than one of them. FIG. 5 generally illustrates a Database of Purchaser Data (509 in FIG. 18). This database is preferably updated every time a purchaser enters or modifies information related to that particular human shopper. FIG. 19 shows a database for storing interview information. This may actually comprise part of the provider database of FIG. 7. FIG. 20 generally illustrates a database that is part of the knowledge-base (505 in FIG. 18). To this end, the information in the tables of FIG. 20 may generally be contained in the same database as shown in FIG. 16. This database may contain the data which is used to construct questions and answer options. FIG. 21 shows a database for interviewer and tester information.

As mentioned above, the databases illustrated in these figures are suitable for a relational database, and each figure generally represents a single relational database table. Each item in each table is a "column" of that table, though the columns are shown vertically. Each data table preferably contains a unique record ID as well as a column to relate that data table to the other data tables in the relational database. The following discusses the meaning and use of the various tables and columns in this embodiment. In this document, the word "record" is generally used to indicate each row within a data table.

The Interviews data table (FIG. 19.1) is now described. This table may generally reflect information of an interview that may have occurred to verify information provided by a provider. Each record in this table is preferably related to an individual provider and to an individual virtual provider by means of the Related Virtual Provider ID column. This table preferably records the date and place of the interview, as well as the interviewer through the relational ID of a record in the Interviewer table as shown in FIG. 21.1

The Tests data table (FIG. 19.2) is now described. This table may generally reflect information of a test that may have occurred to verify information provided by a provider. Each record in this table is preferably related to an individual provider and to an individual virtual provider by means of the Related Virtual Provider ID column. This table preferably records the date and place of the test, as well as the tester through the relational ID of a record in the Tester table as shown in FIG. 21.2.

The Order Category Corrections data table (FIG. 19.3) preferably identifies each Order Category for which questions were asked in a test or interview. This table preferably stores correction factors which may summarize the answers to questions related to this order category in a test or interview.

The Technology Corrections data table (FIG. 19.4) preferably identifies each Technology for which questions were asked in a test or interview. It preferably stores correction factors which summarize the answers to questions related to this technology in a test or interview.

The Product Corrections data table (FIG. 19.5) preferably identifies each Product for which questions were asked in a test or interview. It preferably stores correction factors which summarize the answers to questions related to this Product in a test or interview.

FIG. 20 describes tables in the knowledge-base and are now more fully discussed. FIG. 20.1 shows a table for storing questions regarding Order Categories. Each record in this table preferably stores one question. The table preferably contains all or most questions for all Order Categories. For each question, there may be a number of possible answers. Shown are columns for two answers, but there may be more than two possible answers, e.g., perhaps four to 10 or more possible answers per question. Each possible answer may have an associated correction factor. It should be noted that the table may also store all information about the status of each question, e.g., whether it is active or not, when it was created, when it was last modified, when it was de-activated, and if an expert created it, which expert created it. Additional status information may be stored for each question.

FIG. 20.2 shows a table for storing questions regarding Technologies. FIG. 20.3 shows a table for storing questions regarding Products. These tables may generally contain the same type of information as FIG. 20.1, as described above. That is, these tables may store questions about technologies and products, respectively, as well as pertinent possible answers.

It should be noted that the embodiment may ask questions from all the above tables for either a test or an interview. For example, the system may ask questions relating to Technologies and it may also ask questions relating to particular Products within an area of technology.

FIG. 20.4 shows a table for storing information about each of the experts that has created one or more questions, or is available to create or modify questions.

FIG. 20.5 shows a table for storing the number of questions in an interview or a test.

FIG. 21.1 may generally contain the information regarding Interviewers, i.e., people who can or have carried out interviews. FIG. 21.2 may contain information for Testers, i.e., people who can or have supervised testing.

Practitioners of the art will recognize that different embodiments may have more or less levels of data specificity within the database schema and related programming.

Operation Of The Embodiment—Interviewing and Testing

The operation of the preferred non-symmetric embodiment in relation to interviewing and testing functions is now more fully described.

Entry of Testing and Interview Data

In the context of an employment service, both human shoppers (purchaser and provider) may have created at an earlier time one or more orders and virtual providers respectively. Each virtual provider has a Selection Criteria Set that may refer to a particular type of order that the provider is seeking. For the purchaser, each order has a Selection Criteria Set that may describe the position offered.

At the time of an interview, the interviewer may fill in a record in the Interview table (FIG. 19.1). For a test, the Tester (i.e. testing supervisor or proctor) may fill in a record in the Test table (FIG. 19.2). The Interviewer or Tester may determine and enter (into the Interview or Test table respectively) the Virtual Provider ID of the specific virtual provider for which the interview or test is being conducted.

If there is no live Interviewer or Tester, the provider who is being interviewed or tested may be asked to select the virtual provider for which the interview or test is to relate.

For interviews, the system may provide an automated interviewer. The automated interviewer asks whatever questions are provided by the embodiment as described below. The automated interviewer may be in the form of an animated character on the screen or an animatronics robot or a holographic image or other automated human technology. The automated human technology may receive the interview questions from this embodiment in real time or prior to an interview. In either case, the automated human technology converts the questions that are given to it by this embodiment into spoken words, along with appropriate vocal tones and appropriate physical mannerisms. Appropriate vocal tones and physical mannerisms may be inferred and generated by the automated human technology. In this embodiment, appropriate vocal tones and physical mannerisms are preferably stored along with the questions themselves in coded form in the knowledge-base.

If a provider is re-interviewing or re-testing for the same virtual provider, the system preferably notifies the provider that this is a re-interview or re-test. The system may use a different set of questions for a re-interview or re-test, assuming there are enough questions for this purpose.

The total number of questions appropriate for each interview and test may be contained in the Number of Questions data table (FIG. 20.5). This table is preferably related to the Order Category table by means of the Order Category ID. In this embodiment, the system may allocate the total number of questions to each product and technology in the following manner: total up the number of products and technologies relevant to the virtual provider. Increment by 1. The reason 1 may be added is to take into consideration the need to ask some questions for the order category as a whole. Divide the result into the total number of questions for the test or interview. In this embodiment, the quotient is the number of questions to be asked for the order category as a whole and for each product and technology.

In this embodiment, the actual questions asked may be random and may be drawn from the table of Technology Questions (FIG. 20.2), Product Questions (FIG. 20.3) and Order Category Questions (FIG. 20.1). In this embodiment, if the provider answers all questions correctly or all questions incorrectly for a given technology or product, an additional number of questions may be asked equal in number to the first group of questions for the same technology or product. This helps ensure that the correction factor is not computed in error. The correction factors are computed preferably using all the questions asked.

If a provider answers a question incorrectly, the embodiment then may follow with at least one additional question regarding the same order category, technology or product to verify that there was no misunderstanding. This question will be a close variant of the first question.

In this embodiment, a correction factor may be computed for the Order Category as a whole, for each Technology for which questions were asked, and for each Product for which questions were asked. The resulting correction factors may be stored in the Order Category Corrections table (FIG. 19.3), the Technology Corrections table (FIG. 19.4) and the Product Corrections table (FIG. 19.5), respectively. As shown in those figures, a separate correction factor may be stored for a test and for an interview.

Correction factors may be computed as follows in this embodiment: Compare the answer given to each question with the answer options given for that question. The answer option is found in the same record where the question is found in the three Question tables illustrated in FIG. 20.1, 20.2, or 20.3. As illustrated in these figures, only two answer options are given per question, but the actual number of answer options may be larger. The database may be configured to handle a reasonable number of possible answers to each question, e.g., 10 or some answers per question.

Once the best possible answer option for each question has been identified in one of the Question tables, the system may determine the correction factor associated with this answer in the same table. A typical correction factor is a value between 0 and 1. A correction factor value of 1 indicates that the associated answer is the best possible answer. A correction factor less than 1 but greater than 0 indicates that the associated answer is partially correct, with a value closer to 1 indicating a greater degree of correctness. A correction factor of 0 indicates a completely incorrect answer.

The system may determine the correction factors for the Order Category and for each Technology for which questions were asked and for each Product for which questions were asked by averaging the correction factors for all questions for the Order Category, for each Technology, and for each Product respectively.

Updating the Knowledge-base

Questions and answer options in the knowledge-base (505) may be created and updated by experts. Experts may generally interface with the knowledge-base as shown in step (506). It is preferred that experts may easily interface with the system. To this end, input forms or other means to provide updates to the knowledge-base may be used. Updates to the knowledge-base (505) may be administered and/or maintained through Knowledge-base updating subsystem (as shown in 310 in FIG. 15).

In this embodiment, the lists of available experts may be found in the Experts data table (FIG. 20.4). The expert most recently responsible for each question preferably enters his/her Expert ID in the questions tables (FIGS. 20.1, 20.2, and 20.3). Updating of these tables may occur to accommodate new Order Categories, Technologies, or Products. Updating may also occur when existing questions and/or answers become obsolete. Updating may also occur for other reasons. Updating is facilitated by the system in this embodiment as follows.

Whenever a new Order Category, Technology or Product is added, all or some experts may be notified of the addition and may be asked to submit questions and answer options. Questions and answer options may be accepted only from those experts with claimed expertise in the area of the addition answer. To this end, the Experts data table (FIG. 20.4) may include additional columns besides those shown to indicate the areas of expertise of each expert. In that case, the system may send notices of additions to only those experts with relevant expertise.

Periodically, the system may send notices to all experts asking them to update the questions they have previously written. Experts that do not respond within a pre-determined time limit, such as 60 days, may be replaced.

Updating Correction Factors

If the knowledge-base has been updated by the addition of new questions or answer options within the prior month, notice may be sent to providers who have virtual providers that have related order Categories, Technologies or Products relevant to the new questions and/or answer options. Such notice may only be sent if the provider has not taken a new test or interview within the prior month for the same order, because in this case, the provider's test or interview would likely have reflected the update. Providers may be invited to take a new test or interview in order to reflect both the latest state of their knowledge and the latest questions and answer options. Results of the new test or interview replace the correction factors determined by the previous test or interview respectively.

The system may restrict access to new testing and/or new interview to those providers whose payment status is up-to-date, as indicated by the Account Current? column in the purchasers data table (FIG. 5.1), and who are permitted access to Update mode, as indicated by the Update Mode Allowed? column in the Human shoppers data table (FIG. 5.1).

Interview Process

Referring to FIG. 22, the interview process is now further described. As shown, interview requisitions 602 may be sent to providers 604 and purchasers 606 and information from such providers and purchasers may be transmitted over a network, such as WAN 608 to servers 610 or other information storage devices. An interview may occur at this time. Storage device 610 may contain information such as purchaser's company information 612, purchaser's job information 614, personality questions 616 and professional related questions 618. This information may be contained in various of the databases and table as discussed above.

In connection with an interview, purchaser company information 612 may be conveyed to providers 604 for their consideration as shown in step 620. If purchaser information 612 interests a provider 604 as shown in step 622, additional interviews may be pursued as shown in step 624. If not, as shown in step 626, a summary of the interview may be sent to the provider as shown in step 628. Such a summary may also be sent to the purchaser 606 for record keeping purposes.

Similarly, purchaser order information 630 may be conveyed to providers 604 for their consideration as shown in step 630. This may occur in connection with an interview. If the provider is interested as shown in step 632, more interviews may be required as shown in step 624. If not, as shown in step 626, suitable summaries may be sent as discussed above.

Also in connection with an interview, information about the provider's personality may be conveyed to purchaser 606 for its consideration as shown in step 634. If the personality meets the purchaser's requirements as shown in step 636, more interviewed may be required as shown in step 624. If not, as shown in step 638, a summary may be sent to purchaser 606 as shown in step 640. Such a summary may also be sent to the provider.

Similarly, information about the provider's skills may be conveyed to purchaser 606 for its consideration as shown in step 642. If the skills meet the purchaser's requirements, as shown in step 644, more interviews may be required as shown in step 624. If not, as shown in step 638, appropriate summaries may be sent.

Additional interviews may be considered as shown in step 624. If it determined that no additional interviews are necessary, as shown in step 646, e.g., because the interviews up to that time convince a purchaser that the provider should be hired, a post interview process 648 may occur. Appropriate information may be stored in general tracking and statistical database 650. If additional interviews are desired, as shown in step 652, appropriate interview requisitions 602 may be made to further the process until a decision is ultimately reached.

As discussed above, this iterative process preferably occurs automatically thereby reducing the amount of human intervention. It is also preferred that this process occurs intelligently with the knowledge base being updated appropriately so that, for example, interview questions may be subsequently asked with prior answers in mind.

Associated Business Methods on Testing and Interviewing

Business methods and other aspects associated with the current embodiment are now described. Earlier, it was discussed that memberships may be charged to human shoppers to participate in the system. For example, memberships may be charged to both purchasers and/or providers. In light of the current embodiment, the membership fee amount might reflect the capability to update information through the giving and/or taking of tests and interviews. To this end, a membership which provides continuous capability to update information may be a different amount that a membership which does not provide this capability.

Fees may also be charged to reflect how many times a human shopper uses information that is updated in the Knowledge-base. For example, if a prospective purchaser enjoys the benefit of tests and interviews given based on updated sets of questions and answer options, that purchaser might pay more on a per transaction basis. Alternatively, a fixed membership fee might be charged depending on the level of updates that the prospective purchaser will have access to.

Although certain presently preferred embodiments of the current embodiment have been described herein, it will be apparent to those skilled in the art to which the current embodiment pertains that variations and modifications of the described embodiments may be made without departing from the spirit and scope of the current embodiment. For example, though the current embodiment is discussed in connection with dating services and job search applications, the current embodiment may be used in other applications.

Variations

The embodiments described herein may use the World Wide Web on the Internet and may utilize the HTML or XML or other protocol. It will be recognized that current embodiment may be implemented using other types of networks and network protocols, such as for example the AOL system, or may be implemented using other systems, including partially or completely manual systems.

In automated embodiments, the server may be one computer system, or it may be two or more systems in which different steps or roles are handled by different systems. It will be recognized that the functions of this current embodiment may be divided in many different ways between different software modules and different systems. In many places, steps may be carried out in different sequence. Those skilled in the art will also recognize that many functions can be carried out by computer software or by non-automated means.

In an automated system, the human shopper interface may be a standard computer keyboard and screen and mouse or may use a telephone keypad or a touch screen, or other user interface device providing both input and output capability. Alternatively, or in addition, the human shopper interface may involve voice entry and may also use audio/video cues. Also, any type of pointing device including a mouse, touch pad, jiggle-button, touch screen, joy stick, voice command, head or eye movement detectors, muscle tension detectors or mental command.

If the current embodiment is implemented over the World Wide Web, standard browsers may be used, or a custom browser or user interface program may be provided specifically for interfacing to the server. Generally, the databases and software would reside on the server. The server may also house a web site that serves as a portal for users to interact with the system.

Reporting and Tracking

The reporting and tracking aspects of the current invention are now further discussed with reference to FIG. 23. This relates to the overall management of the system and method 1 of the current invention, and also relates to the general tracking and statistical database 20 in FIG. 1. As shown, report requisitions from providers 702, report requisitions from purchasers 704 and accounting and billing requisitions 706 may be made to database 708 (which generally corresponds to database 20 of FIG. 1).

Where a reporting requisition is made, an appropriate reporting program 710 may be activated to generate appropriate reports 712. Such reports may be sent to the appropriate requisitioner, e.g., purchaser or provider, as shown in step 714. Reports may also be displayed on a web site associated with system/process 1 for access by the appropriate entity.

Based on information in database 708, statistical calculation programs 718 may be activated to provide information such as an analysis on how a purchaser's open orders are drawing interest from prospective providers. Many other types of statistical reports may be generated to provide information about what is happening in system/process 1. Appropriate statistics, charts, graphs or other information may be generated as shown in step 720. Such statistics, etc. may be sent as shown in step 722 and this information may be accessed as shown in step 724.

Billing programs 726 may be activated to perform accounting functions such as billing process 30 in FIG. 1. For example, upon an operation occurring in system/process 1 that will result in a charge to a purchaser, a billing request may be generated as shown in step 728. The purchaser's account with system 1 may then be debited as shown in step 730, and appropriate billing information may also be stored in accounting database 732 (similar to accounting database 32 in FIG. 1) and database 708. Thereafter an accounting department may be notified that an invoice has been sent as shown in step 736. Payments may also be tracked in connection with this process.

Internal Data Management and Security

Aspect of the current invention related to internal data management and security are now further discussed in connection with FIG. 24. As shown, networks 802 outside of system/process 1, e.g., exterior WANS or the World Wide Web, may be separated from system 1 by appropriate firewalls 804. Within system 1, the various databases 806, 808, 810, 812, 814 and 816 shown (as well as other databases), may be connected to file servers 818. Appropriate tape backups 820 may be made on an ongoing or other basis.

Overall System Components

The following provides an outline of components associated with the current invention.

Patent Software Specifications

I. Hardware and Network

II. Hardware preferably includes the following network equipments:

III. Multiple 10/100 Managed Switches

IV. APC battery backup power

V. Dedicated WAN connections

VI. 2600 series of CISCO routers

VII. Firewall software or hardware

VIII. Multiple Compaq Quad processor servers preferably with at least two hot swappable SCSI hard drivers IX. Air conditioning units for server temperature control X. Tape backup device XI. Software may include:
  a. Sun Solaris 7 or above
  b. Windows 2000 server or better
  c. Windows 2000 professional
  d. ORACLE 8.1 Enterprise Edition Database Server for Solaris
  e. Visual Basic
  f. PERL
  g. MySQL database server
  h. C and C++
  i. Virus Checking Software
  j. Web server software and Secure HTTP certificate
  k. Mail server software XII. Software Overview

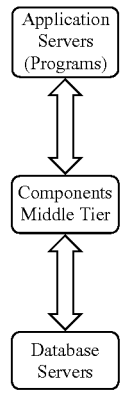

Software may include components, programs and databases. Components are binary codes that are maintained in system cache for faster access and better security control. Programs are referred as front-end applications that directly interact with providers, purchasers, system administrators and any other anonymous users. Databases are storage area for raw data and relationships.

XIII. Components List and Functions

Components discussed here refer to a set of programs or subroutines that may be used over and over again by different programs to perform a particular task or tasks.

a. Database Access Components

All programs may use these components across the system. They provide a standard method to access databases. Components may have security level built in to allow certain users or user groups to be able to add, edit or delete data, for different databases, on different servers. Components may also be cached in all application servers to provide fast and sustained connections. These components are preferably written in C++ for Sun Solaris platform, where the ORACLE databases will be.

b. Provider Data Normalization Components

These components are preferably used to process input data from providers, including, for example, name, email, contact information, salary information, work permits and resumes objects. Normalization may be based on rules either defined by purchasers or system administrator to reflect business needs and to provide better matching between providers and purchasers. These components may be cached in the application server for speedy processing. Normalized data may then be stored in the database, via Database Access Components. Statistics can then be collected on these data.

c. Purchaser Data Normalization Components
   These components may be used to standardize inputs from purchasers, for example, job requirements, locations, experience preferences etc. Standardized data may then be stored in database. These data may also be re-used for other purchasers as a standard way to input data into the system. Statistics can then be collected on these data.
d. System-wide Tracking Components
   These components may be used to track and collect statistical information on all inputted data and activities. This may include activities generated by providers, purchasers, system administrator and anonymous visitors. Statistical information may include system platforms, timestamps, page hits and so on.

XIV. Programs List and Functions
   These are programs that may be used to construct the software.
   a. Store Front Programs
      These programs may include software layout, company logos, HTML pages, graphics and icons, buttons etc. These may likely be static programs that are generated once normally are not updated very often. These may also include any layout templates that are require to display other parts of the software.
   b. Reporting Programs
      Reporting programs may include several areas
         i. Provider reporting programs
         ii. Purchaser reporting programs
         iii. System administrator programs
         iv. Statistic reporting programs
         v. Graphs or charts
      These programs may handle standard reports, predefined by business logic or custom reports, defined by particular providers or purchasers.
   c. Tracking Programs
      These programs may be used to display tracking information, collected by "System-wide Tracking Components", and to set up what information one wants to track. The setup information may then be saved as configurable parameters for tracking components.
   d. Provider Programs
      i. Validate provider data input
      ii. Save and retrieve provider data
      iii. View statistics on provider's data
      iv. Add multiple data sets (ex., multiple resumes)
      Provider programs are mainly used when a provider is inputting data.
   e. Purchaser Programs
      i. Validate purchaser data input
      ii. Save and retrieve purchaser data
      iii. View statistics on purchaser's data
      iv. Add/edit login information for each user under the purchaser's account
      v. Send and receive information in predefined format (word document or PDF document, for example).
      vi. Design and assign security levels for each user under the purchaser's account
   f. Scheduling Programs
      These programs may be used to schedule, for example, an interview, an email reminder. They are preferably able to resolve schedule conflicts, set priorities of different actions, recognize and dependent objects. For example, to schedule an interview, acceptance notifications are preferably received from the provider and the purchaser. These programs may include the following functionalities:
         i. Appointment book
         ii. Address book
         iii. Daily, monthly or quarterly calendar
         iv. Email reminder
         v. Event alarms
   g. Communication Programs
      These programs may provide a standard way for clients and users to communicate to each other. These communication programs are preferably able to use the following tools:
         i. Pager
         ii. Email
         iii. Fax
         iv. PDA
         v. Cellular phone
         vi. Regular phone
         vii. Text message
         viii. Voice message
      These programs may also need to be able to verify that the intended recipients have received the communication successfully, for example, providing an auto-responder.
   h. Billing Programs
      These programs may provide a way for system administrator to collect a fee for users using the system. They may perform the following functionalities:
         i. Credit card processing on demand
         ii. Bill by check
         iii. Rebill user on a monthly basis
         iv. Void and refund transactions
         v. Cancel user when transactions failed

What is claimed is:

1. An automated shopping system in which a user places an order for at least one provider, a degree of matching between each order-provider pairing is computed, and a score reported to at least the user and optionally to the at least one provider, the automated shopping system comprising:

at least one processor to receive and process information including at least one of (a) user information from at least one user including (i) information that specifies provider criteria including identification of provider information to be verified and (ii) order information that specifies order criteria for that particular order, (b) provider information from at least one provider, and (c) third party information;

at least one data storage device that communicates with the at least one processor, that includes at least one database, and that receives and stores the information in the at least one database;

a knowledge base stored in a data storage device and containing information on which to base requests for information by the system;

a virtual provider created within the at least one processor by pairing provider information of a particular provider with order information of a particular order to create an informational pair and stored within the at least one database;

an iterative scoring system within the at least one processor that compares the provider information of a particular provider and the order information of a particular order within each respective informational pair, determines a score reflecting a degree of matching for each respective informational pair, communicates with the at least one processor and saves the score for each respective informational pair in the at least one database, the iterative scoring system including a scoring correction system within the at least one processor, that determines whether a score is based on complete information or whether additional information and determination of a revised score is required, the scoring correction system including:
- (d) inspecting the order and provider information to determine (1) completeness of the order and provider information and (2) presence of provider information identified in the order as requiring verification, and, if no further information is required by the system, indicating that the score is complete or, if further information is determined appropriate for said (1) or (2), proceeding to (e) and (f) as follows:
- (e) communicating with the knowledge base to obtain requests for additional information from outside the system including (3) requesting information determined to be incomplete from at least one of the user and the provider and (4) requesting verification of provider information from a third party, and
- (f) updating the score in the iterative scoring system to obtain a revised score based on the additional information received and saving the revised score for each respective informational pair in the at least one database.

2. The automated shopping system of claim 1, wherein the score is computed from a predetermined formula which includes at least one of user-specified criteria, user-specified weighting factors, and user-specified relative importance of respective criteria.

3. The automated shopping system of claim 1, wherein the iterative scoring system determines scores based at least in part on a keyword occurrence value computed from number of occurrences of keywords in information provided and optionally degree of clustering of keywords in information provided, and wherein the keywords are provided by at least one of the user and the automated shopping system.

4. The automated shopping system of claim 3, wherein the keyword occurrence value computed from number of occurrences of keywords in information provided and optionally the degree of clustering of keywords in information provided is obtained from text or verbal input and is at least one of information provided by at least one of the user, the at least one provider, and third parties.

5. The automated shopping system of claim 1, wherein updating the score in the iterative scoring system includes generating at least one correction factor and multiplying the score by the at least one correction factor.

6. The automated shopping system of claim 1, wherein the system further comprises a management system within the at least one processor that tracks each virtual provider through multiple steps, and sequences the multiple steps by specifying contents of each step of the multiple steps.

7. The automated shopping system of claim 6, further comprising a timer that allocates a predetermined time to complete at least one step of the multiple steps.

8. The automated shopping system of claim 7, wherein the system sends an alarm indicating that a predetermined time period has lapsed without requisite action.

9. The automated shopping system of claim 8, wherein the alarm is sent to at least one individual recipient selected from the group consisting of the user, the provider, a third party, and an operator of the system, the alarm is classified as either a warning alarm or an urgent alarm, and the alarm is sent to the at least one individual recipient based on whether the respective at least one individual recipient has access to warning alarms or to urgent alarms.

10. The automated shopping system of claim 6, wherein the contents of each step of the multiple steps at least includes instructions to at least one of (a) the user regarding the input of additional user information, (b) the provider regarding the input of additional provider information, and (c) third parties regarding the input of information, and wherein the management system determines default content for each step of the multiple steps.

11. The automated shopping system of claim 10, wherein the default content is determined by one of the user, the automated shopping system, and an operator of the system.

12. The automated shopping system of claim 5, wherein the at least one correction factor is derived from at least one of interviewing the provider, objective testing of the provider, reference checking of the provider's information, and third party verification of the provider information.

13. The automated shopping system of claim 5, further comprising a device for requesting information which is one of (a) an avatar which is an animated image generated automatically by the system or (b) a simulated interviewer, and further comprising a device for accepting input of the information requested in digital form or as verbal input converted into digital form.

14. The automated shopping system of claim 1, further comprising a device for requesting information which is one of (a) an avatar which is an animated image generated automatically by the system or (b) a simulated interviewer, and further comprising a device for accepting input of the information requested in digital form or as verbal input converted into digital form.

15. The automated shopping system of claim 1, further comprising a device for accepting input of information in digital form or as verbal input converted into digital form.

16. The automated shopping system of claim 1, further comprising a reporting system within the at least one processor that at least one of (a) sends status messages to the user regarding the status of a particular order in the system, and (b) sends status messages to providers regarding the status of the virtual providers relating to respective providers in the system.

17. The automated shopping system of claim 1, further comprising a billing system within the at least one processor that bills at least one of the user and the at least one provider.

18. The automated shopping system of claim 1, further comprising a ranking system within the at least one processor that ranks the scores of at least one provider to the order and to other providers, and reports the ranking to at least the user and optionally to one or more of the at least one provider.

19. The automated shopping system of claim 1, wherein the user is a human shopper and the at least one provider is a supplier of one of companionship, goods, or services.

20. The automated shopping system of claim 1, wherein the knowledge base contains facts and rules for problem solving, wherein the automated shopping system further comprises a knowledge base system within the at least one processor that updates the facts and rules contained in the knowledge base automatically to provide updates so that the knowledge base is an adaptive knowledge base, and wherein the updates may be used as a basis for requesting additional information.

21. The automated shopping system of claim 1, wherein, prior to creating the virtual provider, representations of attributes of the user, the at least one order, and the at least one provider are constructed, which representations of attributes share at least one of symbolism and vocabulary.

22. The automated shopping system of claim 1, wherein the automated shopping system is one of (a) a symmetrical system in which the user and the at least one provider use substantially similar selection characteristics and methods or (b) a non-symmetrical system in which the user and the at least one provider use substantially different selection characteristics and methods.

23. An automated shopping method in which a user places an order for at least one provider, a degree of matching between each order-provider pairing is computed, and a score reported to at least the user and optionally to the at least one provider, the automated shopping method comprising:

providing (A) at least one processor to receive and process information including (1) user information from at least one user including (a) information that specifies provider criteria including identification of provider information to be verified and (b) order information that specifies order criteria for a particular order, (2) provider information from at least one provider, and (3) third party information; (B) at least one data storage device that communicates with the at least one processor and receives and stores the information in the at least one database; and (C) a knowledge base stored in a data storage device and containing information on which to base requests for information by the system;

receiving information from the user, including information that specifies provider criteria and order information that specifies order criteria for that particular order, and from the at least one provider;

creating a virtual provider within the at least one processor by pairing provider information of a particular provider with order information of a said particular order to create an informational pair, and storing the informational pair within the at least one database;

determining a score that reflects a degree of matching for each respective informational pair using an iterative scoring system within the at least one processor that compares the provider information of a particular provider and the order information of a particular order within each respective informational pair, and communicates with the at least one processor and saves the score for each respective informational pair in the at least one database; and determining whether a score is based on complete information or whether additional information and determination of a revised score is required using a scoring correction system that is included within the iterative scoring system within the at least one processor, the scoring correction system including:

(D) inspecting the order and provider information to determine (3) completeness of the order and provider information and (4) presence of provider information identified in the order as requiring verification, and, if no further information is required by the system, indicating that the score is complete or, if further information is determined appropriate for said (3) or (4), proceeding to (E) and (F) as follows:

(E) communicating with the knowledge base to obtain requests for additional information from outside the system including (5) requesting information determined to be incomplete from at least one of the user and the provider and (6) requesting verification of provider information from a third party, and (F) updating the score in the iterative scoring system to obtain a revised score based on the additional information received and saving the revised score in the at least one database.

* * * * *